(12) United States Patent
Besley

(10) Patent No.: US 8,743,136 B2
(45) Date of Patent: Jun. 3, 2014

(54) GENERATING OBJECT REPRESENTATION FROM BITMAP IMAGE

(75) Inventor: James Austin Besley, Killara (AU)

(73) Assignee: Canon Kabushiki Kaisha, Tokyo (JP)

( * ) Notice: Subject to any disclaimer, the term of this patent is extended or adjusted under 35 U.S.C. 154(b) by 666 days.

(21) Appl. No.: 12/969,914

(22) Filed: Dec. 16, 2010

(65) Prior Publication Data

US 2011/0148909 A1    Jun. 23, 2011

(30) Foreign Application Priority Data

Dec. 17, 2009    (AU) ................................ 2009251018

(51) Int. Cl.
G09G 5/02    (2006.01)

(52) U.S. Cl.
USPC ........... 345/592; 345/589; 345/619; 345/636; 382/165; 382/199

(58) Field of Classification Search
None
See application file for complete search history.

(56) References Cited

U.S. PATENT DOCUMENTS

| 6,175,663 | B1 * | 1/2001 | Huang ......................... 382/284 |
| 6,377,269 | B1 | 4/2002 | Kay et al. |
| 7,302,094 | B2 | 11/2007 | Ameline et al. |
| 7,750,922 | B2 * | 7/2010 | Parenteau et al. ............. 345/592 |
| 2008/0143735 | A1 | 6/2008 | Besley et al. |
| 2008/0144942 | A1 | 6/2008 | Besley et al. |
| 2009/0148039 | A1 | 6/2009 | Chen et al. |

FOREIGN PATENT DOCUMENTS

WO    2006/072897 A1    7/2006

OTHER PUBLICATIONS

Australian Office Action dated Feb. 21, 2012, in counterpart Australian Published Application No. 2009251018.

* cited by examiner

*Primary Examiner* — Antonio A Caschera
(74) *Attorney, Agent, or Firm* — Fitzpatrick, Cella, Harper & Scinto

(57) ABSTRACT

Methods, apparatuses, and computer readable storage mediums for generating an object representation from a bitmap image by selecting a set of regions, including a background region, from the bitmap image. Color and partial transparency parameters of a first graphical object with partial transparency that overlaps a second graphical object are estimated according to colors of the set of regions. The estimated color and partial transparency are consistent with a transparency compositing model. Geometric models of the first and second graphical objects are constructed from the set of regions and the estimated color and transparency parameters of the first graphical object. The object representation is generated dependent upon the geometric models. The object representation may be an electronic document and the bitmap image may be a scanned version of a document.

17 Claims, 29 Drawing Sheets

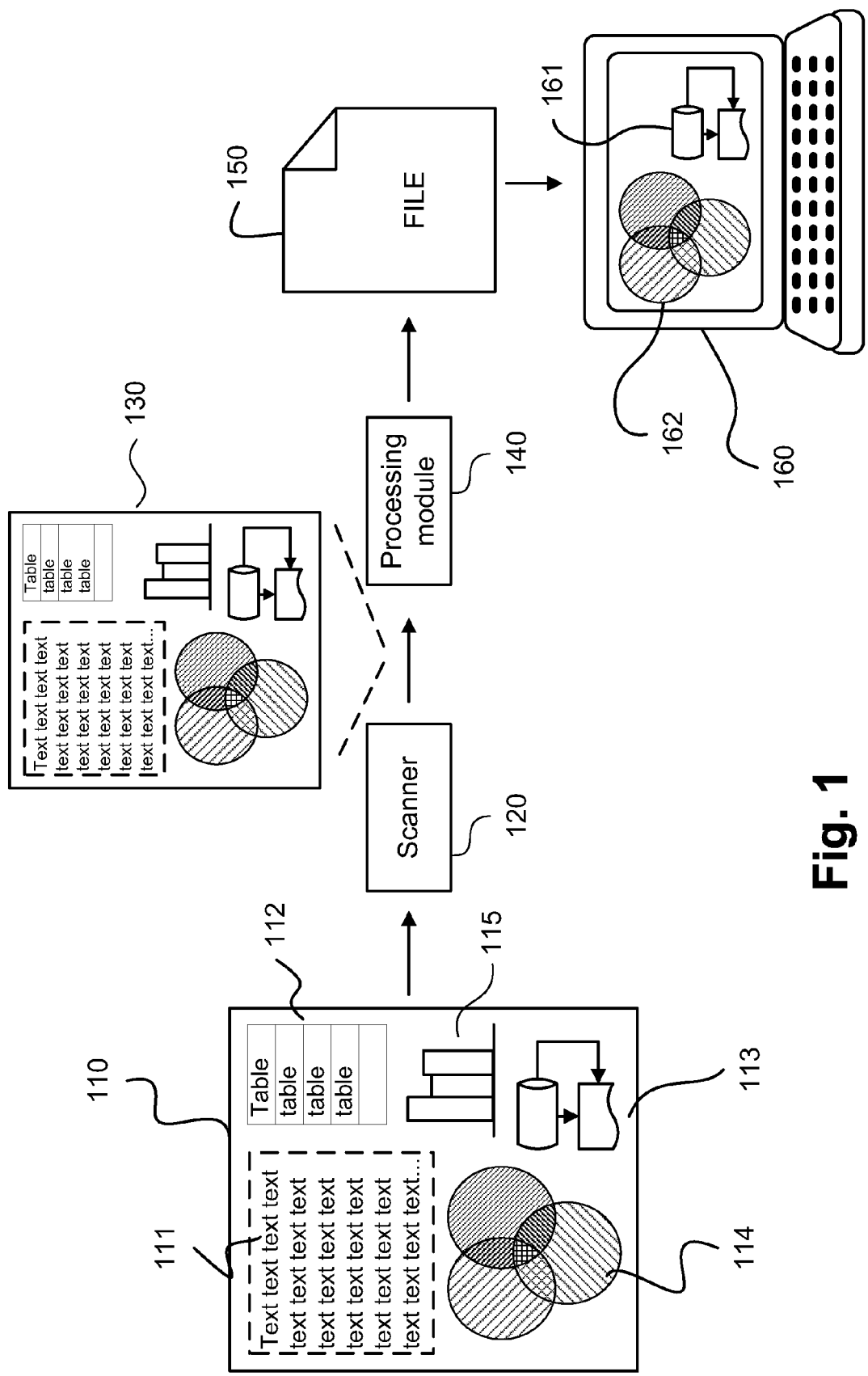

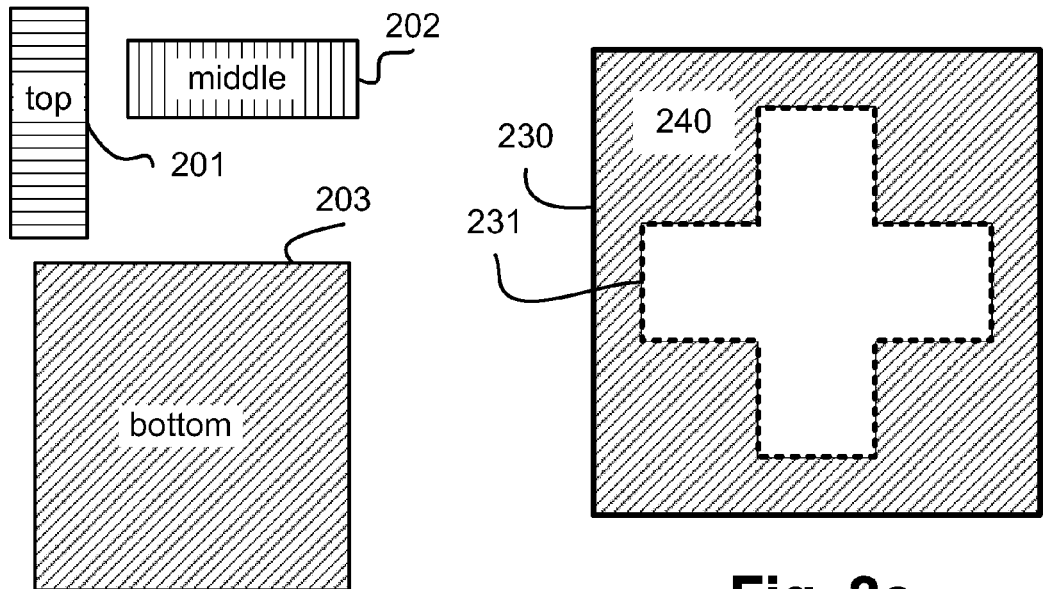
Fig. 2a
Fig. 2c
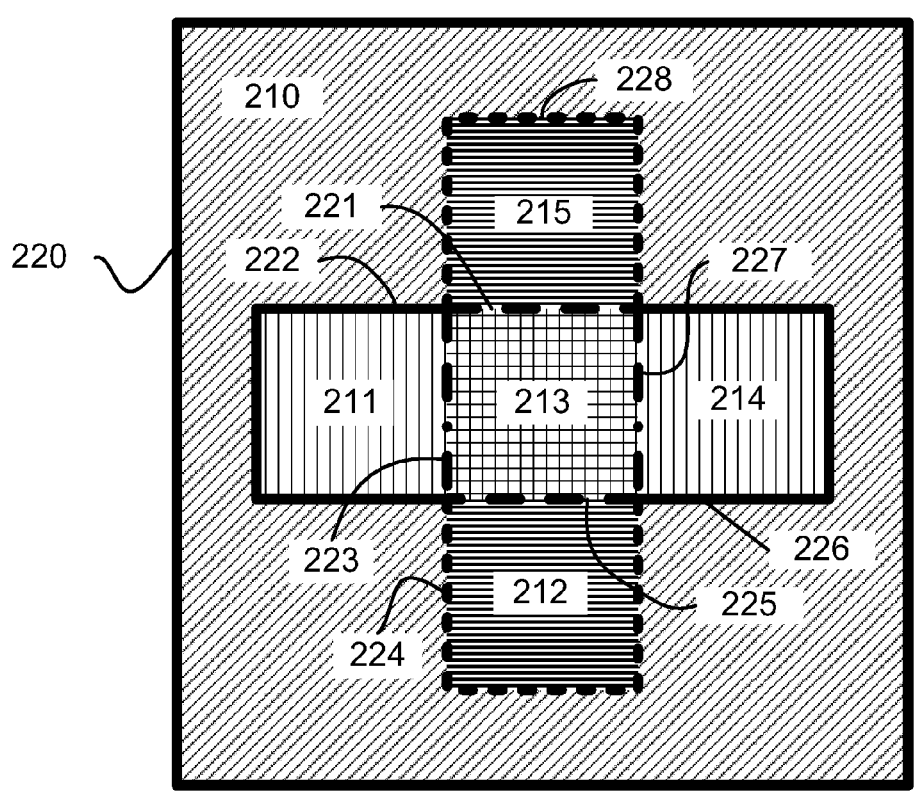
Fig. 2b

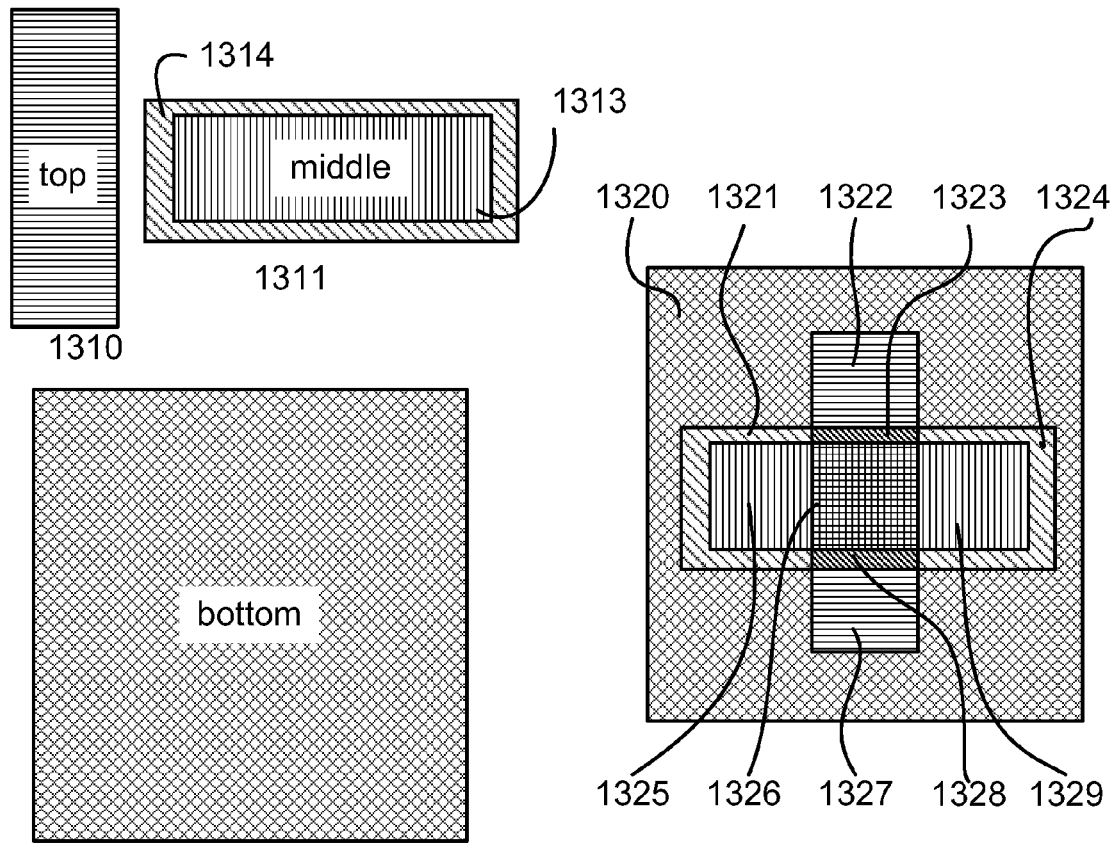
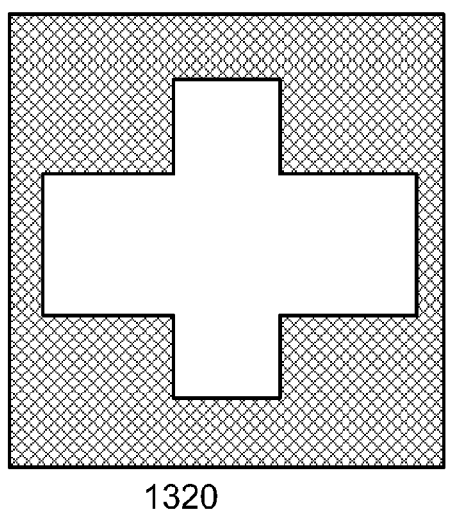
Fig. 13a
Fig. 13b
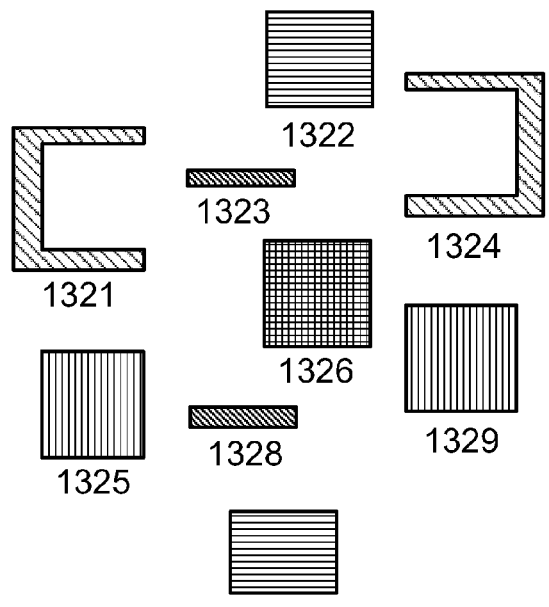
Fig. 13c

GENERATING OBJECT REPRESENTATION FROM BITMAP IMAGE

REFERENCE TO RELATED PATENT APPLICATION

This application claims the benefit under 35 U.S.C. §119 of the filing date of Australian Patent Application No. 2009251018, filed 17 Dec. 2009 in the name of Canon Kabushiki Kaisha, hereby incorporated by reference in its entirety as if fully set forth herein.

TECHNICAL FIELD

The present invention relates generally to the processing of a bitmap image and in particular to an object representation of such a bitmap image having one or more partially transparent overlapping graphical objects.

BACKGROUND

The proliferation of imaging technology combined with ever increasing computational processing power has lead to many advances in the area of document analysis systems. A significant proportion of office documents are generated using structured text/graphics editing applications, such as Microsoft™ Word™ and Microsoft™ Powerpoint™. In addition to formatted text editing, these text/graphics editing applications include basic figure drawing tools and options. An important class of document analysis applications, referred to as "scan-to-editable" applications, process a bitmap representation of a document to generate an electronic version of the document that can be viewed and edited using such editing applications.

Figure drawing options in a typical structured text/graphics editing application include freeform line drawing, template shapes and connectors (i.e., dynamic line objects that connect to and/or between template shapes within a document). The text/graphics editing applications may also include colouring, filling, layering and grouping options for sets of graphical objects. Many commonly used geometric shapes can be created using template shapes. A user may prefer to use a template shape rather than drawing the shape using freeform lines, since this option can be faster, more accurate in terms of representation of the desired shape, and easier to edit at a later time. The Microsoft™ AutoShapes set includes a number of examples of template shapes which can be manipulated within editing environments such as Microsoft™ Word™ and PowerPoint™. Other template shapes may be found in OpenOffice.org™ editing applications, such as the Writer™ and Impress™ applications.

Techniques exist for detecting overlapping shapes in the case where these either have a solid fill or are line shapes with no fill. However, these techniques do not handle the case where the upper layer shape has a partial transparency, such that the lower layer shape is partly visible underneath.

Other techniques exist that represent a single object as a transparent graphical object for the purpose of photo-compositing. However, these techniques do not handle the intersection of a transparent object with a second object and can only find objects with a restricted set of colours on the outer boundary of the colour space representation.

Techniques also exist for detecting transparent regions from video based on processing multiple video frames. However, these techniques do not handle the intersection of transparent regions and require at least two images, the difference between the two images being attributed to the presence of a transparent object in one image.

A need exists for techniques of detecting and reconstructing partially transparent overlapping graphical objects from a single image.

SUMMARY

In accordance with an aspect of the invention, there is provided a computer-implemented method of generating an object representation from a bitmap image. The method comprises the steps of: selecting a set of regions from the bitmap image, the set of regions including a background region of the bitmap image; estimating colour and partial transparency parameters of a first graphical object with partial transparency that overlaps a second graphical object according to colours of the set of regions, the estimated colour and partial transparency being consistent with a transparency compositing model, the transparency compositing model defining a colour of a region of overlap of two graphical objects in terms of colour and partial transparency parameters; constructing geometric models of the first and second graphical objects from the set of regions and the estimated colour and transparency parameters of the first graphical object; and generating dependent upon the geometric models the object representation.

The object representation may be an electronic document and the bitmap image may be a scanned version of a document.

The partial transparency parameter of the first graphical object is estimated dependent upon: a first region of the set of regions, the first region assumed to be a region of overlap of the first and second graphical objects; and a second region of the set of regions adjacent to the first region, the second region being assumed to be part of the first graphical object; and a third region of the set of regions adjacent to the first region, the third region being assumed to be part of the second graphical object.

The partial transparency parameter of the first graphical object may be estimated such that a colour difference is minimised between a colour of the first region of the bitmap image and a colour defined by the transparency compositing model given the colours of the second and third regions and a background region.

The second graphical region may be partially transparent.

The first graphical object may overlap the second graphical object and a third graphical object with partial transparency and the second object may overlap the third object with partial transparency; the first, second, and third graphical objects may overlap with partial transparency; the set of regions may comprise a first region, at least three regions that are adjacent to an outer boundary of the first region, and a background region; each of the three adjacent regions may have an associated transparency model that includes colour and transparency parameters corresponding to the overlap of two of the graphical objects with partial transparency; and the transparency models of the three adjacent regions may be consistent with the transparency model corresponding to the overlap of the three graphical objects with partial transparency.

The three graphical objects may be circles that overlap with partial transparency.

Geometric models of graphical objects may be constructed by following region borders while keeping track of transparency models of regions adjacent to the borders that have been followed. The colour, transparency, and layering parameters of the graphical objects may be set according to transparency models of regions adjacent to borders traversed in construction of geometric models of graphical objects.

In accordance with another aspect of the invention, there is provided an apparatus for generating an object representation from a bitmap image. The apparatus comprises: a memory for storing data and a computer program; and a processor unit coupled to the memory for executing a computer program, the memory and the processor configured to generate the object representation from the bitmap image. The computer program comprises:

computer program code module for selecting a set of regions from the bitmap image, the set of regions including a background region of the bitmap image;

computer program code module for estimating colour and partial transparency parameters of a first graphical object with partial transparency that overlaps a second graphical object according to colours of the set of regions, the estimated colour and partial transparency being consistent with a transparency compositing model, the transparency compositing model defining a colour of a region of overlap of two graphical objects in terms of colour and partial transparency parameters;

computer program code module for constructing geometric models of the first and second graphical objects from the set of regions and the estimated colour and transparency parameters of the first graphical object; and computer program code module for generating dependent upon the geometric models the object representation.

The object representation may be an electronic document and the bitmap image may be a scanned version of a document.

The partial transparency parameter of the first graphical object may be estimated dependent upon: a first region of the set of regions, the first region assumed to be a region of overlap of the first and second graphical objects; and a second region of the set of regions adjacent to the first region, the second region being assumed to be part of the first graphical object; and a third region of the set of regions adjacent to the first region, the third region being assumed to be part of the second graphical object.

The partial transparency parameter of the first graphical object may be estimated such that a colour difference is minimised between a colour of the first region of the bitmap image and a colour defined by the transparency compositing model given the colours of the second and third regions and a background region.

The second graphical region may be partially transparent.

Geometric models of graphical objects may be constructed by following region borders while keeping track of transparency models of regions adjacent to the borders that have been followed.

In accordance with a further aspect of the invention, there is provided a computer readable storage medium having recorded therein a computer program for generating an object representation from a bitmap image for execution by a processing unit. The computer program comprises: a computer program code module for selecting a set of regions from the bitmap image, the set of regions including a background region of the bitmap image; a computer program code module for estimating colour and partial transparency parameters of a first graphical object with partial transparency that overlaps a second graphical object according to colours of the set of regions, the estimated colour and partial transparency being consistent with a transparency compositing model, the transparency compositing model defining a colour of a region of overlap of two graphical objects in terms of colour and partial transparency parameters; a computer program code module for constructing geometric models of the first and second graphical objects from the set of regions and the estimated colour and transparency parameters of the first graphical object; and a computer program code module for generating dependent upon the geometric models the object representation.

The object representation may be an electronic document and the bitmap image may be a scanned version of a document.

The partial transparency parameter of the first graphical object may be estimated dependent upon: a first region of the set of regions, the first region assumed to be a region of overlap of the first and second graphical objects; and a second region of the set of regions adjacent to the first region, the second region being assumed to be part of the first graphical object; and a third region of the set of regions adjacent to the first region, the third region being assumed to be part of the second graphical object.

The partial transparency parameter of the first graphical object may be estimated such that a colour difference is minimised between a colour of the first region of the bitmap image and a colour defined by the transparency compositing model given the colours of the second and third regions and a background region.

The second graphical region may be partially transparent.

In accordance with still another aspect of the invention, there is provided a computer-implemented method of generating an object representation from a bitmap image. The method comprises the steps of: determining, from the bitmap image containing first and second independent graphical objects with the first graphical object having partial transparency, a set of filled regions and line regions, each filled region having a fill colour, and each line region having a line colour; generating adjacency data of the filled regions by locating two or more of the filled regions separated by at least one of the line regions and making the located regions adjacent; estimating colour and partial transparency parameters of the first graphical object that overlaps the second graphical object according to the fill colour and the adjacency data of the filled regions; determining a single line colour for an outline of the second graphical object based on at least the line colour of one of the line regions; and storing the first independent graphical object, with the estimated colour and partial transparency parameters, and the second independent graphical object, having the determined single line colour, to form the object representation.

The single line colour may be determined based on the estimated colour and partial transparency parameters of the first object, the line colour of the line regions overlapped by the first object being consistent with the single line colour when modified by the estimated colour and partial transparency parameters of the first object.

The storing of the first and second graphical objects may dependent upon a comparison between the single line colour and the line colour of one of the line regions overlapped by the first graphical object when the line colour is modified by the estimated colour and partial transparency parameters of the first object.

BRIEF DESCRIPTION OF THE DRAWINGS

Embodiments of the invention will now be described with reference to the following drawings, in which:

FIG. 1 is a schematic block diagram illustrating a system in which one or more embodiments of the current invention can be used;

FIGS. 2a, 2b, and 2c are diagrams illustrating a set of graphical objects that overlap with partial transparency;

FIGS. 13a, 13b, and 13c are diagrams illustrating the same set of graphical objects with lines that overlap with partial transparency;

DETAILED DESCRIPTION

Figure 3A:
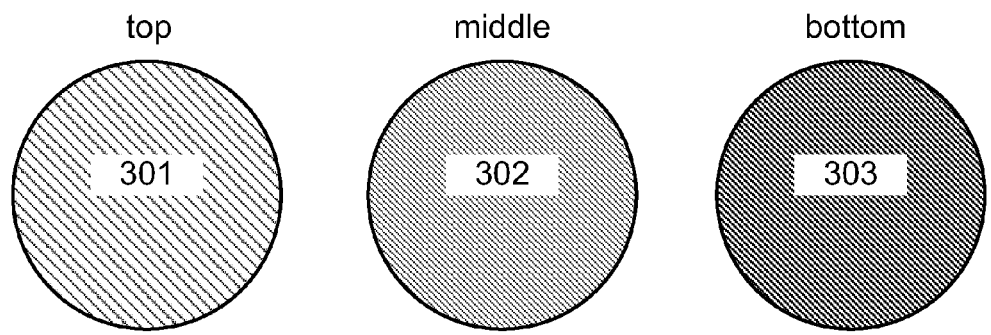
FIGS. 3a and 3b are diagrams illustrating a set of three graphical objects that overlap with partial transparency.

Methods, apparatuses, and computer readable storage mediums for generating an object representation from a bitmap image are disclosed. In the following description, numerous specific details, including particular graphical object shapes, colour spaces, figure content, and the like are set forth. However, from this disclosure, it will be apparent to those skilled in the art that modifications and/or substitutions may be made without departing from the scope and spirit of the invention. In other circumstances, specific details may be omitted so as not to obscure the invention.

Where reference is made in any one or more of the accompanying drawings to steps and/or features, which have the same reference numerals, those steps and/or features have for the purposes of this description the same function(s) or operation(s), unless the contrary intention appears.

[System Overview]

FIG. 1 illustrates a system in which one or more embodiments of the invention can be used. A document 110 is scanned by a scanner 120 to form an input scanned document image 130 stored in memory as a bitmap image. The input scanned document image 130 is processed in a processing module 140 in accordance with one or more embodiments of the invention. The processing module 140 may perform a number of bitmap image analysis processing stages including partially transparent object detection and reconstruction in accordance with an embodiment of the invention. A file description, or object representation 150 of the bitmap image 130 (i.e., the scanned document) may be generated that includes figure content in the form of template shapes, connectors, and freeform elements with various styles such as line styles, fill styles (including partially transparent fills) and arrowheads. The file 150 may include figure elements 161 and 162 (graphical objects) that are suitable for editing using a structured text/graphics editing application on a suitable device, such as a computer 160, that the file 150 may be provided to.

The document 110 may be a compound document with a variety of content types. The content may include, but is not limited to, figure elements such as flowcharts 113, overlapping partially transparent graphical objects 114, and other charts 115, in addition to non-figure elements such as text 111 and tables 112. The document 110 can be produced using a variety of equipment including printers, fax machines, projectors, or more traditional media such as pen on paper or whiteboard and may be an imperfect representation of an original electronic document. The scanner 120 may be a stand-alone scanner, a handheld scanner, or a scanner embedded in a larger system, such as a multi-function printer. The scanner 120 may also be some other imaging device, such as a camera, a mobile phone, or a personal organiser. The scanner 120 may also introduce noise into the input bitmap image 130. Examples of the processing module 140 include a computer, a multi-functional printer, a mobile phone, or a personal organiser.

Transparency can be defined for the fill style of graphical objects, such as freeform or template shapes. A partially transparent filled graphical object does not completely obscure objects or background regions that sit underneath the partially transparent filled graphical object. A transparency model can be used to define how the graphical object fill and the colour beneath the partially transparent filled graphical object are composited together at a given point. The transparency of the graphical object is a parameter of this model that may vary over the interior of the graphical object or may be constant. Herein, full transparency is a transparency parameter of value 1 and zero transparency is a parameter of value 0, although some systems may work with other definitions such as percentages (0% representing zero and 100% representing full transparency).

The transparency compositing model typically defines the composited colour as a convex combination of the colours of the graphical objects that overlap at a point for each colour channel separately. If the object in the upper layer has colour channel value $C_{upper}^{(i)}$ and transparency parameter $\alpha_{upper}$ and the object in the lower layer has colour channel value $C_{lower}^{(i)}$, the composited colour channel value, $C^{(i)}$, is:

$$C^{(i)} = (1-\alpha_{upper})C_{upper}^{(i)} + \alpha_{upper}C_{lower}^{(i)}. \quad (1)$$

If more than two objects are overlaid, Equation (1) is used multiple times—the back pair of layers are iteratively converted to a single layer with a colour determined by Equation (1) until there is only a single layer, the colour of which is the result of compositing the layers.

The processed colour channels are generally from a Red-Green-Blue (RGB) colour space. In this case, the colour obtained by compositing with transparency using the linear model described above is guaranteed to be in the appropriate range. However, if the processed colour channels are defined in a different colour space, an out-of-range colour may be obtained, and some processing may be required to handle this. Alternative transparency compositing models exist, but this linear model is the most commonly used in computer graphics.

Transparency may also be discussed in terms of opacity, translucency, or the alpha channel in some references and products. Translucency and the alpha channel mean the same as transparency, while opacity is an inverse parameter (typically opacity=1−transparency). Some applications in computer graphics perform the computations in terms of pre-multiplied colours (that is colours that have been pre-multiplied by the transparency), generally for the purpose of efficiency.

The embodiments of the invention are designed to detect and construct geometric models for overlapping graphical objects when the upper graphical object or graphical objects have fixed partial transparencies (i.e. transparency parameters greater than 0 and less than 1 that do not vary over the object). For simplicity, objects that are not found to overlap any other object are assumed to have zero transparency. In the case where more than one interpretation can accurately model the objects being processed, then a single simple interpretation is selected.

[Computer System Implementation]

Figure 11A:
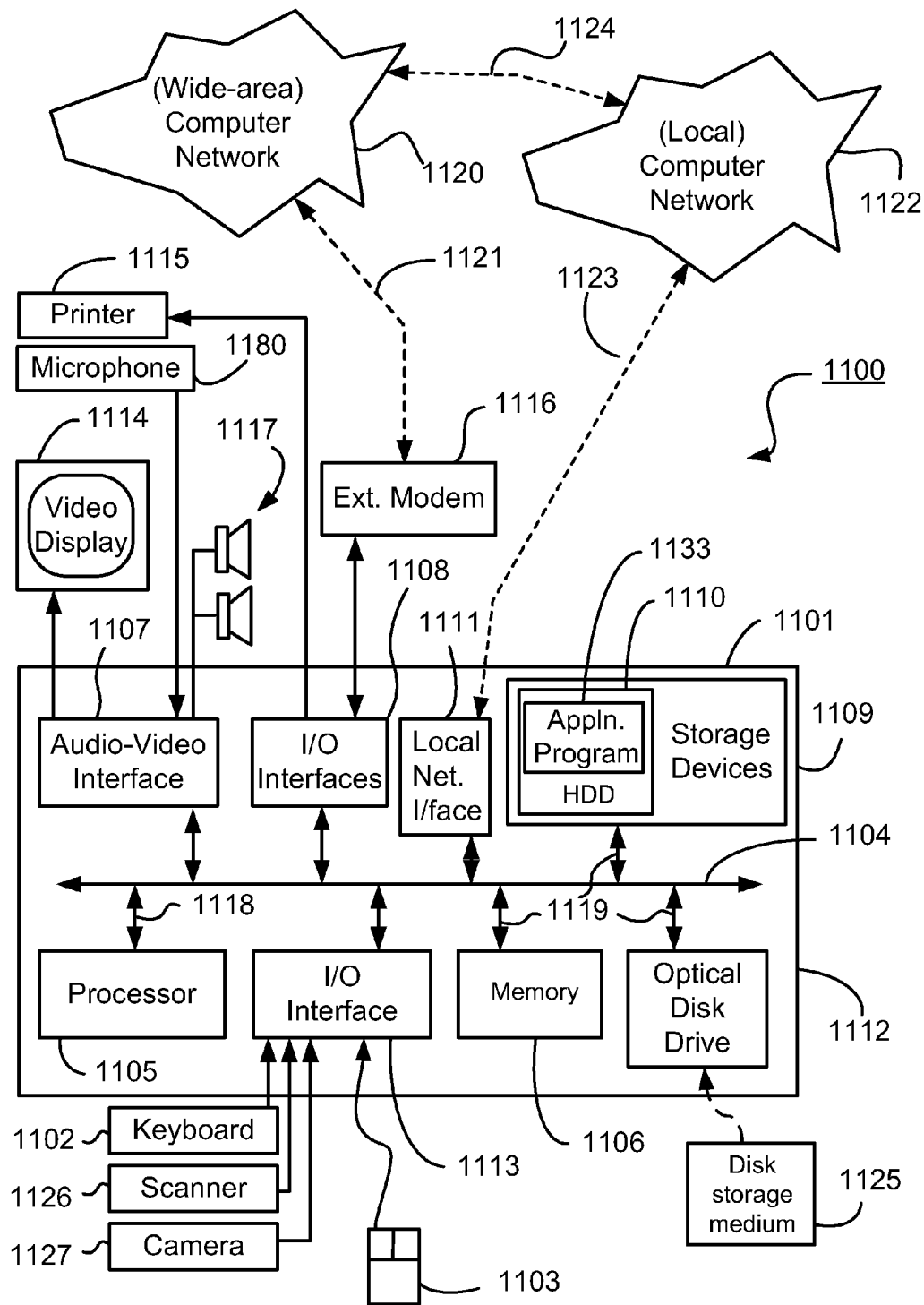
FIGS. 11a and 11b are schematic block diagrams of a general-purpose computer system upon which the arrangements described can be practiced.
Figure 11B:
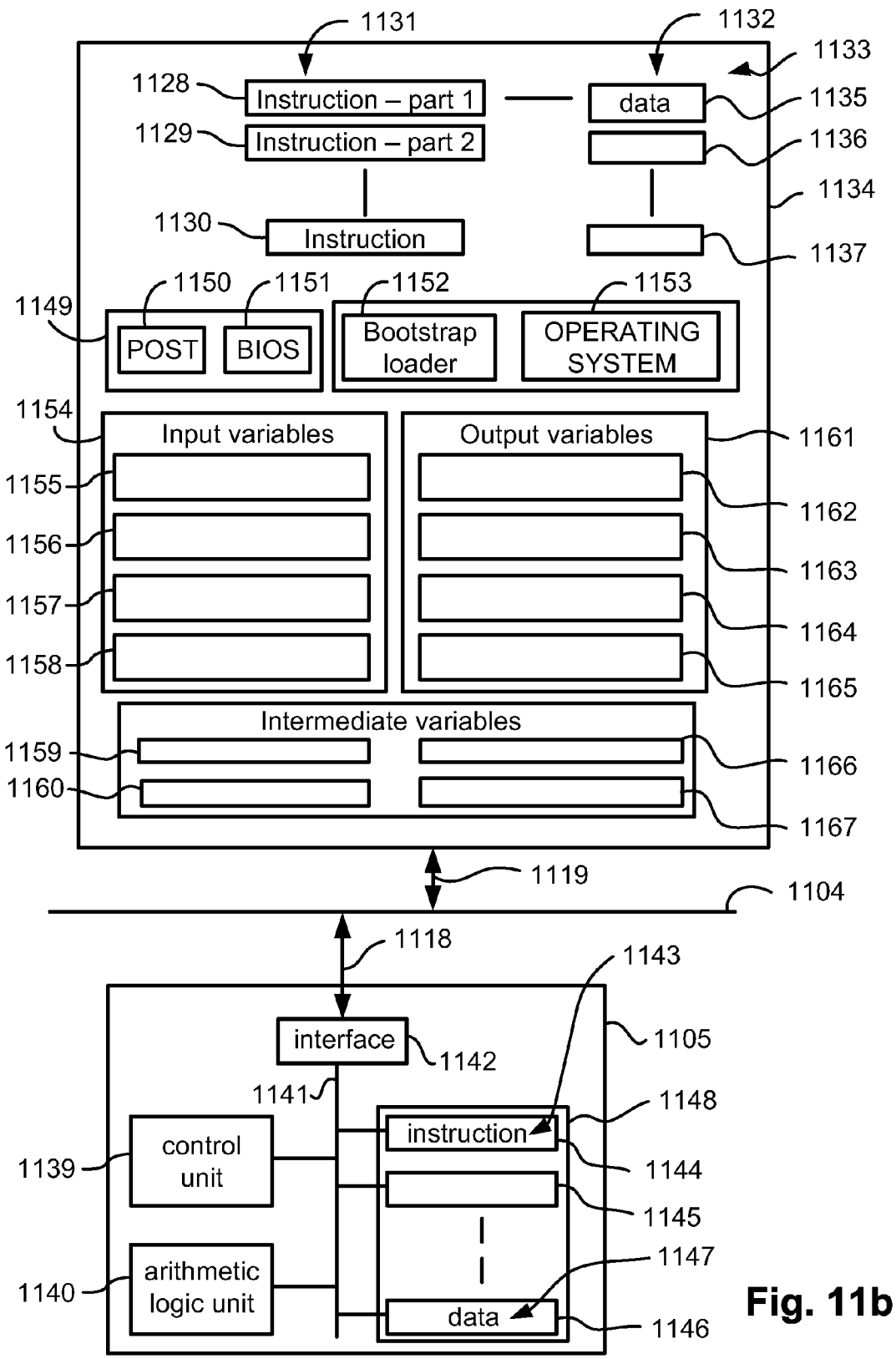

FIGS. 11a and 11b collectively form a schematic block diagram of a general purpose computer system 1100, upon which the various arrangements described can be practiced.

As seen in FIG. 11a, the computer system 1100 is formed by a computer module 1101, input devices such as a keyboard 1102, a mouse pointer device 1103, a scanner 1126, a camera 1127, and a microphone 1180, and output devices including a printer 1115, a display device 1114 and loudspeakers 1117. An external Modulator-Demodulator (Modem) transceiver device 1116 may be used by the computer module 1101 for communicating to and from a communications network 1120 via a connection 1121. The network 1120 may be a wide-area network (WAN), such as the Internet or a private WAN. Where the connection 1121 is a telephone line, the modem 1116 may be a traditional "dial-up" modem. Alternatively, where the connection 1121 is a high capacity (e.g., cable) connection, the modem 1116 may be a broadband modem. A wireless modem may also be used for wireless connection to the network 1120.

The computer module 1101 typically includes at least one processor unit 1105, and a memory unit 1106 for example formed from semiconductor random access memory (RAM) and semiconductor read only memory (ROM). The module 1101 also includes an number of input/output (I/O) interfaces including an audio-video interface 1107 that couples to the video display 1114, loudspeakers 1117 and microphone 1180, an I/O interface 1113 for the keyboard 1102, mouse 1103, scanner 1126, camera 1127 and optionally a joystick (not illustrated), and an interface 1108 for the external modem 1116 and printer 1115. In some implementations, the modem 1116 may be incorporated within the computer module 1101, for example within the interface 1108. The computer module 1101 also has a local network interface 1111 which, via a connection 1123, permits coupling of the computer system 1100 to a local computer network 1122, known as a Local Area Network (LAN). As also illustrated, the local network 1122 may also couple to the wide network 1120 via a connection 1124, which would typically include a so-called "firewall" device or device of similar functionality. The interface 1111 may be formed by an Ethernet™ circuit card, a Bluetooth™ wireless arrangement or an IEEE 802.11 wireless arrangement.

The interfaces 1108 and 1113 may afford either or both of serial and parallel connectivity, the former typically being implemented according to the Universal Serial Bus (USB) standards and having corresponding USB connectors (not illustrated). Storage devices 1109 are provided and typically include a hard disk drive (HDD) 1110. Other storage devices such as a floppy disk drive and a magnetic tape drive (not illustrated) may also be used. An optical disk drive 1112 is typically provided to act as a non-volatile source of data. Portable memory devices, such optical disks (e.g., CD-ROM, DVD), USB-RAM, and floppy disks for example may then be used as appropriate sources of data to the system 1100.

The components 1105 to 1113 of the computer module 1101 typically communicate via an interconnected bus 1104 and in a manner which results in a conventional mode of operation of the computer system 1100 known to those in the relevant art. Examples of computers on which the described arrangements can be practised include IBM-PC's and compatibles, Sun Sparcstations, Apple Mac™ or a like computer systems evolved therefrom.

The method of generating an object representation from a bitmap image may be implemented using the computer system 1100 wherein the processes of FIGS. 5 to 10 may be implemented as one or more software application programs 1133 executable within the computer system 1100. In particular, the steps of the method of generating an object representation from a bitmap image are effected by instructions 1131 in the software 1133 that are carried out within the computer system 1100. The software instructions 1131 may be formed as one or more code modules, each for performing one or more particular tasks. The software may also be divided into two separate parts, in which a first part and the corresponding code modules performs the method of generating an object representation from a bitmap image and a second part and the corresponding code modules manage a user interface between the first part and the user.

The software 1133 is generally loaded into the computer system 1100 from a computer readable medium, and is then typically stored in the HDD 1110, as illustrated in FIG. 11a, or the memory 1106, after which the software 1133 can be executed by the computer system 1100. In some instances, the application programs 1133 may be supplied to the user encoded on one or more CD-ROM 1125 and read via the corresponding drive 1112 prior to storage in the memory 1110 or 1106. Alternatively the software 1133 may be read by the computer system 1100 from the networks 1120 or 1122 or loaded into the computer system 1100 from other computer readable media. Computer readable storage media refers to any storage medium that participates in providing instructions and/or data to the computer system 1100 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 1101. Examples of computer readable transmission media that may also participate in the provision of software, application programs, instructions and/or data to the computer module 1101 include radio or infra-red transmission channels as well as a network connection to another computer or networked device, and the Internet or Intranets including e-mail transmissions and information recorded on Websites and the like.

The second part of the application programs 1133 and the corresponding code modules mentioned above may be executed to implement one or more graphical user interfaces (GUIs) to be rendered or otherwise represented upon the display 1114. Through manipulation of typically the keyboard 1102 and the mouse 1103, a user of the computer system 1100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1117 and user voice commands input via the microphone 1180.

FIG. 11b is a detailed schematic block diagram of the processor 1105 and a "memory" 1134. The memory 1134 represents a logical aggregation of all the memory devices (including the HDD 1110 and semiconductor memory 1106) that can be accessed by the computer module 1101 in FIG. 11a.

When the computer module 1101 is initially powered up, a power-on self-test (POST) program 1150 executes. The POST program 1150 is typically stored in a ROM 1149 of the semiconductor memory 1106. A program permanently stored in a hardware device such as the ROM 1149 is sometimes referred to as firmware. The POST program 1150 examines hardware within the computer module 1101 to ensure proper functioning, and typically checks the processor 1105, the memory (1109, 1106), and a basic input-output systems software (BIOS) module 1151, also typically stored in the ROM 1149, for correct operation. Once the POST program 1150 has run successfully, the BIOS 1151 activates the hard disk drive 1110. Activation of the hard disk drive 1110 causes a bootstrap loader program 1152 that is resident on the hard disk drive 1110 to execute via the processor 1105. This loads an operating system 1153 into the RAM memory 1106 upon which the operating system 1153 commences operation. The operating system 1153 is a system level application, executable by the processor 1105, to fulfil various high level functions, including processor management, memory management, device management, storage management, software application interface, and generic user interface.

The operating system 1153 manages the memory (1109, 1106) in order to ensure that each process or application running on the computer module 1101 has sufficient memory in which to execute without colliding with memory allocated to another process. Furthermore, the different types of memory available in the system 1100 must be used properly so that each process can run effectively. Accordingly, the aggregated memory 1134 is not intended to illustrate how particular segments of memory are allocated (unless otherwise stated), but rather to provide a general view of the memory accessible by the computer system 1100 and how such is used.

The processor 1105 includes a number of functional modules including a control unit 1139, an arithmetic logic unit (ALU) 1140, and a local or internal memory 1148, sometimes called a cache memory. The cache memory 1148 typically includes a number of storage registers 1144-1146 in a register section. One or more internal buses 1141 functionally interconnect these functional modules. The processor 1105 typically also has one or more interfaces 1142 for communicating with external devices via the system bus 1104, using a connection 1118.

The application program 1133 includes a sequence of instructions 1131 that may include conditional branch and loop instructions. The program 1133 may also include data 1132 which is used in execution of the program 1133. The instructions 1131 and the data 1132 are stored in memory locations 1128-1130 and 1135-1137 respectively. Depending upon the relative size of the instructions 1131 and the memory locations 1128-1130, a particular instruction may be stored in a single memory location as depicted by the instruction shown in the memory location 1130. Alternately, an instruction may be segmented into a number of parts each of which is stored in a separate memory location, as depicted by the instruction segments shown in the memory locations 1128-1129.

In general, the processor 1105 is given a set of instructions which are executed therein. The processor 1105 then waits for a subsequent input, to which it reacts to by executing another set of instructions. Each input may be provided from one or more of a number of sources, including data generated by one or more of the input devices 1102, 1103, data received from an external source across one of the networks 1120, 1122, data retrieved from one of the storage devices 1106, 1109 or data retrieved from a storage medium 1125 inserted into the corresponding reader 1112. The execution of a set of the instructions may in some cases result in output of data. Execution may also involve storing data or variables to the memory 1134.

The disclosed arrangements use input variables 1154, which are stored in the memory 1134 in corresponding memory locations 1155-1158. The arrangements produce output variables 1161, which are stored in the memory 1134 in corresponding memory locations 1162-1165. Intermediate variables may be stored in memory locations 1159, 1160, 1166 and 1167.

The register section 1144-1146, the arithmetic logic unit (ALU) 1140, and the control unit 1139 of the processor 1105 work together to perform sequences of micro-operations needed to perform "fetch, decode, and execute" cycles for every instruction in the instruction set making up the program 1133. Each fetch, decode, and execute cycle comprises:

(a) a fetch operation, which fetches or reads an instruction 1131 from a memory location 1128;

(b) a decode operation in which the control unit 1139 determines which instruction has been fetched; and (c) an execute operation in which the control unit 1139 and/or the ALU 1140 execute the instruction.

Thereafter, a further fetch, decode, and execute cycle for the next instruction may be executed. Similarly, a store cycle may be performed by which the control unit 1139 stores or writes a value to a memory location 1132.

Each step or sub-process in the processes of FIGS. 5 to 10 is associated with one or more segments of the program 1133, and is performed by the register section 1144-1147, the ALU 1140, and the control unit 1139 in the processor 1105 working together to perform the fetch, decode, and execute cycles for every instruction in the instruction set for the noted segments of the program 1133.

The method of generating an object representation from a bitmap image may alternatively be implemented in dedicated hardware such as one or more integrated circuits performing the functions or sub functions of generating an object representation from a bitmap image. Such dedicated hardware may include graphic processors, digital signal processors, or one or more microprocessors and associated memories.

[Examples of Overlapping Graphical Objects]

FIG. 2 illustrates a set of graphical objects that overlap with transparency. In FIG. 2a, a graphical object 201 is a vertically-oriented, elongated rectangle with a partial transparency, while graphical objects 202 and 203 are a horizontally-oriented elongated rectangle (lengthwise perpendicular in orientation to the rectangle 201) and a square with zero transparency. FIG. 2b illustrates the result of layering the objects 201, 202, 203 of FIG. 2a, such that the vertical rectangle 201 overlaps the horizontal rectangle 202, which overlaps the square 203. The square 203 effectively forms a background for the overlap of the two rectangles 201, 202.

In FIG. 2b, six regions 210, 211, 212, 213, 214, and 215 are formed from the composited objects. The region 210 is the region covered only by the square 203. Regions 211 and 214 represent the regions covered by both the horizontal rectangle 202 and the square 203. Since the horizontal rectangle 202 has zero transparency, the square 203 is completely occluded, and the colour of the regions 211 and 214 is the same as the rectangle 202. Regions 212 and 215 represent the regions covered by both the vertical rectangle 201 and the square 203. Since the vertical rectangle 201 has partial transparency, the colour of the regions 212 and 215 can be determined according to a transparency model in terms of the colours of the square 203 and the rectangle 201. Finally, the region 213 represents the region covered by all three objects 201, 202, 203. Since the horizontal rectangle 202 completely occludes the square 203 in this region, the colour of the region 213 can be determined according to a transparency model in terms of the colours of the rectangles 201 and 202. FIG. 2c is described hereinafter.

Figure 3B:
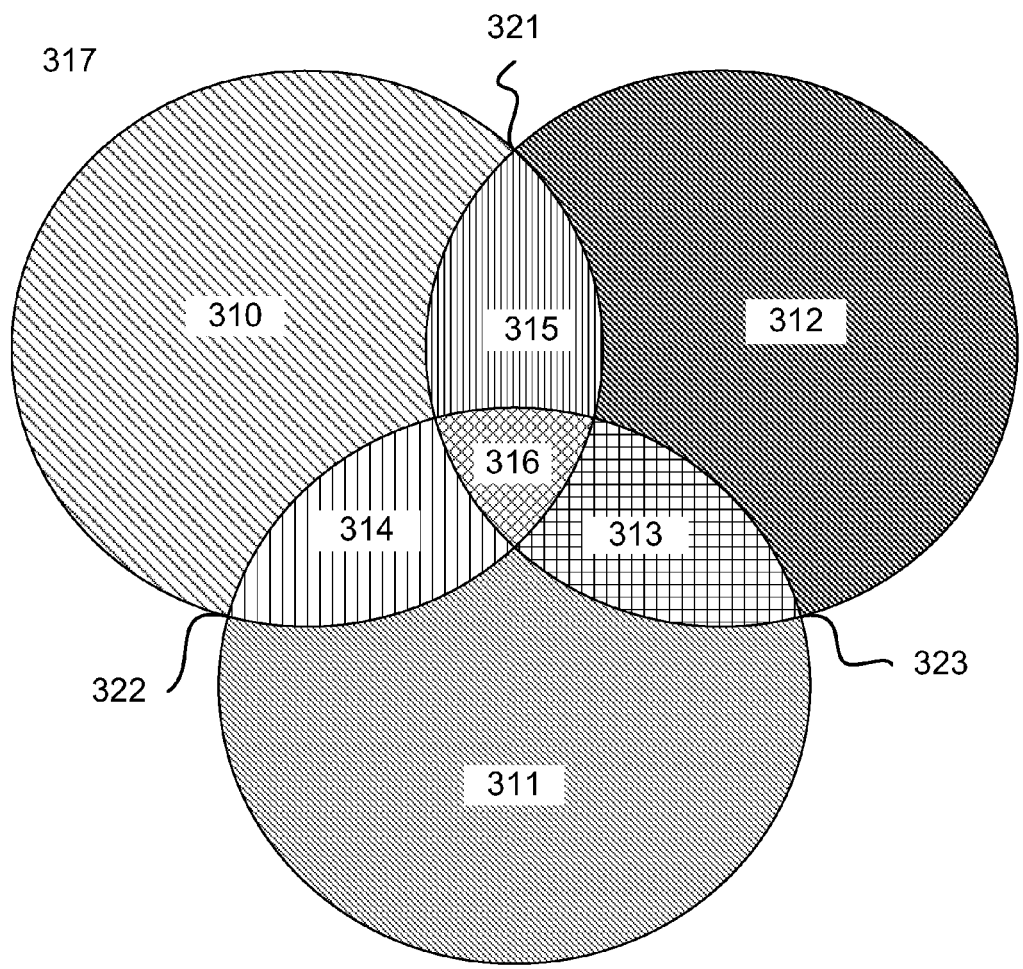

FIG. 3a is a second illustration of a set of three graphical objects 301, 302, 303 with transparency. In this example, the graphical objects are circles that overlap with partial transparency to form a Venn diagram. When composited, the light shaded circle 301 overlaps the medium shaded circle 302, which overlap the darker shaded circle 303. FIG. 3b illustrates the result of compositing the circular objects 301, 302, 303 over a background region 317 to form seven regions. Three regions 310, 311 and 312 are found where a single circle 301, 302, 303 sits over the background 317. The colour in each of these regions 310, 311 and 312 can be found by compositing the colour of the circle 301, 302, 303 with the background 317 according to the overlapping object transparency parameter. Three more regions 313, 314 and 315 are found where two circles 301, 302, 303 overlap over the background 317. Again, the colour in these regions 313, 314 and 315 can be found by compositing the colours of the objects 301, 302, 303 in the region 313, 314 and 315 together with the background colour 317. For example, the medium shaded circle 302 overlaps the dark circle 303 over the background 317 in region 313. According to the transparency model of Equation (1), compositing the back pair of layers gives (the dark circle 303 and the background 317) gives the colour channel value $C_1^{(i)}$ of the large right region 312:

$$C_1^{(i)}=(1-\alpha_{dark})C_{dark}^{(i)}+\alpha_{dark}C_{back}^{(i)}, \quad (2)$$

where $C_{dark}^{(i)}$ and $C_{back}^{(i)}$ are the colour channel values of the dark circle 303 and background 317 and $\alpha_{dark}$ is the transparency parameter of the dark circle. The transparency of the dark circle 303 may be zero in this interpretation, in which case $C_1^{(i)}=C_{dark}^{(i)}$. The colour of the large right region is composited with the medium circle, which has colour channel $C_{med}^{(i)}$ and transparency (alpha) parameter $\alpha_{med}$, to give the colour of the region 313, $C_2^{(i)}$:

$$C_2^{(i)}=(1-\alpha_{med})C_{med}^{(i)}+\alpha_{med}C_1^{(i)}. \quad (3)$$

All three circles 301, 302, 303 are overlayed in region 316, and the colour in this region 316 can be determined using the above parameters and the colour and transparency of the light coloured circle 301, $C_{light}^{(i)}$ and $\alpha_{light}$:

$$C_3^{(i)}=(1-\alpha_{light})C_{light}^{(i)}\alpha_{light}C_2^{(i)}. \quad (4)$$

Figure 4:
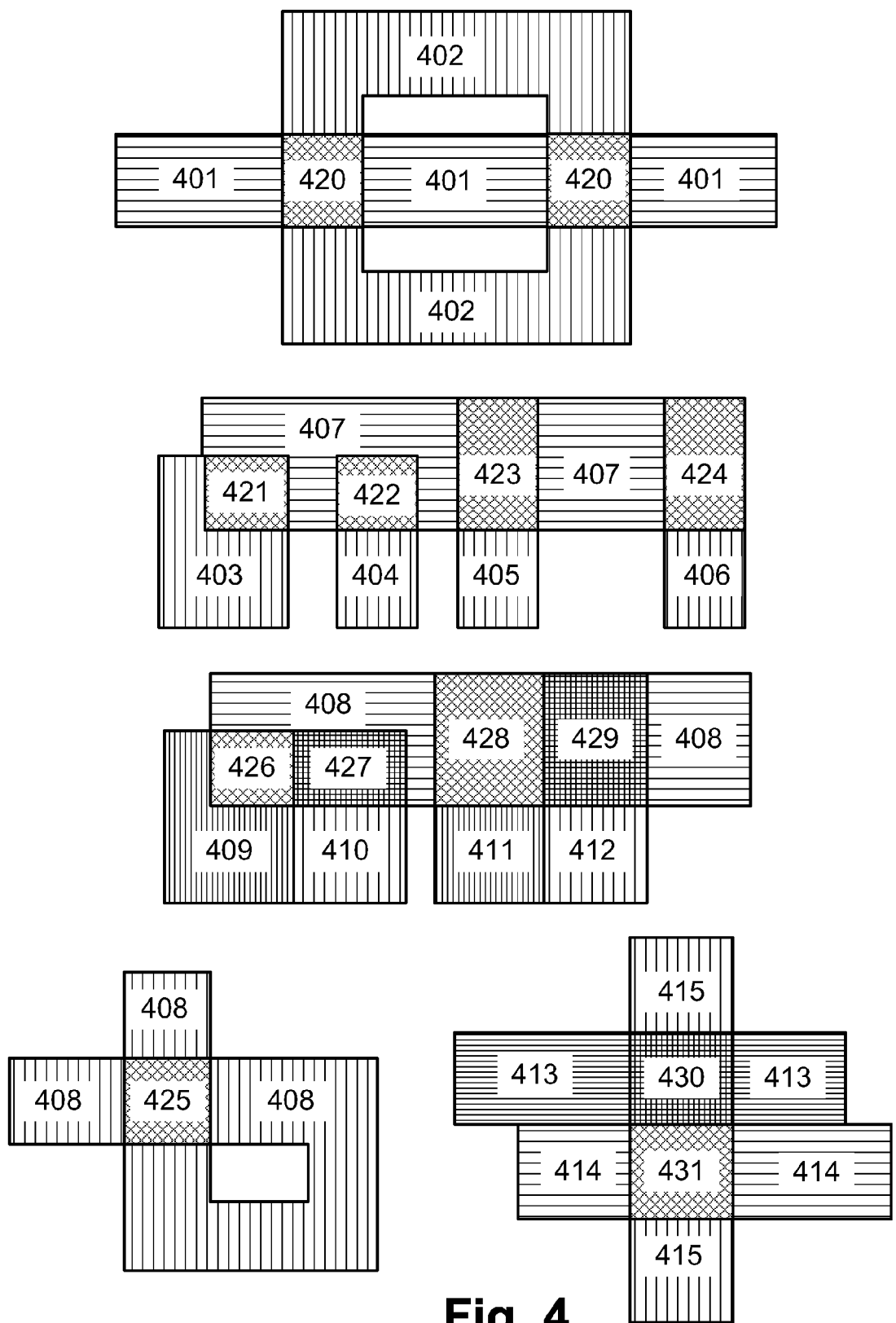
FIG. 4 is a block diagram illustrating various arrangements of layered graphical objects that overlap with partial transparency.

Many possible geometries exist for overlapping objects with partial transparency, and some of these are illustrated in FIG. 4. FIG. 4 illustrates five clusters of objects, many of which overlap. Regions 401 to 415 corresponding to a single graphical object are shown with horizontal or vertical hatching, while regions 420 to 431 corresponding to the overlap region of two graphical objects where the upper graphical object is partially transparent are shown with cross-hatching. Regions marked with the same numbering correspond to regions covered by the same object or set of objects (e.g, 401, 402, 407, 420). Such overlapping cases could be processed using embodiments of the current invention, although many structured text/graphics editing application would be unable to output objects that are not defined in terms of a single layer, such as the self intersecting object represented by regions 408 and 425.

[Generating Object Representation from Bitmap Image]

Figure 5A:
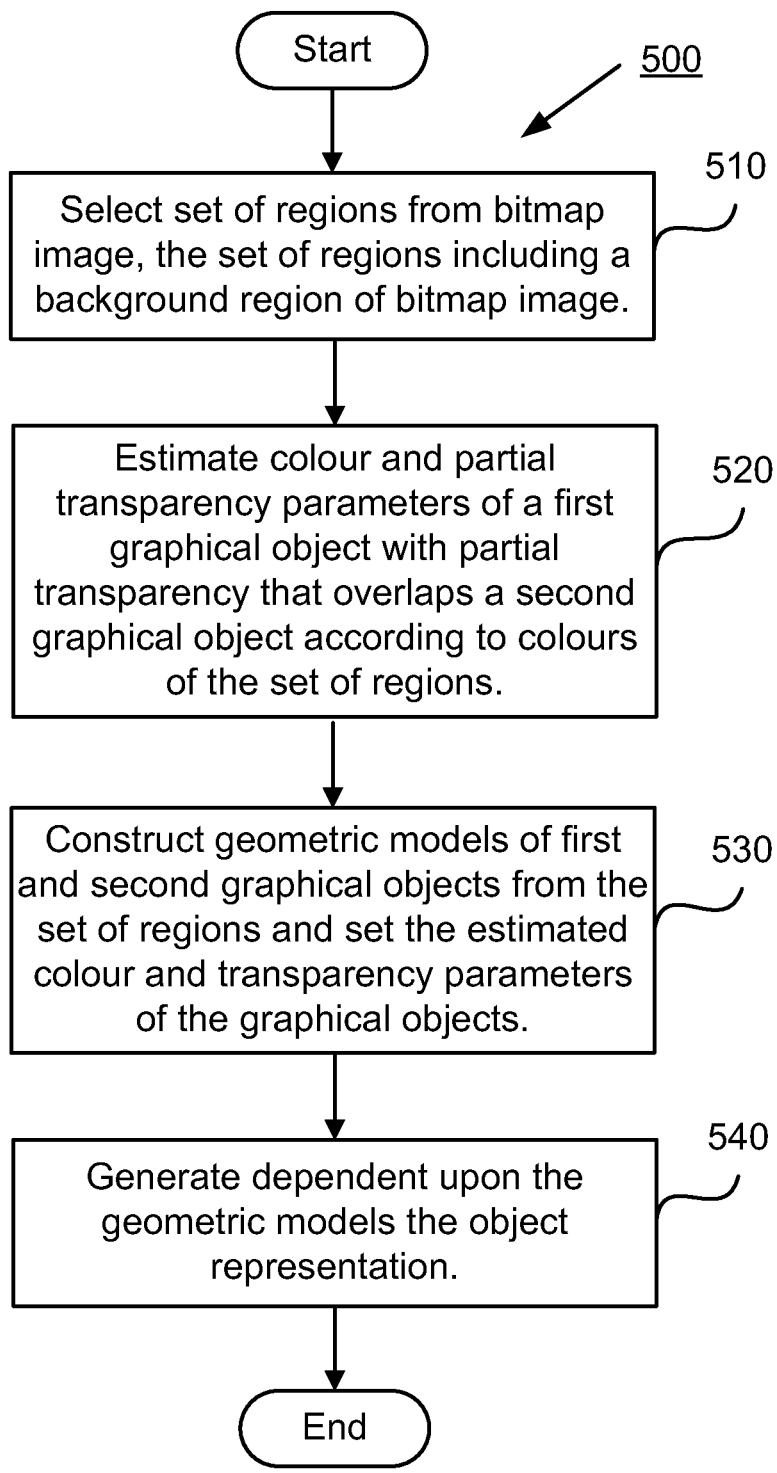
FIG. 5a is a schematic flow diagram illustrating a method of generating an object representation from a bitmap image.

FIG. 5a is a high-level flow diagram illustrating a method 500 of generating an object representation from a bitmap image. The bitmap image may be a scanned version of a document, and the object representation may be an electronic document (e.g., that may be editable). The method 500 may be implemented in the processing module 140 of FIG. 1 and can be computer-implemented. Processing commences at step 510. In step 510, a set of regions is selected using the processor 1105 from the bitmap image, and the set of regions includes a background region of the bitmap image. Details of this selecting step 510 are described in greater detail with reference to FIG. 5b hereinafter. In step 520, colour and partial transparency parameters of a first graphical object with partial transparency that overlaps a second graphical object are estimated using the processor 1105 according to colours of the set of regions. The estimated colour and partial transparency are consistent with a transparency compositing model, which defines a colour of a region of overlap of two graphical objects in terms of colour and partial transparency parameters. Geometric models of the first and second graphical objects are constructed using the processor 1105 from the set of regions and the estimated colour and transparency parameters of the first graphical object. In step 530 geometric of the models of first and second graphical objects are constructed from the set of regions and the estimated colour and transparency parameters of the objects are set. In step 540, the object representation is generated dependent upon the geometric models. Processing then ends.

Figure 5B:
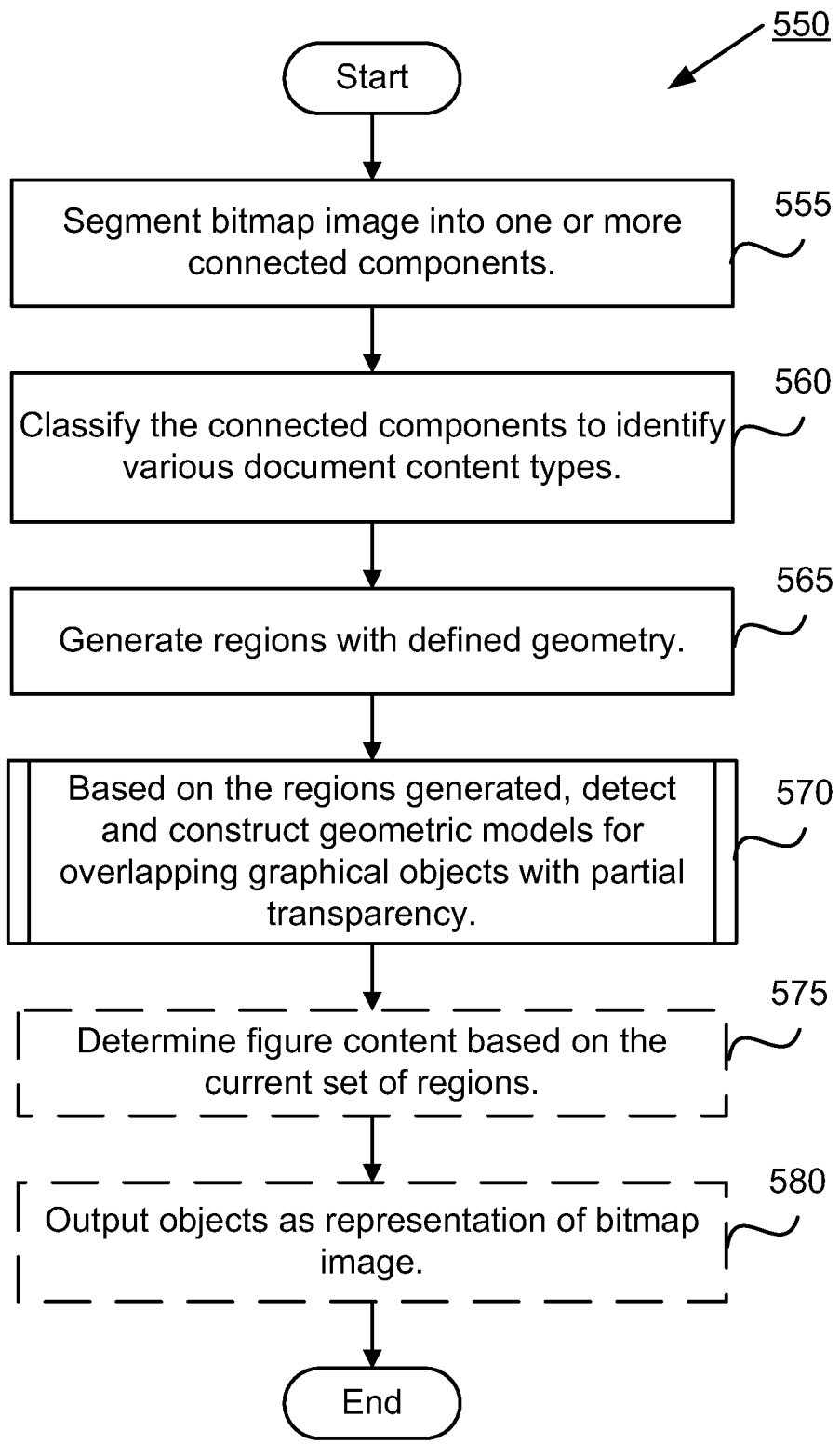
FIG. 5b is a schematic flow diagram illustrating an embodiment for processing a bitmap image.

FIG. 5b illustrates in greater detail a method 550 for processing a bitmap image (e.g, the scanned document 130 of FIG. 1) to generate an object representation (e.g., file 150 of FIG. 1). This method 550 shows in greater detail the step 510 of FIG. 5a. Steps 555, 560, 565, and 610 to 630 of step 570 implement step 510. The method 550 begins in step 555. In step 555, a bitmap image is segmented into one or more connected components. The bitmap image stored in memory 1106 undergoes low-level image segmentation by the processor 1105, which splits the image into connected components (CCs) according to colour. Each of the connected components of the bitmap image is stored in memory 1106. In step 560, the processor 1105 classifies the connected components to identify various document content types. This is done by performing a high-level document layout analysis on the connected components of the bitmap image. The connected components may be processed in terms of their rectangular bounding boxes and may be merged or grouped connected components during processing. The content types may include the following classifications: text, photographs, table, line drawings, and graphics. Each of these content types corresponds to pixel data (i.e., the connected component(s)).

Following high level document analysis, in step 565, the processor 1105 generates regions with defined geometry. This is done by analysing the connected components. Preferably, only the connected components classified as line drawing and/or graphic regions are processed in step 565, as other connected components are considered unlikely to contain figure content. Each region can be defined in terms of a single outer boundary and zero or more inner boundaries corresponding to the single outer contour and a set of zero or more inner contours of a connected component. FIG. 2c illustrates the connected component 240 corresponding to the region 210 of FIG. 2b, where the square object 203 is not overlapped by either rectangle 201 or 202. This object 240 has a single outer boundary 230 and a single inner boundary 231.

Boundaries may be represented in terms of border sections. The term border is used herein to describe a section of boundary that has a unique region adjacent along its length on each side. Each border is included in two boundaries. Simple region configurations with only two colours have closed borders like the outer border 220 of FIG. 2b, which defines the boundary 230 of the connected component 240 in FIG. 2c. On the other hand, in more complex region configurations with more than two colours, the borders may be open sections that are linked together to construct boundaries. For example, the overlaid set of objects shown in FIG. 2b results in five small square regions 211 to 215, for which there are eight borders represented by the lines 221 to 228. A closed boundary is constructed around the outside of each region. For example, the outer boundary of the small upper rectangle 215 can be constructed using borders 228 and 221, while that of the small central rectangle 213 can be constructed from the borders 221, 227, 225, then 223. The inner boundary 231 of the large region 240 of FIG. 2c can also be constructed using the borders 228, 222, 224, then 226.

Techniques exist that generate polygon representations for the borders representing a set of regions such that the polygon representations are an efficient representation with no self or cross intersections. The points along the borders are stored in memory 1106 in a suitable data structure, and the boundaries are defined in terms of these data structures. It is helpful to use a consistent ordering scheme for successive points on the boundaries—in the described embodiments the outer boundaries form clockwise loops when traversed in the forward direction, while the inner boundaries form anti-clockwise loops. In this scheme, the region is on the right side of its boundary when moving forwards around any boundary in the forward direction.

In step 570 of FIG. 5, based on the regions generated in step 565, geometric models for overlapping graphical objects with partial transparency are detected and constructed in accordance with a method 600, which is described in more detail hereinafter with reference to FIG. 6. The constructed geometric models have associated colours and transparencies. This involves the final substep of selecting regions in step 510 of FIG. 5a. The geometric model of at least one object may be output at this stage, for example, where the graphical object is freeform and cannot be classified as a particular type of figure content. Hence subsequent steps 575 and 580 are indicated as optional steps.

The method 550 continues at optional step 575 (indicated by dashed lines). Step 575 determines figure content based on the current set of regions. Figure content may include template shapes, line objects, arrowheads, connectors, and other objects. This processing may employ known techniques for line and shape detection, occluded shape detection, line linking analysis, and connector analysis.

In step 580, the processor 1105 optionally (again indicated by dashed lines) outputs classified graphical objects as an object representation. The output may be in a suitable format for viewing and editing in a structured text/graphics editing applications. The processing of method 550 then ends.

[Detecting & Constructing Geometric Models]

Figure 6:
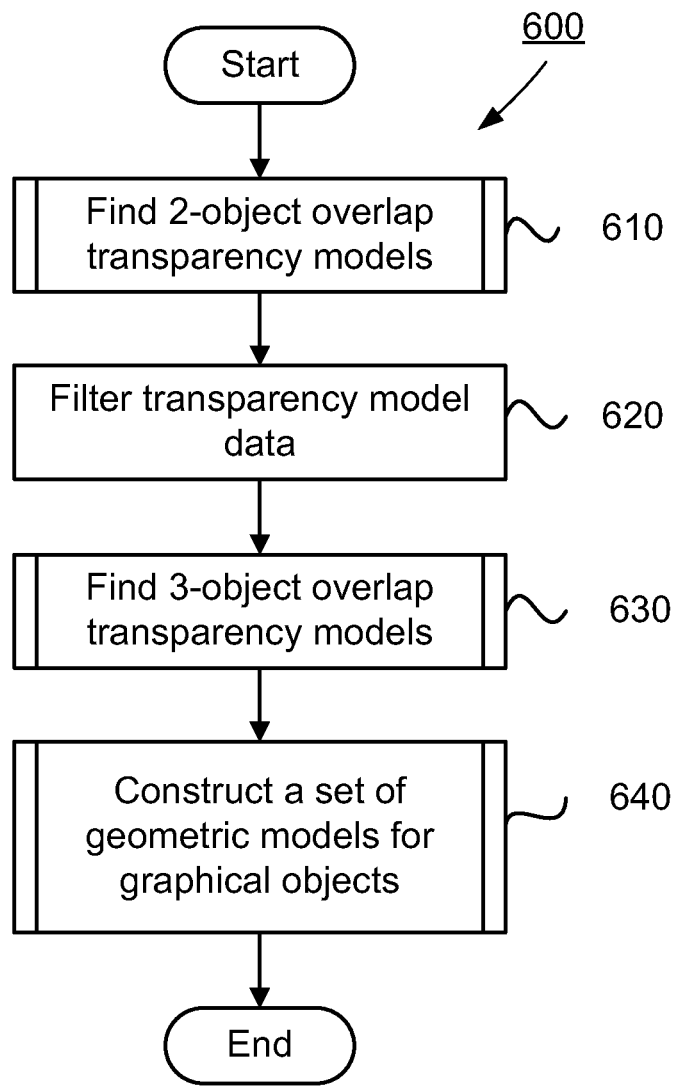
FIG. 6 is a schematic flow diagram illustrating a method of detecting and constructing overlapping graphical objects with partial transparency.

FIG. 6 illustrates a method 600 to detect and construct geometric models for overlapping objects with partial transparency that might be used during steps 510, 520 and 530 of FIG. 5a and step 570 of FIG. 5b. Processing commences at step 610. In step 610, a set of transparency models, each corresponding to a region of overlap of a pair of graphical objects, is found and stored in memory 1106 in accordance with a method 700 that is described hereinafter with reference to FIG. 7. In this embodiment, a transparency model for a region is stored in a data structure that includes the following parameters:

upper layer colour channel value ($C_{upper}^{(i)}$) and transparency parameter ($\alpha_{upper}$) corresponding to the upper graphical object (of the overlapping pair of objects);

lower layer colour channel value ($C_{lower}^{(i)}$) corresponding to the lower graphical object;

background colour channel value ($C_{back}^{(i)}$);

an upper border, corresponding to a border between the region of the model and a region that might form part of the upper graphical object;

a lower border, corresponding to a border between the region of the model and a region that might form part of the lower graphical object;

an error parameter that quantifies the quality of the model.

The detection process 700 does not check the consistency of the models found in adjacent regions, and so filtering of transparency model data is performed in step 620. Each region for which a transparency model was detected is checked in turn. The regions on the opposite side from this region on the upper and lower borders of the transparency model are tested to see if the regions also have a transparency model. If either does, the transparency model is marked for deletion and is deleted after all the regions have been processed. FIG. 4 illustrates some adjacent regions for which transparency models might be detected. The models for both regions 426 and 427 share a border, but that border is not the upper or lower border of either region's transparency model, which would be the borders between regions 408 and 426, 409 and 426, 408 and 427, and between 410 and 427. The same is true for regions 428 and 429 and for regions 430 and 431.

Once the filtering of transparency models is complete, a set of transparency models corresponding to regions of overlap of three graphical objects with partial transparency is found and stored in memory 1106 at step 630 in accordance with a method 800 that is described hereinafter with reference to FIG. 8. In step 640, a set of geometric models for graphical objects corresponding to the transparency models is constructed in accordance with a method 900 that is described hereinafter with reference to FIG. 9. Processing in method 600 then ends.

Figure 7:
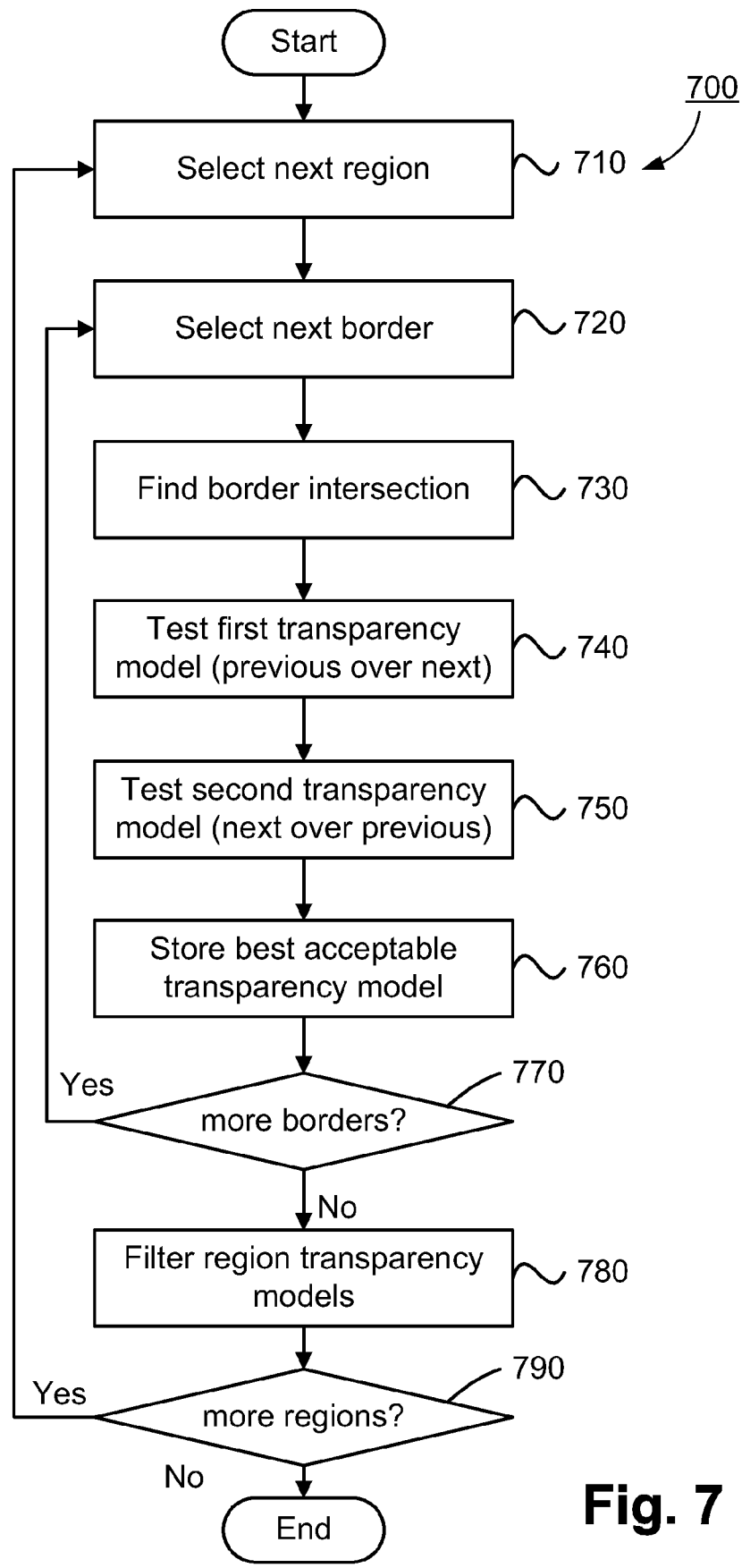
FIG. 7 is a schematic flow diagram illustrating a method for finding a set of transparency models corresponding to regions of overlap of pairs of graphical objects.

FIG. 7 illustrates a processing method 700 for finding a set of transparency models corresponding to regions of overlap of pairs of graphical objects that may be used at processing step 610 of FIG. 6. Processing commences at step 710. In step 710, the next region is selected. That is, each region selected for processing according to step 560 of FIG. 5b for transparent object processing is selected in step 710. In step 720, the next border is selected. Each border section of the region outer boundary is selected in turn. As discussed hereinbefore, the boundary is preferably oriented such that the region is on the right hand side. In alternative embodiments, the borders on the inner boundaries may also be processed, but these are less likely to result in useful transparency models. In the preferred embodiment, short border sections (e.g. those of length less than 2 pixels at 300 dpi) are not processed and are not selected at this step.

In step 730, a border intersection is found. Step 730 finds a border intersection at the end of the border section along the direction of the boundary. A border intersection is a pair of successive borders along the boundary of the current region based on which a transparency model can be evaluated. For example, if the current region corresponds to the central small square region 213 in FIG. 2b and the current border is on the left side 223, the second border of the border intersection is along the top of the region 221. A simple method of finding the border intersection is to take the next border on the boundary according to the boundary data structure. This method may fail however when a short border section exists due to noise or as an artifact of the processing of the image to generate objects. In this case, an alternative method is to select the next border along the boundary that is longer than a threshold (e.g. 2 pixels at 300 dpi) but that is not too far along the boundary (say less than a second threshold of 5 pixels at 300 dpi).

Processing then continues to step 740. In step 740, the first transparency model (previous over next) is tested. Step 740 tests a transparency model that assumes that the first border is adjacent to a region that might form part of a partially transparent object in an upper layer, the second border is adjacent to a region that might form part of a graphical object in a lower layer, and the two objects overlap over the current region and are surrounded by a common background. In the example of FIG. 2b discussed hereinbefore, where the region being processed corresponds to the central square 213 and the two borders 223 and 221 are on the left and at the top, respectively, then the adjacent regions correspond to the left and upper small square regions 211 and 215.

A background or parent region is selected for each of these regions. Various techniques are known in the art for selecting a background region and one suitable method finds the smallest region on the page with a different colour and with a bounding box that completely encloses the given region. For the example shown in FIG. 2b, all of the small objects share the same parent or background object, which is the large square region 210.

A number of tests may be performed to determine whether the transparency model should be rejected. Firstly, if either of the adjacent regions is the background of the current region, the model is rejected. Secondly, if either of the adjacent regions has already been classified by previous processing, for example as text, the model may be rejected. Thirdly, if the background colours for the three regions are not consistent with each other, the model may be rejected. A suitable method for testing the consistency between a pair of colours is to compute the sum of square differences in RGB space, where colour channels take values in the range [0, 255] and compare this sum to a threshold (e.g. similar colours might have a sum of square errors less than 1000).

A set of colours for the transparency model are defined as follows:

$C_{upper}^{(i)}$ are the colour channel values of the first adjacent region, assumed to be part of a graphical object with partial transparency that overlaps a second graphical object;

$C_{lower}^{(i)}$ are the colour channel values of the second adjacent region, assumed to be part of a second graphical object that is overlapped by the first graphical object;

$C_{both}^{(i)}$ are the colour channel values of the current region, assumed to be a region of overlap of the two graphical objects;

$C_{back}^{(i)}$ are the colour channel values of the background region; where the parameter (i) corresponds to the colour channels (red, green and blue in the preferred embodiment). For example, if the region being processed is the central small square 213 in FIG. 2b, $C_{upper}^{(i)}$ are the colour channel values of the small left square 211, $C_{lower}^{(i)}$ are the colour channel values of the small top square 215, $C_{both}^{(i)}$ are the colour channel values of the central small square 213, and $C_{back}^{(i)}$ are the colour channel values of the large square 210.

For an assumed transparency, α, of an upper graphical object, an estimate of the colour in the region of overlap in terms of the upper, lower and background colours is:

$$C_{est}^{(i)}\alpha = C_{upper}^{(i)} + \alpha(C_{lower}^{(i)} - C_{back}^{(i)}). \tag{5}$$

This formula essentially finds the colour channel estimate in the overlap region by shifting the colour in the region where the transparent object sits over the background according to the difference in colour between the background and a lower object scaled by the transparency. The shifting takes account of the difference in colour beneath the transparent object. Equation (5) can be derived by assuming a colour channel value of the upper graphical object without transparency, $C_{zero}^{(i)}$, and expressing the composited colour channel value over the background and lower graphical object according to the transparency compositing Equation (1) as follows:

$$C_{est}^{(i)}(\alpha) = (1-\alpha)C_{zero}^{(i)} + \alpha C_{lower}^{(i)},$$

$$C_{upper}^{(i)}(\alpha) = (1-\alpha)C_{zero}^{(i)} + \alpha C_{back}^{(i)}, \tag{6}$$

These two composited colour equations can be subtracted from each other to eliminate the colour of the upper object with zero transparency, to give Equation (5).

An error function, $E(\alpha)$, for the transparency model can be formed by clamping this estimate to the range [0, 255] and then taking a sum of square of errors:

$$E(\alpha)=\Sigma_{i=R,G,B}(\max(0,\min(255,C_{est}^{(i)}(\alpha)))-C_{both}^{(i)}. \quad (7)$$

The transparency of the upper graphical object for the transparency model, $\alpha_{upper}$, is found by minimising the error function over the range of transparency ($0 \leq \alpha \leq 1$). The error function is generally well behaved over this interval in that the error function has at most one local minimum, and the minimisation may be performed using known numerical methods for finding the bracketed minimum of a function such as Brent's method. The transparency model may be accepted and stored in memory 1106 if the error function at the minimum is smaller than a suitable threshold (e.g. 500 in the current embodiment).

Processing then continues at step 750. In step 750, a second transparency model (next over previous) is tested. Step 750 tests a transparency model that assumes that the second border is adjacent to an upper partially transparent object and the first border is adjacent to a lower object over a common background. The processing is same as that described in step 740 with the first border and first adjacent region being used as the second border and adjacent region and vice-versa, so that $C_{upper}^{(i)}$ corresponds to the second adjacent region and $C_{lower}^{(i)}$ to the first. In step 760, the best acceptable model (i.e. the model with the lowest error function score that is below the acceptance threshold, if one exists) is stored, along with the corresponding error function score using a suitable data structure in memory 1106. In the preferred embodiment, a map structure is used where the key corresponds to an index representing the region and the corresponding value is a list of transparency models found for region. The best acceptable model of the models from steps 740 and 750 is appended to the list for the current region.

In decision step 770, a check is performed to determine if there are more borders on the current region. If step 770 returns true (YES), processing continues at step 720. Otherwise, if step 770 returns false (NO), processing continues at step 780.

Step 780 filters the set of transparency models for a given region if more than one acceptable model is found. The best model for the region is selected as the model with the lowest error parameter. Each other model is checked for consistency with this best model by checking those models have consistent upper, lower and background colours and consistent transparency parameters. A suitable test for similar transparency parameters is that the models differ by less than 0.05 (or 5%) and a suitable method for comparing colours has been introduced in step 740. If all transparency models for a region are found to be consistent with the best model, the best model is accepted for the region and the other models are no longer required. If, on the other hand, one or more models are inconsistent with the best model, all the models for the region are rejected. Processing then continues at decision step 790. In decision step 790, a check is performed to determine if there are more regions to be processed. If step 790 returns true (YES), processing returns to step 710. Otherwise, if step 790 returns false (NO), the method 700 ends.

In the example of FIG. 2b, four border intersections would be found when processing region 213, the pairs being 223 and 221, 221 and 227, 227 and 225, and 225 and 223. Each should produce a consistent acceptable transparency model and the best of these is accepted and the other three are filtered out. In the example of FIG. 3b, only 3 border intersections typically produce an acceptable transparency model and these are associated with different regions. These are border intersection 321 of the small top region 315 (for which the light and dark regions 310 and 312 are adjacent), border intersection 322 of the small left region 314 (for which the light and medium shaded regions 310 and 311 are adjacent), and border intersection 323 of the small right region 313 (for which the dark and medium shaded regions 312 and 311 are adjacent).

Figure 8:
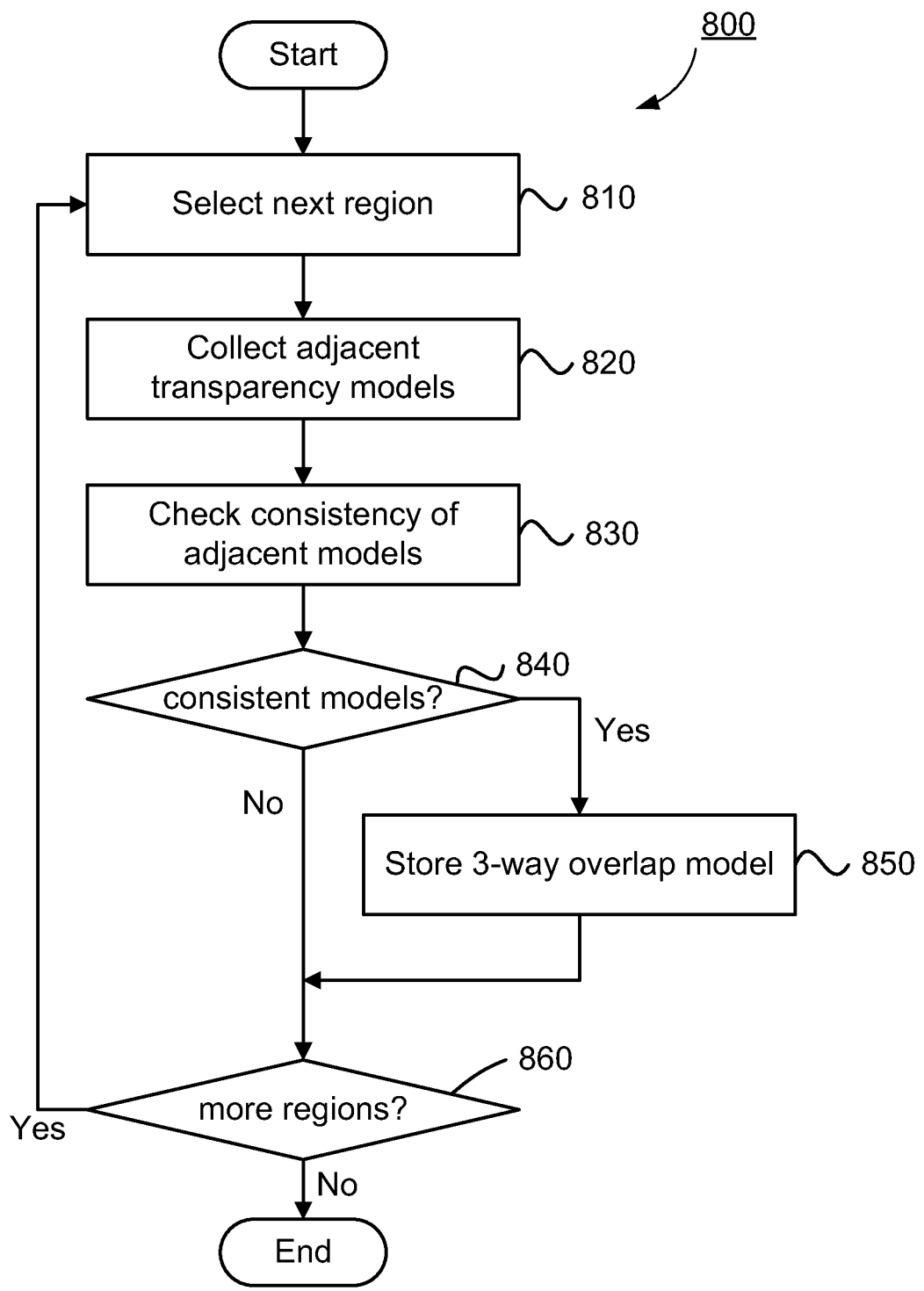
FIG. 8 is a schematic flow diagram that illustrates a processing method 800 for finding a set of transparency models corresponding to regions of overlap of sets of 3 overlapping graphical objects that may be used at processing step 630.

FIG. 8 illustrates a processing method 800 for finding a set of transparency models corresponding to regions of overlap of sets of 3 overlapping graphical objects that may be used at processing step 630 hereinbefore. In step 810, the next region is selected. Each region selected for processing at step 610 that does not have a stored transparency model is selected in turn at step 810. In step 820, adjacent transparency models are collected. A set of adjacent transparency models is formed containing the transparency model, if the transparency model exists, of each region adjacent to the current region. Adjacent regions may be efficiently found using the border data for the current region.

In step 830, the set of adjacent region models is checked for consistency with an overlap of three graphical objects with partial transparency at the current region. One method of testing the set for consistency is as follows. First, the set of models are checked pair-wise for consistency, and for any pair of consistent models, the model with the highest error function value is removed from the set. Consistent models have similar colours and transparency parameters, and the methods for testing the consistency or similarity of pairs of colours and transparency parameters described in steps 740 and 780 hereinbefore may be used. Next, if the number of transparency models in the set is not three, the models are not consistent with an overlap of three regions with partial transparency. If the number of transparency models is three, all possible orderings of the three selected models are tested further. If there exists an ordering of the transparency models where the models are assigned the indices 1, 2 and 3, such that the following conditions are all met then an overlap of three regions with partial transparency is found:

the upper colours and transparency parameters of models 1 and 2 are consistent; and the lower colours of models 2 and 3 are consistent; and the upper colour of model 3 is similar to the lower colour for model 1; and the background colour for all three models are consistent.

In decision step 840, a check is made to determine if the models are consistent (i.e., the three models meet the above conditions). If step 840 returns true (Yes), processing continues at step 850, which stores the three-way overlap model. This associates the three models selected to represent the three way overlap with the current region. This set of three transparency models associated with the region constitutes a transparency model for the overlap of three graphical objects. Processing then continues at step 860. If step 840 returns false (NO), this means the models do not meet the above conditions and processing continues directly to step 860. In decision step 860, a check is performed to determine if there are more regions to process. If step 860 returns true (YES), processing continues at step 810. Otherwise, if step 860 returns false (NO), processing ends.

For the example illustrated in FIG. 3, the small central region 316 is adjacent to three small regions 313, 314, and 315, each of which has a single transparency model. Each of these transparency models has the same background region 317, and therefore the same background colour. The small left and top regions 314 and 315 have models that share the same upper colour and transparency parameter, based on the large left region 310. The small top and right regions 315 and 313 have models that share the same lower colour, based on the large right region 312. Also, the lower colour of the small left region 314 is consistent with the upper colour of the small right region 313 as these regions 314, 313 are both based on the large lower region 311. The ordering of the models as model 1 from the small left region 314, model 2 from the small top region 315 and model 3 from the small right region 313 is consistent with a three way overlap at the small central region 316, so all three models 1, 2, 3 are associated with this region 316.

Alternative embodiments of the invention may employ similar processing methods to method 800 above to detect the overlap of four or more graphical objects at a single region.

Figure 9:
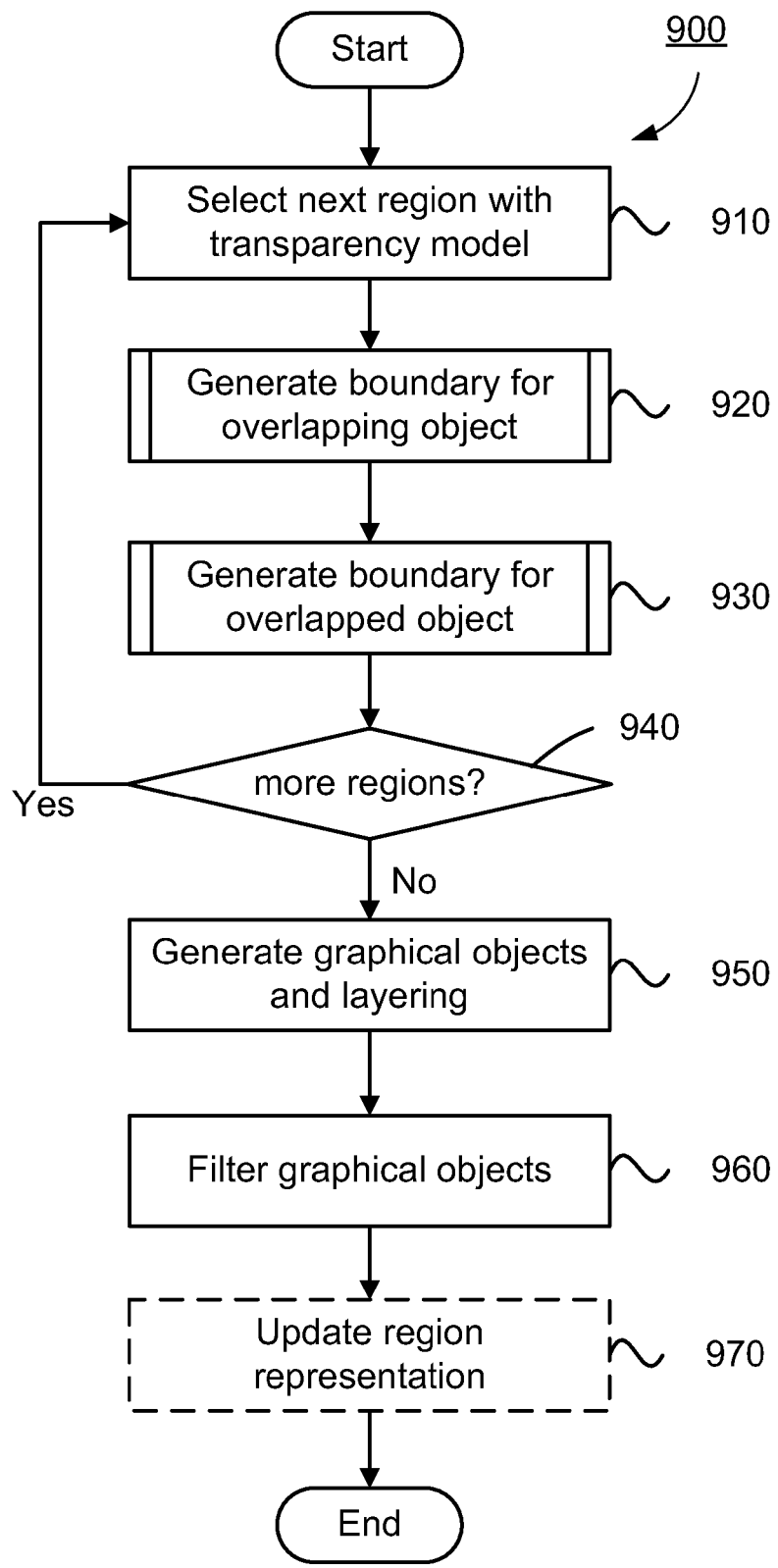
FIG. 9 is a schematic flow diagram illustrating a method of constructing graphical objects according to a set of regions and transparency models.

FIG. 9 illustrates a processing method 900 for constructing geometric and colour models for graphical objects according to a set of regions and transparency models that may be used in step 640 of FIG. 6. Processing commences at step 910. In step 910, the next region with a transparency model is selected. Each region with a single transparency model is selected in step 910. The transparency model for the region includes two borders—one corresponding to an upper graphical object and the other to a lower graphical object. The next two steps, 920 and 930, perform boundary generation according to a method 1000 that is described in detail with reference to FIG. 10. In step 920, a boundary is generated for an overlapping object. That is, if the border corresponding to an upper graphical object has not yet been used by the boundary generation method, step 920 generates a new boundary based on this border and the transparency model. In step 930, a boundary is generated for the overlapped object. That is, if the border corresponding to a lower graphical object has not yet been used by the boundary generation method, step 930 generates a new boundary based on this border and the transparency model. The constructed boundaries are created such that a new graphical object is found on its right side and consists of an ordered set of borders. In this case, if the boundary is clockwise, the boundary is the outer boundary of a constructed graphical object, while if the boundary is anti-clockwise, the boundary is an inner boundary.

In decision step 940, a check is made to determine if there are any more regions with a single transparency model. If step 940 returns true (YES), processing returns to step 910. Otherwise, if step 940 returns false (NO), processing continues at step 950. In step 950, new graphical objects from the constructed boundaries and the corresponding layering (layering information, colours and transparency parameters) are generated. Any constructed inner boundary is associated with an outer boundary if possible. This association is made when the inner and outer boundaries have a shared region on their right sides. For example in FIG. 4, two boundaries are generated that are associated with the regions 402—these boundaries are both square, the larger square being clockwise and the smaller being anti-clockwise, and these are associated together. If an inner boundary cannot be associated with an outer boundary, then the inner boundary is rejected.

A new graphical object is created for each constructed outer boundary that is defined by the outer and any corresponding inner boundaries. The relative layer of the graphical objects is such that for each pair of objects that overlap at a region with a transparency model, the object that includes the upper border is in a higher layer than the object that includes the lower border. One method of achieving this is to place all the objects as nodes in a directed graph, with a directed edge from the object with the upper border to that with the lower border. The graph should not include any cycles, as this would correspond to an inconsistency in the layering. If any cycles are found, all objects in the cycle should be rejected. Next, the maximum number of nodes included in a path following edges of the graph gives the number of distinct layers and these can be assigned to the nodes such that the set of layering requirements in the graph are met (for example by iterative stepping up and down the graph). The colour, C, and transparency parameter, α, of the graphical object are set according to the values returned for the generated outer boundary in either step 920 or 930.

In step 960, the set of graphical objects are filtered. The filtering is done to make sure that the graphical objects are consistent by checking each region with a transparency model in turn. If a graphical object has been generated that includes a boundary with the lower border of a transparency model, there must also be a graphical object that includes a boundary with the upper border of the same transparency model. If only one such graphical object has been generated (i.e. with the lower border but not the upper border or vice-versa), that graphical object must be rejected. The filtering process is repeated until no further graphical objects are rejected, and all remaining graphical objects are accepted. Next, at the optional step 970, the region representation of the page and the borders may be updated. All borders used in the generation of the accepted set of new graphical objects are updated so that the borders are adjacent to the graphical object, and the region that was previously adjacent to the border is discarded. In certain circumstances, a border section can be used more than once in the set of accepted graphical objects such that one side of the border could map to either object. In this case, the border section is typically short and the mapping can be made to either object. Processing then ends.

Figure 10:
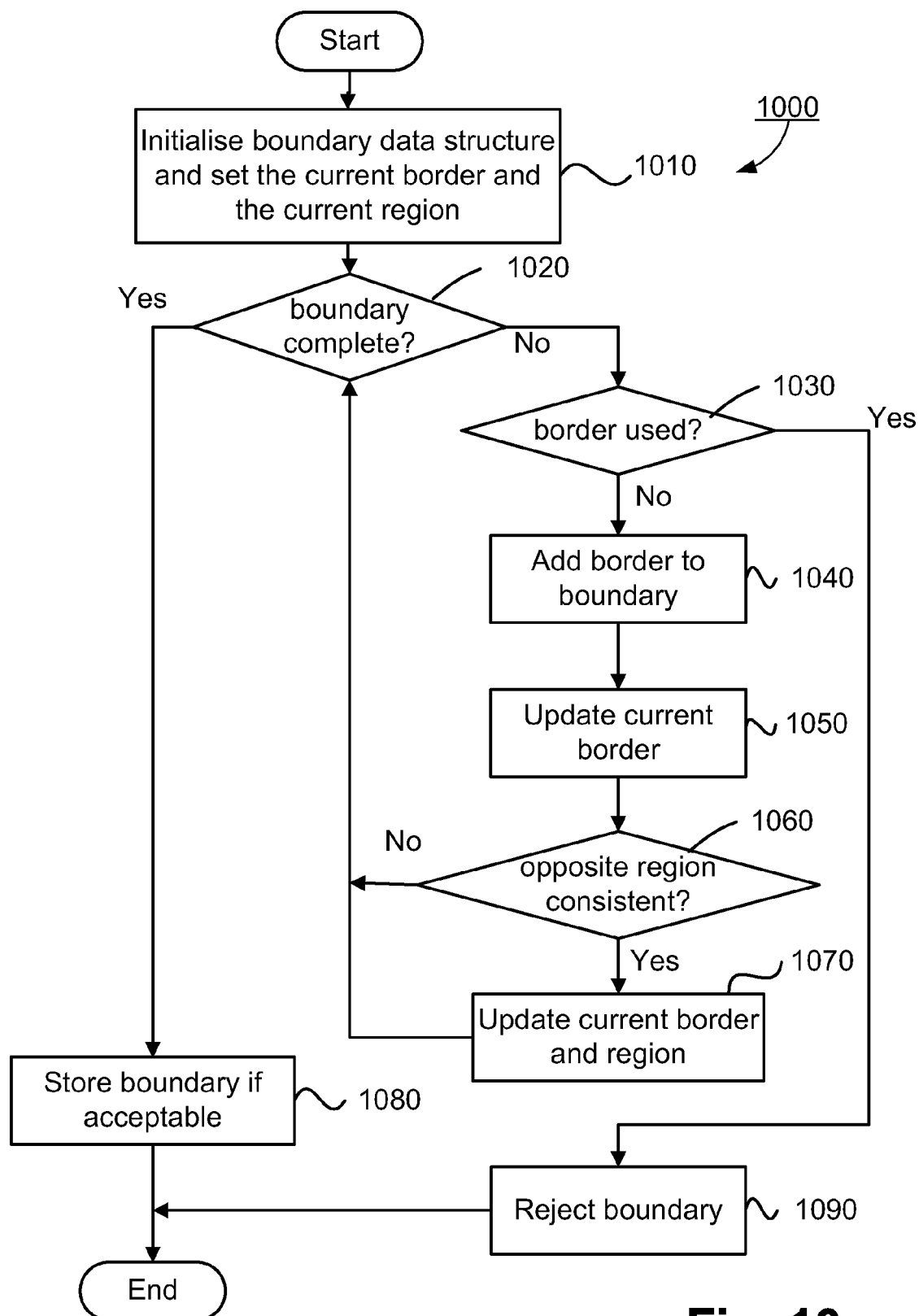
FIG. 10 is a schematic flow diagram illustrating a method of generating a graphical object according to a set of transparency models starting at a given border.

FIG. 10 illustrates a processing method 1000 for generating a boundary for a new graphical object that may be used in steps 920 and 930 of FIG. 9. The method 1000 is provided with a border and a transparency model. Processing commences at step 1010. Step 1010 initialises a data structure for storing the generated boundary in memory 1106 and sets the current border to the provided border and the current region to the region given in the provided transparency model (i.e. the region for which the transparency model was generated). The current border is oriented such that the current region is on the right side of the border, that is to say the current border is oriented along a boundary of the current region. An object model is also set according to the provided data that stores the following data:

$C_{obj}^{(i)}$, the object colour channel values, and $α_{obj}$, the object transparency, and $C_{back}^{(i)}$, the background colour channel values for the graphical object.

If the provided border is a lower border, the object model has an object colour, background colour and object transparency set according to the upper colour, background colour and transparency of the provided transparency model. Otherwise if the provided border is an upper border, the provided border has an object colour and background colour set to the lower colour and background colour from the provided transparency model and an object transparency of zero. The reason that an upper border takes a model colour according to the lower colour of the model is that the border has the upper object adjacent to upper border at the current region but forms part of the boundary of the lower graphical object.

In decision step 1020, a check is performed to determine if the (generated) boundary is complete. A boundary is considered complete if the boundary is closed (its first and last points are identical) or if the boundary includes any border more than once. If the generated boundary is complete (YES), processing continues at step 1080. In step 1080, the boundary is stored if acceptable. Step 1080 is described in greater detail hereinafter. Processing then ends. Otherwise, if decision step returns false (NO), processing continues at step 1030. In decision step 1030, a check is performed to determine if the current border has been used. The check determines if the current border has been used in boundary generation and has been used in a transparency model that has been detected at step 610. If both of these conditions are met (YES), processing continues at step 1090. In step 1090, the boundary is rejected. This latter control prevents the generation of multiple copies of the same boundary. Processing then ends.

Otherwise, if decision step 1030 returns false (NO), processing continues at step 1040. In step 1040, the border is added to the boundary. In step 1050, the current border is updated. That is, the current border is updated to the next border along the boundary of the current region after the current border.

In decision step 1060, a check is made to determine if the opposite region is consistent. That is, the region on the opposite side of the new current border to the current region (referred to as the opposite region) is found and checked for consistency with the object model (i.e. checked to see if the opposite region should be part of the current graphical object). If the opposite region has already been classified by previous processing, for example as text, the opposite region may be considered to be not consistent. Otherwise, if the opposite region does not have a transparency model associated with the opposite region, the opposite region is considered consistent if its colour is the same as the object colour of the object model. If the opposite region has one or more transparency models associated with the opposite region, a consistency check is performed for each model, referred to as the opposite model, in turn. One suitable consistency check is to test whether any of the follow conditions are met:

1. the lower colour of the opposite model is consistent with the object colour of the object model, or
2. the upper colour of the opposite model is consistent with the object colour of the object model and the object transparency of the object model is zero, or
3. the upper colour and transparency of the opposite model are consistent with the object colour and object transparency of the object model.

If any of the above conditions are met, and the background colour of the opposite model is consistent with the background colour of the object model, the opposite region is consistent with the object model. Suitable methods for testing the consistency of pairs of colours and transparency parameters were described in the steps 740 and 780.

If decision step 1060 returns true (YES) indicating the opposite region is consistent with the object model, processing continues at step 1070. In step 1070, the current border and region are updated. That is, step 1070 updates the current region to the opposite region, finds the current border on a boundary of the opposite region, and updates the current border to the next border along that boundary. Processing then returns to step 1020. Otherwise, if decision step 1060 returns false (NO) indicating that the opposite region is not consistent with the object model, processing returns directly to step 1020.

If the current boundary is considered complete at step 1020, processing continues at step 1080. Step 1080 checks if the boundary is acceptable (i.e. is closed and has not self intersections) and stores the boundary along with colour and transparency data if the boundary is. The transparency data stored is that of the object model, while the colour stored, $C_{store}^{(i)}$, is the colour that would produce the object colour of the object model, $C_{obj}^{(i)}$, when placed over the object model background colour, $C_{back}^{(i)}$, with the object model transparency, $\alpha_{obj}$. According to the transparency Equation (1), this means that:

$$C_{obj}^{(i)} = (1 - \alpha_{obj})C_{store}^{(i)} + \alpha_{obj}C_{back}^{(i)}. \quad (8)$$

Rearranging this equation gives a suitable colour channel estimate for storage:

$$C_{store}^{(i)} = \frac{C_{obj}^{(i)} - \alpha_{obj}C_{back}^{(i)}}{(1 - \alpha_{obj})}, \quad (9)$$

which means that the stored colour estimate is given by the difference between the object colour and the background colour scaled by the object transparency divided by one minus the object transparency. This completes the processing of method 1000.

For the example illustrated in FIG. 2, only one region, the central small square 213, should have a transparency model associated with that region. The transparency model may have been created with the left and top borders 223 and 221 as lower and upper borders respectively. A boundary can be generated starting with a current border given by the upper border of the transparency model (the top border 221) and with an object model with colour given by the lower colour of the transparency model (i.e. the colour of the left square region 211) and zero transparency. The processing of method 1000 stores this border in the boundary and iterates forward to the next border of the central square region 213, which is the border on the right 227. The opposite region is then the right square 214, which has a colour that is consistent with the object model since the left and right squares are the same colour. The current region is then updated to the right region, and the current border is updated to the next border on this region, that is the top/right/bottom border 226 of the right square 214. The boundary is not closed, so this current border is added to the boundary and updated to the next border on the current region, the left border 227 of the right square. The opposite region is now the central square 213, which again is consistent with the object model, so the region is updated to the central square and the current border iterated forward along the boundary of this region to the bottom border 225. This current border is added to the boundary, and subsequent processing adds the bottom/left/top border 222 of the left region 211 to complete the boundary. Similarly, an upper object can be generated starting at the lower border of the transparency model, that is the left border 223 of the central square 213, and including the left/top/right border of the top square 228, the right border 227 of the central square 213 and the right/bottom/left border 224 of the bottom square 212. The object model for this boundary generation is initially given by the upper colour, background colour, and transparency parameter from the central square region transparency model.

For the example illustrated in FIG. 3, there are three small regions with one transparency model each 313, 314, and 315 and one central region 316 that would be found to be a 3 way overlap and would have all three of these models. Three clockwise constructed circular boundaries are formed, each of which takes borders from one large region with no transparency model, two regions with a single transparency model and the central region. For example, a geometric model for the medium shaded circle 302 is constructed from the top border of the small left region 314, the upper border of the small central region 316, the upper border of the small right region 313 and finally the bottom border of the large bottom region 311. The colour and transparency of this object are based on the upper colour and transparency of the transparency model of the small right region 313. Geometric models are also created for the light and dark shaded circles, and the object model for the dark shaded circle 303 would have zero transparency since the constructed graphical object sits over the background region but does not partially overlap any other object.

Further Embodiment

A further embodiment is described hereinafter that involves determining the transparency of objects from a bitmap image, but with the complication that there is at least one line around an object. By removing the line, the techniques of the above embodiments can be used to determine the colour and transparency of the objects. This embodiment can handle the case of graphical objects overlapping with partially transparent fills, where one or more of the objects has a line style. Regions corresponding to the line style are found around the regions that correspond to the fills of the graphical objects. These line regions can alter the adjacency of the fill regions such that the hereinbefore described method is unable to detect the overlap of the graphical objects. This further embodiment handles the line styles by altering the set of regions such that the adjacency of the fill regions is recovered and the overlap can be detected.

FIG. 13 illustrates a set of graphical objects that overlap with transparency where one object has a solid line style. Graphical object 1310 of FIG. 13a is a vertically-oriented elongated rectangle with a partial transparency. Graphical object 1311 is a horizontally-oriented elongated rectangle (lengthwise perpendicular in orientation to the rectangle 1310) with zero transparency. Graphical object 1312 is a large square with zero transparency. The horizontally-oriented rectangle 1311 has a solid line style shown by the diagonal striped region 1314 that surrounds a filled region shown by the vertical striped region 1313. FIG. 13b illustrates the result of layering the objects such that the vertical rectangle 1310 overlaps the horizontal rectangle 1311, which overlaps the square 1312. The square effectively forms a background for the overlap of the two rectangles. Ten regions 1320 to 1329 are formed from the composited objects as depicted in FIG. 13b. FIG. 13c illustrates the ten regions 1320 to 1329 separately.

Region 1320 is the region covered only by the square 1312. Regions 1325 and 1329 represent the regions covered by both the horizontal rectangle fill 1313 and the square 1312. Since the horizontal rectangle has zero transparency, the square 1312 is completely occluded and the colour of the regions is the same as the fill of the horizontal rectangle 1313. Similarly, regions 1321 and 1324 represent the regions covered by both the line of the horizontal rectangle 1314 and the square 1312. Since the horizontal rectangle has zero transparency, the square 1312 is completely occluded and the colour of the regions is the same as the rectangle line 1314.

Regions 1322 and 1327 represent the regions covered by both the vertical rectangle 1310 and the square 1312. Since the vertical rectangle 1310 has partial transparency, the colour of the regions 1322 and 1327 can be determined according to a transparency model in terms of the colours of the square 1312 and the rectangle 1310. For the model defined by Equation (1), this would be calculated by substituting the colour channels of the vertical rectangle for $C_{upper}^{(i)}$, the colour channels of the background square as $C_{lower}^{(i)}$ and transparency parameter of the vertical rectangle as $\alpha_{upper}$. Finally, the regions 1323, 1326 and 1328 represent the region covered by all three objects. Since the horizontal rectangle 1311 is opaque and completely occludes the square 1312 over the regions 1323, 1326 and 1328, the colours of the regions do not depend on the colour of the square. The colours of the regions 1323, 1326 and 1328 can be determined according to a transparency model in terms of the colours of the two elongated rectangles 1310 and 1311. Regions 1323 and 1328 correspond to the overlap of the vertically elongated rectangle 1310 with the solid line of the horizontal rectangle 1314. Region 1326 corresponds to the overlap with the fill of the horizontal rectangle 1313.

Figure 14:
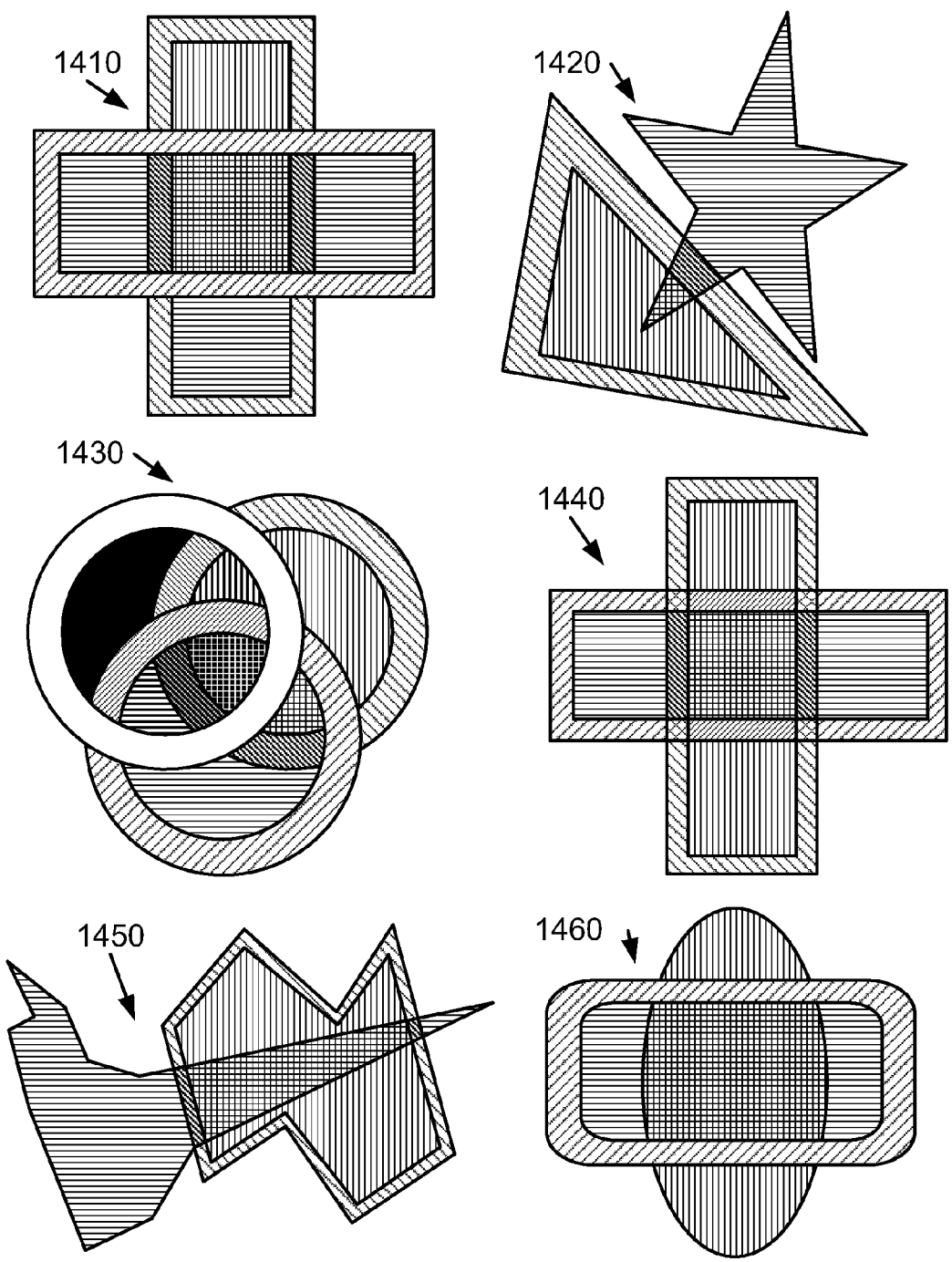
FIG. 14 is a diagram illustrating various arrangements of layered graphical objects that overlap with partial transparency.

FIG. 14 illustrates a number of different geometries for overlapping graphical objects with lines and transparent fills, including various objects defined by a template shape (rectangle, triangle, star, circle, ellipse, rounded cornered rectangle) and others that were defined by hand rather (referred to as freeform objects). Each object is constructed from a mix of straight and curved edges. Most geometries show two overlapping objects, however one shows three. All objects have a fill which may have a partial transparency and some objects have a line, which in most cases is opaque (zero transparency) with the exception of the case of the horizontally elongated rectangle in 1440 for which the line has a partial transparency. The background regions are not shown explicitly in this figure.

Overlapping graphical objects 1410 comprise two overlapping rectangles, each of which has an opaque line style, and the upper one (horizontally elongated) has a partially transparent fill. Overlapping graphical objects 1420 comprise a partially transparent star overlapping a triangle with a line style and fill. Overlapping graphical objects 1430 comprise three circles, each of which has an opaque line style, and the upper two circles have a partially transparent fill. Overlapping graphical objects 1440 comprise two overlapping rectangles, each of which has a line, and the upper one has partially transparent line and fill styles. Overlapping graphical objects 1450 comprise a freeform object with a partially transparent fill overlapping a second freeform object with a line and fill. Overlapping graphical objects 1460 comprise a round cornered rectangle with a line and a partially transparent fill overlapping an ellipse.

Table 1 contains definitions of colour regions in FIG. 14, as shown in key at the bottom of FIG. 14.

TABLE 1

| Ref | Shading style | Construction of colour of region |
| --- | --- | --- |
| 1480 | Horizontal stripes | Layer 2 fill over background with partial transparency |
| 1481 | Bold horizontal stripes | Layer 1 fill over layer 2 fill over background with partial transparency in both layers 1 and 2 |
| 1482 | Vertical stripes | Layer 3 fill only |
| 1483 | Bold vertical stripes | Layer 1 fill over layer 3 fill with partial transparency |

TABLE 1-continued

| Ref | Shading style | Construction of colour of region |
|---|---|---|
| 1484 | Solid black | Layer 1 fill over background with partial transparency |
| 1485 | Horizontal and vertical cross-hatching | Layer 2 fill over layer 3 fill with partial transparency |
| 1486 | Inverted horizontal and vertical cross-hatching | Layer 1 fill over layer 2 fill over layer 3 fill with partial transparency in both layers 1 and 2 |
| 1487 | Solid white | Layer 1 line |
| 1488 | Wide diagonal stripes (up and right) | Layer 2 line (or layer 2 line over background with partial transparency for case 1440). |
| 1489 | Narrow diagonal stripes (up and right) | Layer 2 line over layer 3 fill with partial transparency |
| 1490 | Wide diagonal stripes (down and right) | Layer 3 line |
| 1491 | Narrow diagonal stripes (down and right) | Layer 1 fill over layer 3 line with partial transparency |
| 1492 | Bold narrow diagonal stripes (down and right) | Layer 2 fill over layer 3 line with partial transparency |
| 1493 | Inverted narrow diagonal stripes (down and right) | Layer 1 fill over layer 2 fill over layer 3 line with partial transparency in both layers 1 and 2 |
| 1494 | Diagonal cross hashed | Layer 2 line over layer 3 line with partial transparency |

The key in FIG. 14 can be used to interpret the shading scheme, which defines the construction of each region colour according to Table 1. There are assumed to be three layers with object: layer 1 being the top layer, then layer 2, and then layer 3. Regions with different shading styles may nonetheless have the same colour—for example the line colour of lines of the two overlapping rectangles of 1410 may be the same colour. In this case, there may a single connected component representing the regions with wide angled stripes (1488 and 1490).

Other possible geometries for the overlap of graphical objects with partial transparency were illustrated in FIG. 4 for graphical objects. These objects did not have line styles. Similar overlapping object geometries for which some or all of the objects have a line style can be processed using embodiments of the invention.

Figure 15A:
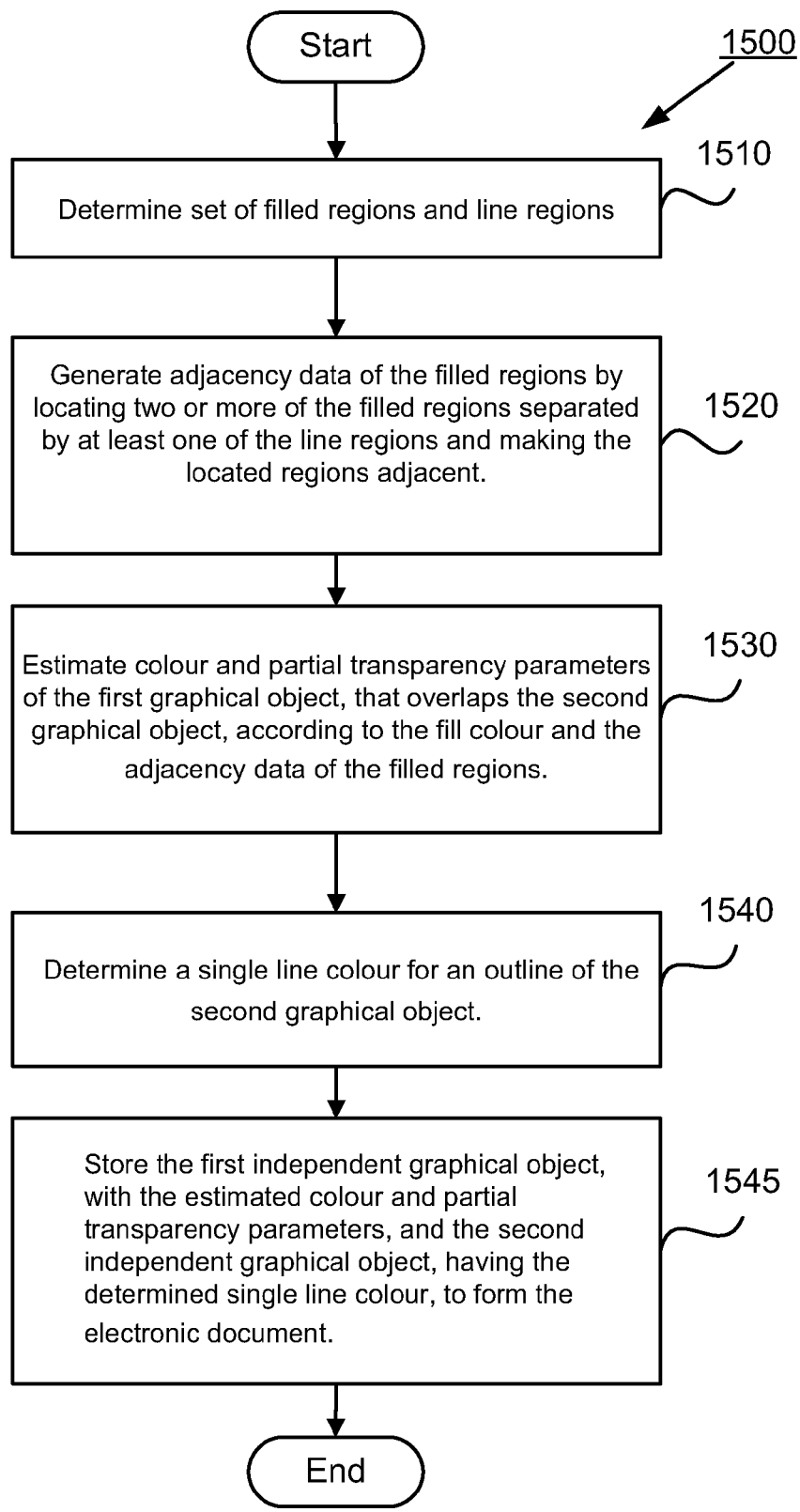
FIG. 15a is a schematic flow diagram illustrating a method of generating an object representation from a bitmap image.

FIG. 15a is a high-level flow diagram illustrating a method 1500 of generating an object representation from a bitmap image. The bitmap image may be a scanned version of a document, and the object representation may be an electronic document (e.g., that may be editable). The method 1500 may be implemented in the processing module 140 of FIG. 1 and can be computer-implemented. Processing commences at step 1510. In step 1510, a set of regions is determined (selected) using the processor 1105 from the bitmap image, and the set of regions includes a background region of the bitmap image, filled regions and line regions. Details of this determining step 1510 are described in greater detail with reference to FIG. 15b hereinafter. In step 1520, adjacency data of the filled regions is generated using the processor 1105 by locating filled regions separated by line regions and making the located regions adjacent.

In step 1530, colour and partial transparency parameters of a first graphical object with partial transparency that overlaps a second graphical object are estimated using the processor 1105 according to fill colours and adjacency data of the set of filled regions. The estimated colour and partial transparency are consistent with a transparency compositing model, which defines a colour of a region of overlap of two graphical objects in terms of colour and partial transparency parameters. Geometric models of the first and second graphical objects are constructed using the processor 1105 from the set of regions and the estimated colour and transparency parameters of the first graphical object. In step 1540, a single line colour is determined using the processor 1105 for an outline of the second graphical object. This may be done based on at least the line colour of one of the line regions. In step 1545, the first independent graphical object, with the estimated colour and partial transparency parameters, and the second independent graphical object, having the determined single line colour, are stored to form the electronic document. Processing then ends.

Figure 15B:
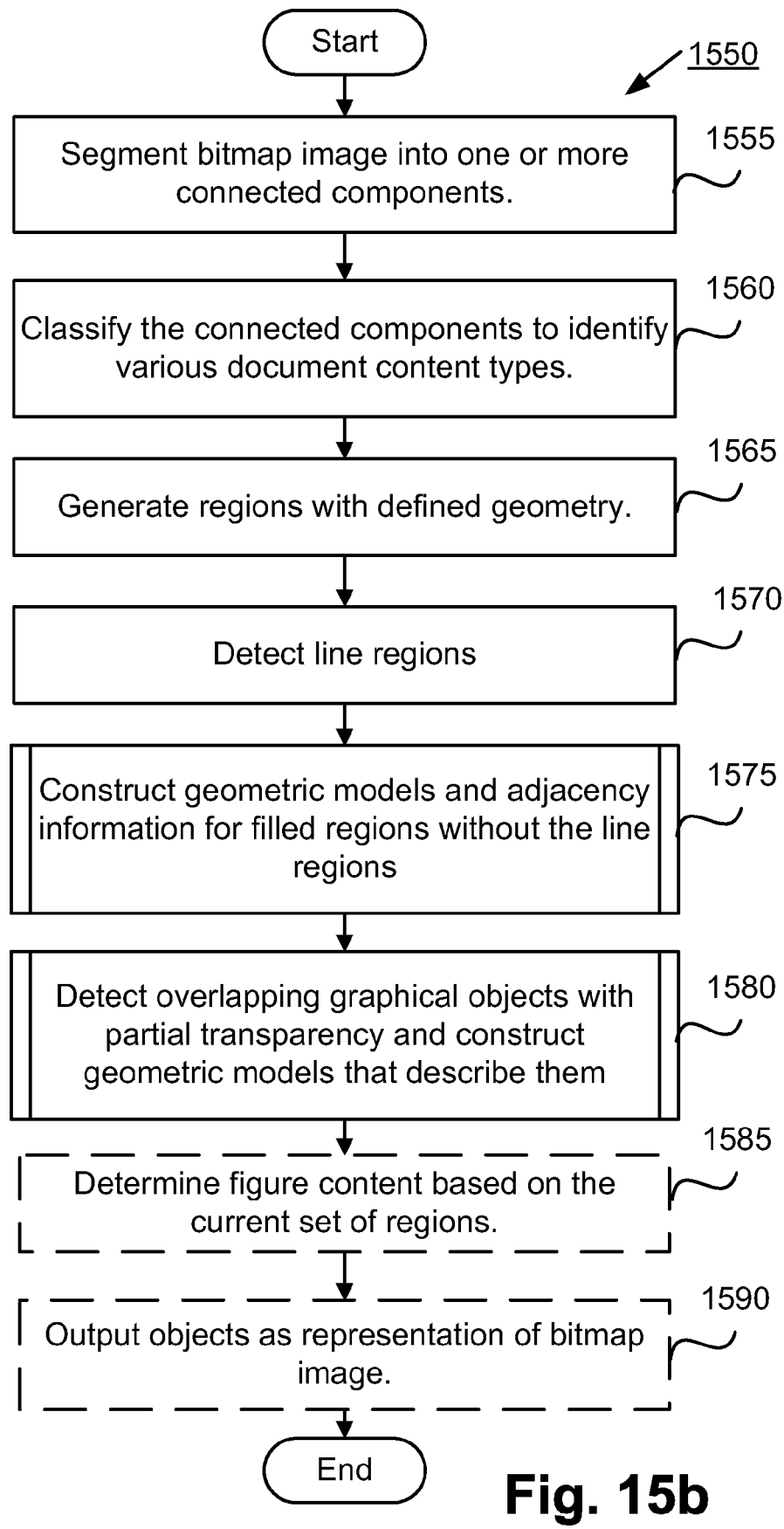
FIG. 15b is a schematic flow diagram illustrating an embodiment for processing a bitmap image.

FIG. 15b illustrates in greater detail a method 1550 for processing a bitmap image (e.g, the scanned document 130 of FIG. 1) to generate an object representation (e.g., file 150 of FIG. 1). The method 1550 shows in greater detail the step 1510 of FIG. 15a. Steps 1555, 1560, and 1565 implement step 1510. The method 1550 begins in step 1555. In step 1555, a bitmap image is segmented into one or more connected components. The bitmap image stored in memory 1106 undergoes low-level image segmentation by the processor 1105, which splits the image into connected components (CCs) according to colour. Each of the connected components of the bitmap image is stored in memory 1106. In step 1560, the processor 1105 classifies the connected components to identify various document content types. This is done by performing a high-level document layout analysis on the connected components of the bitmap image. The connected components may be processed in terms of their rectangular bounding boxes and may be merged or grouped connected components during processing. The content types may include the following classifications: text, photographs, table, line drawings, and graphics. Each of these content types corresponds to pixel data (i.e., the connected component(s)).

Following high level document analysis, in step 1565, the processor 1105 generates regions with defined geometry. This is done by analysing the connected components. Preferably, only the connected components classified as line drawing and/or graphic regions are processed in step 1565, as other connected components are considered unlikely to contain figure content. Each region can be defined in terms of a single outer boundary and zero or more inner boundaries corresponding to the single outer contour and a set of zero or more inner contours of a connected component.

As described hereinbefore, boundaries may be represented in terms of border sections, and a border is a section of boundary that has a unique region adjacent along its length on each side. Each border is included in two boundaries and may be described by a polygon representation. In this embodiment, the borders that define a boundary are linked together, so that the boundary may be traversed by following the links between the borders. Each border has four linked borders, being a next and a previous border for the two objects on either side. Some of these linked borders may be the same, and in particular a single border representing an entire boundary, as would occur for an object adjacent only to its background, is linked only to itself four times.

Simple region configurations with only two colours have closed borders that define the outer boundary of one object and the inner boundary of a second. On the other hand, in more complex region configurations with more than two colours, the borders may be open sections that are linked together to construct boundaries. Techniques exist that generate polygon representations for the borders representing a set of regions such that the polygon representations are an efficient representation with no self or cross intersections. The points along the borders are stored in memory 1106 in a suitable data structure, and the boundaries are defined in terms of these data structures. It is helpful to use a consistent ordering scheme for successive points on the boundaries—in the described embodiments the outer boundaries form clockwise loops when traversed in the forward direction, while the inner boundaries form anti-clockwise loops. In this scheme, the region is on the right side of its boundary when moving forwards around any boundary in the forward direction.

FIGS. 13*b* and 13*c* illustrate the ten regions formed when a square object 1312 is overlapped by two rectangular objects 1310 and 1311. If a bitmap image of the overlap region were processed, ten connected components should be found corresponding to the regions. Region 1320 corresponds to a connected component found where the square object is not overlapped by either rectangle. A generated region for this connected component has an outer boundary consisting of a single border and a single inner boundary consisting of four borders, the borders being formed where the region 1320 is adjacent to regions 1321, 1322, 1324, and 1327 respectively. Region 1322 corresponds to a connected component formed where the square 1312 is only overlapped by the horizontal rectangle 1310. A generated region for this connected component has an outer boundary consisting of two borders, the borders being formed where the region 1322 is adjacent to regions 1320 and 1323. The first of these borders is also used to define the inner boundary of 1320 above. The outer boundaries for connected components corresponding to regions 1321 and 1323 to 1329 can be found in the same way. None of these has an inner boundary.

In step 1570 of FIG. 15, lines and line regions are detected. This may be achieved using existing techniques that process a polygon representation of the boundary of an object to detect lines and the associated regions. A line is defined in terms of a skeleton or medial axis and a border representation of its sides. The processing may modify the set of regions, for example by breaking touching or overlapping lines or by splitting line objects from connected shapes. A set of line regions are generated, and other regions are referred to as filled regions.

Figure 24:
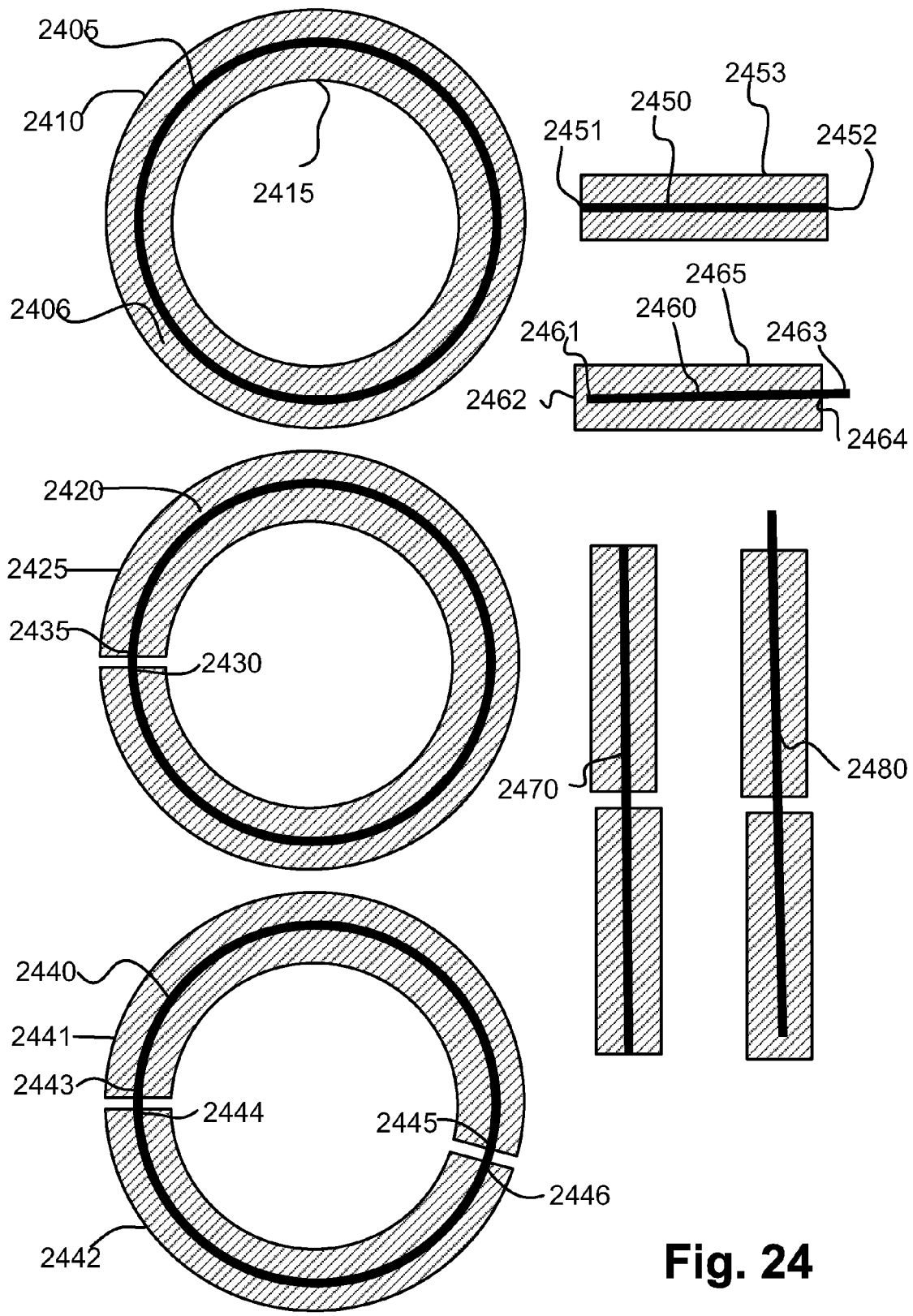
FIG. 24 is a diagram showing a number of different geometries of line regions.

FIG. 24 illustrates a number of possible line geometries that might be detected at step 1570. There are seven lines, each of which has a skeleton or medial axis represented by a thick line. Three of the skeletons are closed, that is to say that the two ends of the skeleton are connected (2405, 2420, and 2440) while the other four are open (2450, 2460, 2470 and 2480), so that the two ends of the skeleton are separate. The striped areas define the line regions. Four of the lines consist of a single line region (the lines with medial axes 2405, 2420, 2450 and 2460), while the other three consist of two line regions (2440, 2470 and 2480). A line may be represented by two or more regions as a result of noise on the image, a segmentation artifact or the overlap of another geometric object. A region may have inner boundaries, for example region 2406 corresponding to the closed skeleton 2405 has an outer 2410 and an inner 2415 boundary.

Step 1570 of FIG. 15*b* may optionally be performed prior to step 1565 in alternative embodiments. For example, line detection may be performed using existing techniques that process pixels directly (e.g. using morphological operations such as thinning, sparse pixel vectorisation, etc). The detected lines may also be dashed lines, in which case a line region may correspond to a number of closed boundaries corresponding to the individual dashes with a single skeleton running through its length. Lines may also be found through the recognition of line shapes within the image. The skeleton may locally be a poor representation of the medial axis of the line.

Step 1570 may optionally determine figure content based on the current set of regions. Figure content may include template shapes, line objects, arrowheads, connectors, and other objects. This processing may employ known techniques for line and shape detection, occluded shape detection, line linking analysis, and connector analysis.

In step 1575 of FIG. 15, based on the line skeletons, line regions and filled regions generated at step 1570, geometric models and adjacency information for filled regions without the line regions are constructed to represent the regions. This modified set of regions consists only of fill regions extended to cover the areas that were previously line regions. This step also generates information relating to adjacencies between the modified filled regions. This is achieved by defining the models in terms of borders and boundaries. Step 1575 involves the substep 1520 of FIG. 15*a* and is described in more detail with reference to FIG. 17 hereinafter.

Next, at step 1580, overlapping graphical objects with partial transparency are detected and geometric models that describe those overlapping graphical objects are constructed in accordance with a method 2700, which is described in more detail hereinafter with reference to FIG. 27. The constructed geometric models have associated line styles (widths, colours and optionally dash style), fill colours and partial transparencies. This involves the final substeps 1530, 1540 and 1545 of FIG. 15*a*. The geometric model of at least one object may be output at this stage, for example, where the graphical object is freeform and cannot be classified as a particular type of figure content. Hence, subsequent steps 1585 and 1590 are indicated as optional steps.

The method 1550 continues at optional step 1585 (indicated by dashed lines). Step 1585 determines figure content based on the current set of regions. Figure content may include template shapes, line objects, arrowheads, connectors, and other objects. This processing may employ known techniques for line and shape detection, occluded shape detection, line linking analysis, and connector analysis.

In step 1590, the processor 1105 optionally (again indicated by dashed lines) outputs classified graphical objects as an object representation. The output may be in a suitable format for viewing and editing in a structured text/graphics editing applications. The processing of method 1550 then ends.

Figure 17:
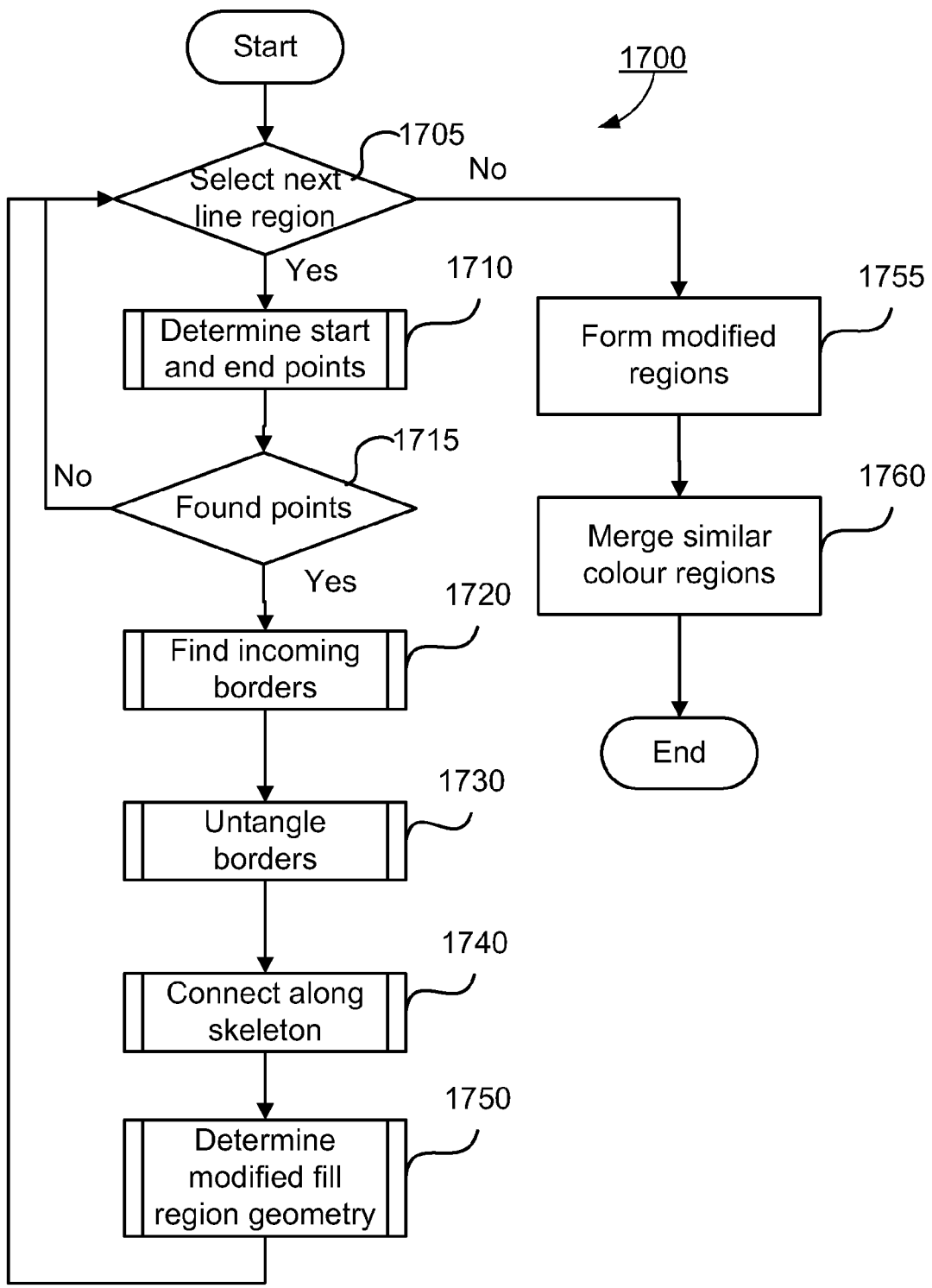
FIG. 17 is a schematic flow diagram illustrating a method of modifying an object representation to remove the lines and recover adjacencies between filled regions.

FIG. 17 illustrates a method 1700 of performing step 1575 in FIG. 15*b* of constructing a set of modified fill regions and the corresponding adjacency information. This is performed by reconnecting the borders of regions adjacent to the line regions to remove the line regions from the representation. The processing described in FIG. 17 analyses each detected line region, which is defined by a single outer boundary and a number (typically zero or one) of inner boundaries. Preferably, the set of line regions associated with a single line region are processed consecutively.

In decision step 1705, a check is made to determine the next line region. That is, step 1705 selects the next line region. If one exists (Yes), processing continues to step 1710; otherwise (No), processing continues at step 1755. In step 1710, left and right start and end points for the boundaries of the selected line region are determined. This step 1710 finds which sections of the boundary represent which side (left or right) of the line. Start and end points for the line skeleton are also found, which determine which section of the line skeleton is relevant to this boundary. Step 1710 is described in further detail with respect to FIG. 18 hereinafter. Decision step 1715 checks whether start and end points were found at step 1715. If so (Yes) processing continues at step 1720; otherwise (No), if no start and end points were found, processing returns to step 1705.

In step 1720, the incoming borders are found (identified). These are the borders which will be extended into the line area. Step 1720 is described in further detail with respect to FIG. 19.

In step 1730, the incoming borders are untangled. This fixes their projected locations on the skeleton of the line, and aligns borders on opposite sides. Step 1730 is described in further detail with respect to FIG. 20.

In step 1740, the borders are connected along the skeleton of the line. A new set of borders is created which follow the skeleton of the line. The new borders follow the skeleton in between the start and end points of the skeleton identified in step 1710. The incoming borders from 1720 are extended to meet these new borders. The result of step 1740 is that the entire area of the line region is covered by the modified adjacent regions whose borders have been extended into the line region. Step 1740 is described in further detail with respect to FIG. 25.

In step 1750, the new geometry of the modified fill regions is determined Reconnecting the borders can cause separate boundaries to merge, or create new boundaries. The new set of boundaries needs to be determined to define the geometry of modified regions. Step 1750 is described in further detail with respect to FIG. 26.

Following step 1750, processing returns to step 1705. After all of the line regions have been processed (No is returned in step 1705), step 1755 forms the modified regions. This can be done by checking each of the boundaries modified by step 1750 in turn. The outer boundaries are clockwise in this embodiment, while the inner boundaries are anti-clockwise. Each outer boundary defines the outside of a new region, and each inner boundary is associated with the same region as the smallest (by area) containing the outer boundary. Each new boundary is associated with a region of the original representation, however the new boundary is updated to be associated with the new modified region, and all borders in the boundary are also updated. The colours and other properties of the new region are set based on the region the outer boundary was previously associated with.

Following step 1755, processing continues at step 1760 which merges similar colour regions. Each of the borders on each boundary of each region is examined. If the adjacent region at any border is of an identical or substantially similar colour, then the two regions are merged. One region is then considered the merged region while the other region is removed. This is performed by first assigning all boundaries of the removed region to the other region. Doing so creates a number of borders which are degenerate, in that the borders now have the same region on the both sides. These borders are removed, by reconnecting the adjacent borders, and those adjacent borders are added to a list of new base borders. This merging changes the geometry of the regions and may even create a number of new (inner) boundaries. The new geometry is determined using the same process as used in step 1750, which is described in more detail with reference to FIG. 26. Following step 1760, processing ends.

Figure 18:
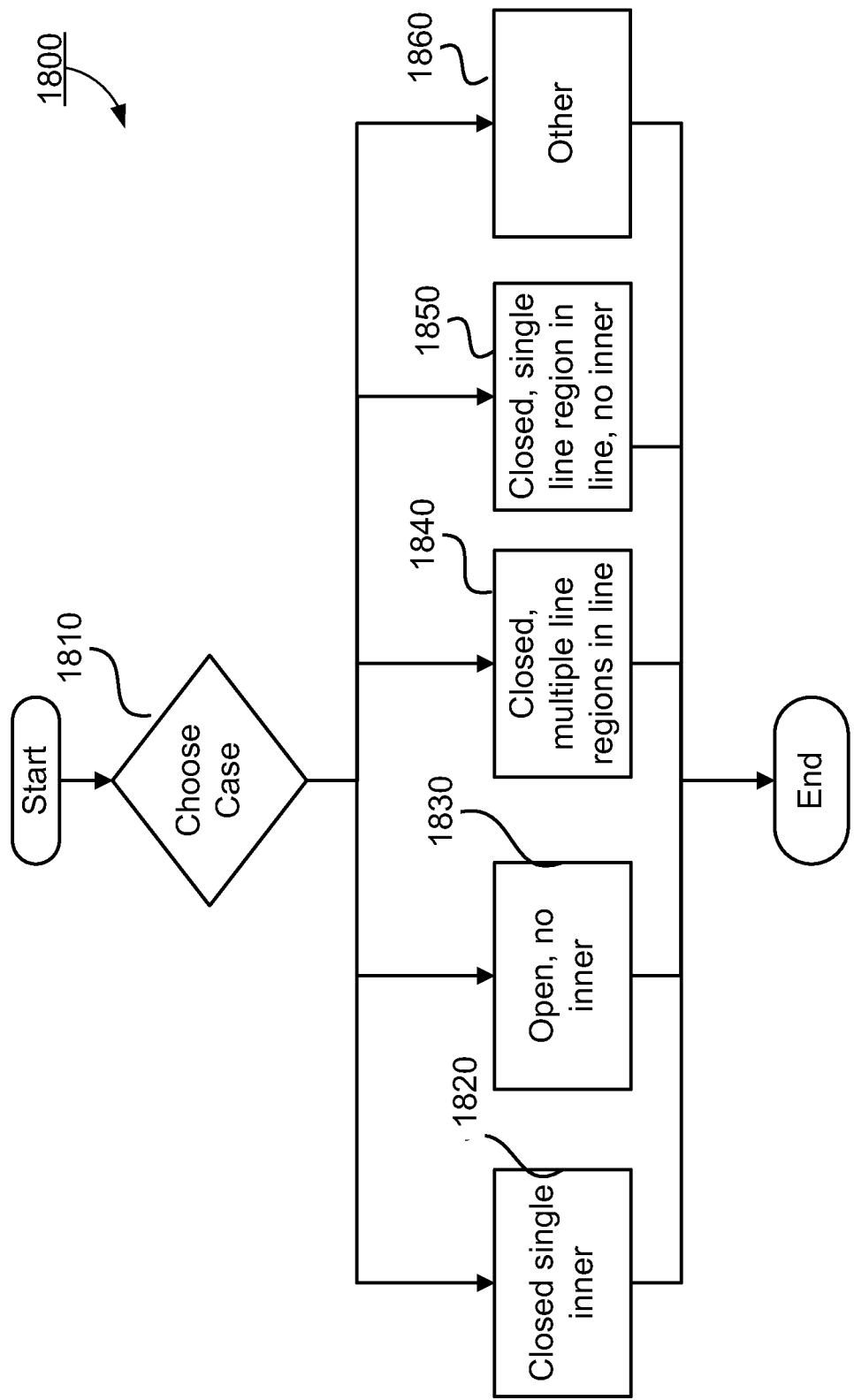
FIG. 18 is a schematic flow diagram illustrating the selection of start and end points to use when removing a line region.

FIG. 18 illustrates a method 1800 of determining (finding) the boundary start and end points for the current line region, which can be performed in step 1710 of FIG. 17. There are five cases, which are dealt with differently. Processing commences at step 1810. In decision step 1810, the case is chosen. That is, the geometry of the line region is determined. This step 1810 chooses between the cases described hereinafter, based on the number of boundaries, whether the skeleton is open or closed, and whether the boundaries are outer or inner boundaries. In one embodiment, the information relating to boundary start and end points may be generated during the line detection process, in which case step 1810 may be optional. Steps 1820, 1830, 1840, 1850, and 1860 are configured in parallel and selected by the step 1810, and processing ends after one of steps 1820, 1830, 1840, 1850, and 1860 has executed.

Step 1820 handles the case of a line region with a single inner boundary and a closed skeleton ("Closed single inner"). An example of such a region is 2406 of FIG. 24. This line region has a closed skeleton 2405, and has a single outer boundary 2410 and a single inner boundary 2415. Following the convention that the skeleton of the line is clockwise, the left side of the line is the entire outer boundary, and the right side of the line is the entire inner boundary. In this case, a start point for the line skeleton may be chosen arbitrarily. The closest points on the inner and outer boundaries to this start point of the line skeleton are used as the left and right boundary start points respectively. The skeleton boundary end points are set to be the same as the skeleton and boundary start points, ensuring the entire skeleton and both entire boundaries are considered.

Step 1830 handles the case of a line region for a line that is open and has a single outer boundary and no inner boundaries ("Open, no inner"). Examples of open lines are seen in 2450 and 2460, and also in the pairs of line regions associated with skeletons 2470, and 2480 of FIG. 24, each of which has a skeleton start and end are distinct. The lines corresponding to skeletons 2470 and 2480 consist of two line regions, each of which is processed separately. Step 1830 first determines whether the first point of the line skeleton is on or inside the boundary being considered. If the first point is on or inside the boundary, the start point for the skeleton is the first point, and the left boundary start point is the closest point on the boundary to the first point of the skeleton. For example, the start point 2451 of line skeleton 2450 is on the boundary 2453 of the line region. Point 2451 is the skeleton start point and the left boundary start point. The start point 2461 of line skeleton 2460 is inside the boundary 2465 of the line region. In this case, point 2461 is the skeleton start point, while the closest point on the boundary, 2462, is the left boundary start point. If the start point of the skeleton is not inside the boundary, all intersections between the boundary and the line skeleton are identified. If there are no intersections, the skeleton does not touch or overlap the line region anywhere and no skeleton or boundary start or end points may be found, and step 1830 is complete. If intersections are found, these are sorted by their distance along the line skeleton. The first of these sorted intersections is taken to be the skeleton start point and the left boundary start point.

Similarly, whether the last point of the line skeleton is on or inside the boundary is determined. If the last point is, the end point of the skeleton is the last point, and the right boundary start point is the closest point on the boundary to the last skeleton point. This is the case for example on line 2450 for point 2452. Otherwise, as above, all intersections are found and sorted by skeleton position, and the last intersection becomes both the skeleton end point and the right boundary start point. For example on line 2460, there is one intersection between the skeleton and the boundary at point 2464. This point is the skeleton end point, the right boundary start point.

The left boundary end point is the equal to the right boundary start point, and the right boundary end point is equal to the left boundary start point. This ensures that the entire boundary is considered.

Step 1840 handles the case of a line region with no inner boundaries from a closed detected line consisting of multiple line regions ("Closed, multiple line regions in line"). An example of a line region from a closed line consisting of multiple line regions is 2440 in FIG. 24. In this case, all intersections between the outer boundary of the region currently being considered and the line skeleton are found. Doing so identifies some number of sections of the line skeleton which are outside the region currently being considered. If no such sections are found, no start and end points are generated. Otherwise, the longest of such sections is identified. The start of this section becomes the endpoint of the skeleton, and the end of this section becomes the start point of the skeleton. The left boundary start point and right boundary end point are both set equal to the skeleton start point, and the right boundary start point and left boundary end point are both set equal to the skeleton end point. For example, for line 2440 of FIG. 24, when processing the top boundary 2441, one section of line outside that boundary would be identified, which starts at point 2445 and finishes at point 2443. Point 2443 would become the skeleton start point, left boundary start point and right boundary end point, while point 2445 would be the skeleton end point, right boundary start point and left boundary end point. When processing the lower boundary 2442, one section of line outside the boundary is identified starting at point 2444 and finishing at point 2446. Point 2446 is the skeleton start point, the left boundary start point and the right boundary end point, while point 2444 is the skeleton end point, left boundary end point and right boundary start point.

Step 1850 handles the case of a line region from a closed detected line for which there is a single line region, and that line region has no inner boundaries ("Closed, single line region in line, no inner"). An example line region for a closed line with a single line region is 2425 in FIG. 24. As in case 1840, all intersections between the skeleton and the boundary are found, and this identifies some number of sections of skeleton outside the boundary. For each of these sections, consider the start and end points, which are also points on the boundary. The distance along the boundary in both directions is found, and the minimum of these two distances is considered. The section with the largest such minimum boundary distance is chosen. This should identify the part of the line skeleton where the boundary turns around back the other way, while ignoring places where the skeleton might leave the boundary of the object for a short stretch. As in case 1840, the skeleton start and end points are the end and start points of this section of boundary respectively, and the left and right boundary start and end points are also set as in case 1840. On the example line 2420, points 2430 and 2435 are identified as the skeleton and boundary start and end points.

Step 1860 handles all other cases ("Other"). This may be a closed line with multiple inner boundaries or an open line region with one or more inner boundaries. Such cases are rare. No start or end point is found and the line region is not handled in later processing.

Figure 21:
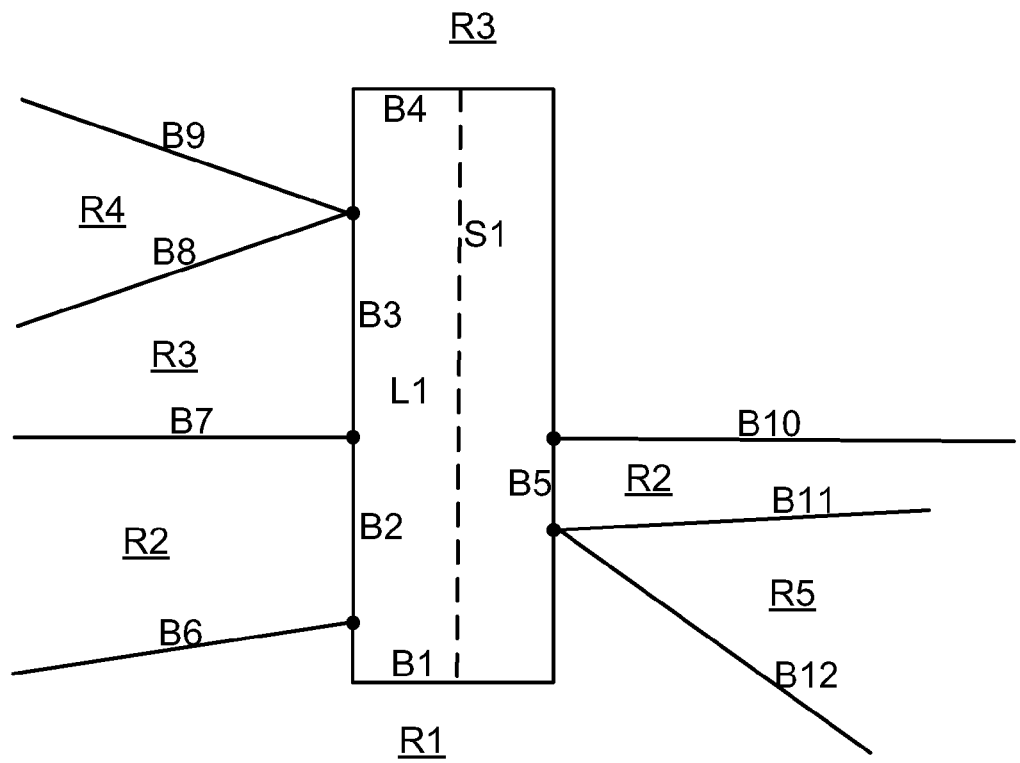
FIG. 21 is a diagram showing a line region and the surrounding regions, as well as borders adjacent to the boundary of the line region.

The example line region L1 in FIG. 21 is used as a working example to help with the description hereinafter. In FIG. 21, line L1 is the rectangularly shaped line region in the centre, with a boundary consisting of borders B1, B2, B3, B4 and B5. The dashed line S1 shows the skeleton of L1, with the start of the skeleton being at the bottom. The left boundary start point and the right boundary end point are at the start of the skeleton on border B1, while the left boundary end point and right boundary start point are at the end of the skeleton on border B4. This diagram also shows other borders B6, B7, B8, B9, B10, B11 and B12, all of which are adjacent to borders on the line region L1. Regions R1, R2, R3, R4 and R5 are also shown. Border B1 for example can be seen to divide the line region L1 from region R1, while border B8 divides region R3 from region R4.

Figure 19:
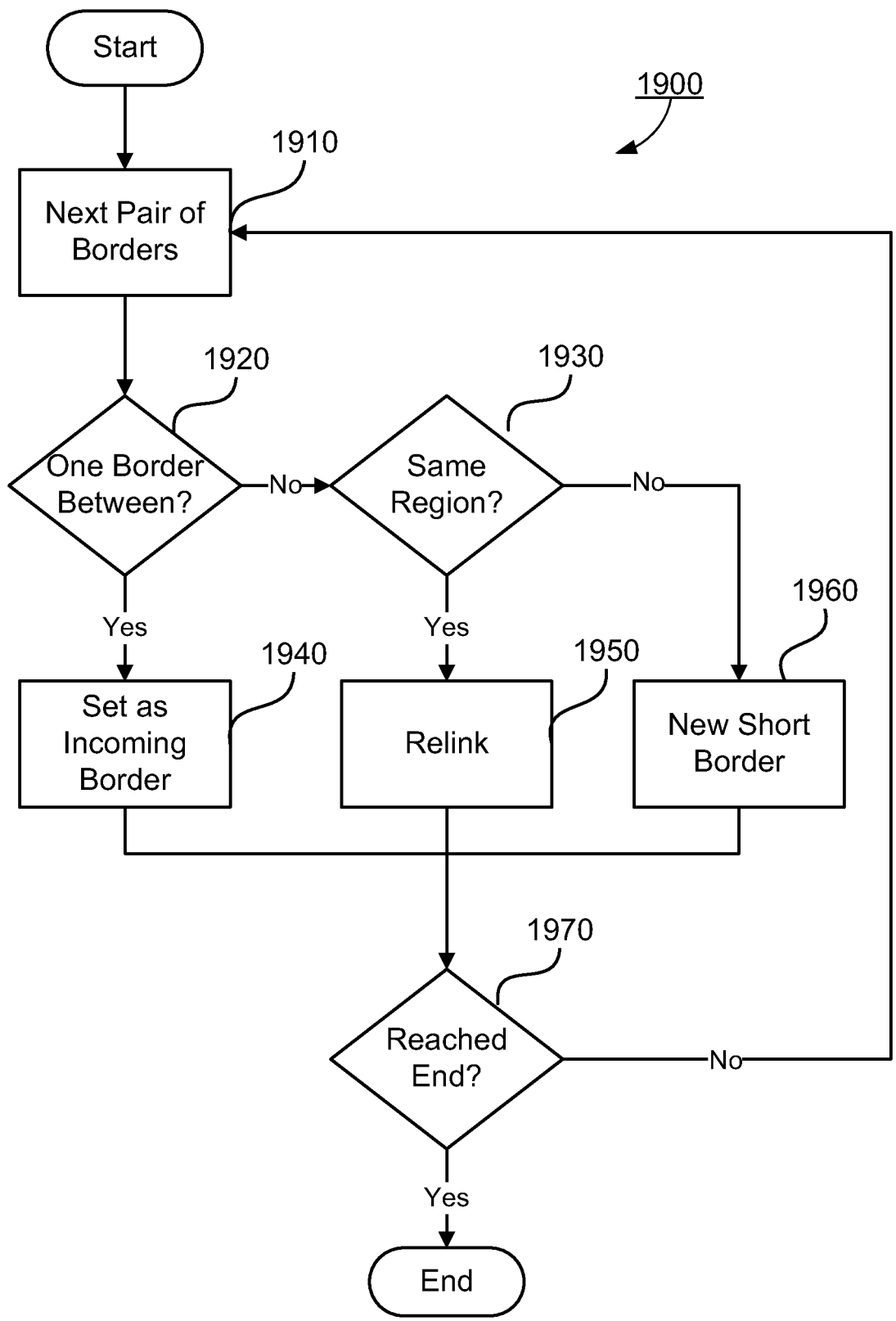
FIG. 19 is a schematic flow diagram illustrating a method of finding incoming borders around the outside of a line region.

FIG. 19 depicts a method 1900 of finding incoming borders for a line region, which can be implemented in step 1720 of FIG. 17. The processing described here is done twice, first for the left section of the boundary of the selected line region, and then for the right section of boundary. For convenience, the processing is described below in terms of the left boundary.

Method 1900 commences processing at step 1910. In step 1910, the next pair of borders is found (obtained). A pair in this case is two borders of the line region boundary which are consecutive when following that boundary. The first pair consists of the border which includes the left boundary start point, and the next border in a clockwise direction. Following pairs move one border clockwise, such that each pair has one border in common with the previous pair. In the example of FIG. 21, the first pair of borders would be B1 and B2, followed by B2 and B3, then B3 and B4.

In decision step 1920, the pair of borders is checked to determine if there is one border between the borders. That is, the borders in between the current pair of borders are identified. The in-between borders are those with an end point in common with the junction between the current pair of borders. If there is only one such in between border (Yes), processing moves to step 1940; otherwise (No), processing continues at step 1930. For example in FIG. 21, between borders B1 and B2 there is just one border, B6. If there is more than one in between border (No), processing moves to step 1930. For example, between borders B3 and B4, there are two borders, B8 and B9. Also between borders B5 and B1 are two borders B11 and B12.

In decision step 1930, a check is made to determine whether the same region is on the other side of the line from both of the current pair of borders. For example, borders B3 and B4 are both adjacent to the region R3, while borders B5 and B1 are adjacent to two different regions R1 and R2. If the regions are the same (Yes), processing moves to step 1950; otherwise (No), processing moves to step 1960.

In step 1940, the border identified is set (listed) as an incoming border. This border is then extended underneath the line region to meet the line skeleton. This may be done by finding the closest point on the skeleton to the junction point between the incoming border and the line, or may alternatively be done by extending the border along the direction the border is pointing where the border meets the line. The result of this for the example in FIG. 21 may be seen in FIG. 22. Here, borders B6, B7 and B10 have been extended to meet the line skeleton. Border B6 can be seen to have been extended in the direction the border was pointing, while B7 and B10 might have been extended using either method. Processing continues at step 1970.

In step 1950, the borders are relinked so as to no longer be adjacent to the line at all, and the borders on the line are linked together as well. For example, borders B8 and B9 are linked together. Region R3 now has a boundary which continues from border B8 to border B9, rather than to border B3. Borders B3 and B4 are also linked, so that a boundary of region R3 continues from border B4 to B3 rather than to border B9. In this case, no incoming border is added to the list.

When relinking borders in this way, the topology of the regions may be modified. This relinking may merge two boundaries of a region, or merge a boundary with itself and create a new boundary as a result. Many other changes may be made in further processing which can affect the topology of the regions, and this is resolved later in step 1750. To help the processing of step 1750 however, keeping track of the location of new potential boundaries is useful. To do this, two borders are stored and are later used in step 1750. The first stored border is one of the two previously adjacent borders, either B8 or B9 in the example from FIG. 21. The second is another border previously on the same boundary as one of those borders, but not on the currently processed boundary of the line, as the borders of the line is discarded before step 1750. In the example, the boundary of R3 would be followed from B4 around to B10, and the border B10 would be stored. No such border may be found, in the case where relinking the borders leaves a boundary that is just between the line and the other region (R3 in the example), however in this case this boundary is discarded so such a border does not need to be found. Processing continues at step 1970.

In step 1960, a new short border is created between the two different regions. This border is the incoming border and is extended from the junction point to meet the closest point on the line skeleton. The results of this can be seen for example in FIG. 22, which continues the example from FIG. 21. Here a new border B13 has been created between regions R2 and R1. The border B13 starts from the junction point between borders B5, B1, B11 and B12 and is extended to meet the line skeleton. The new border B13 is linked to border B11 for region R2 and linked to border B12 for region R1. Processing continues at step 1970.

In decision step 1970, a check is made to determine whether the last pair of borders on this side has been reached ("End reached"). If the left boundary end point is included in one of the current pair of borders (Yes), processing terminates. That is, the processing of step 1720 has finished. Otherwise (No), processing returns to step 1910.

Figure 20:
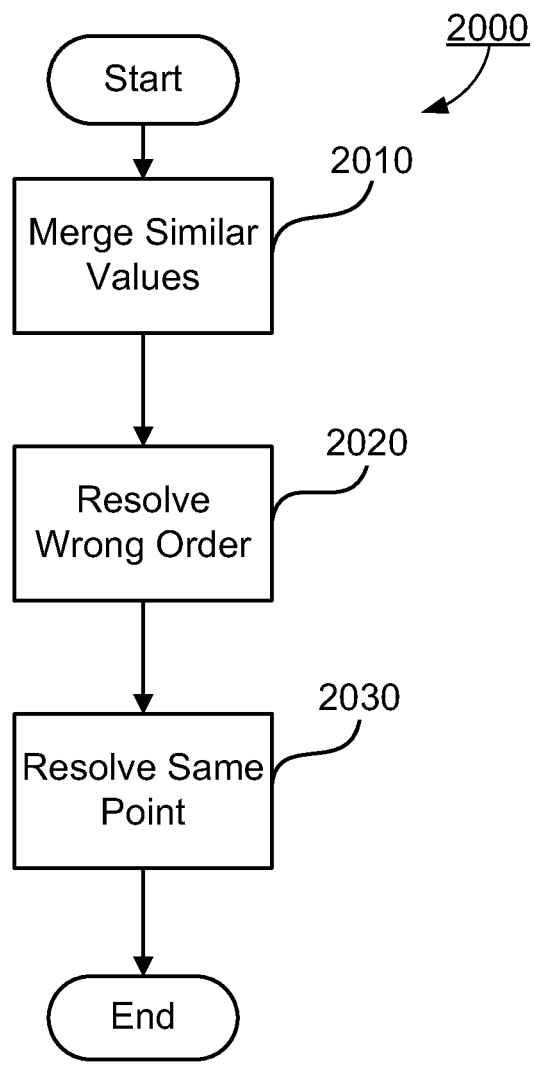
FIG. 20 is a schematic flow diagram illustrating a method of untangling incoming borders.
Figure 22:
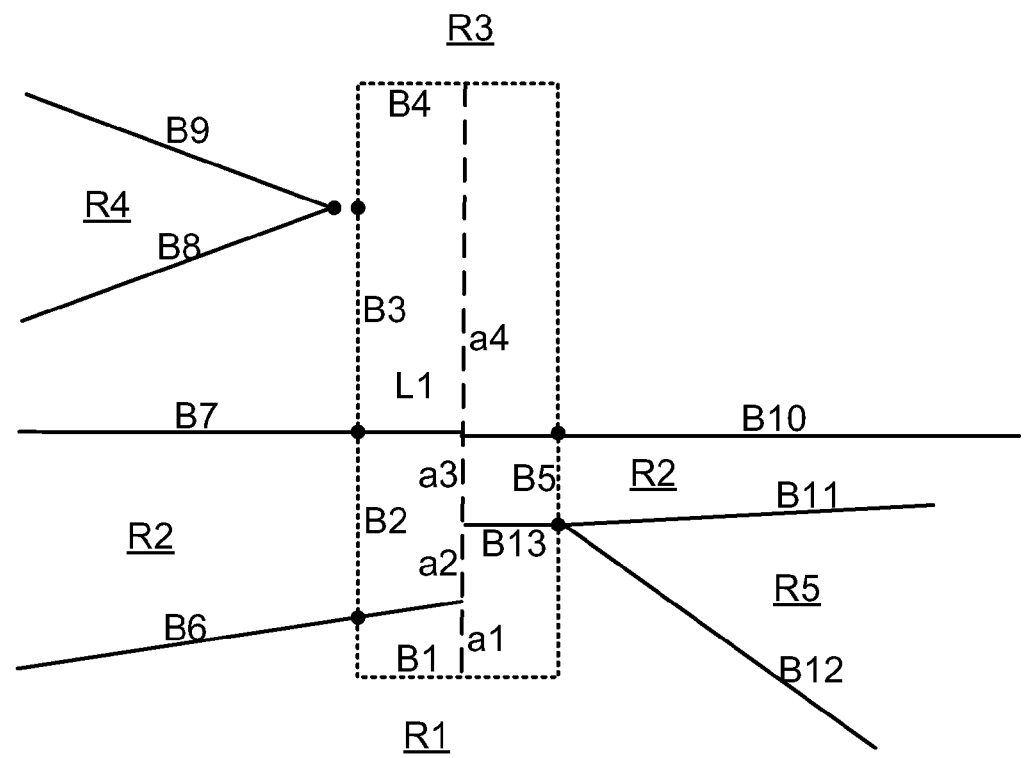
FIG. 22 is a diagram showing the same line region of FIG. 21 at an intermediate stage of removing the line region and reconnecting the surrounding regions.

Step 1730 in FIG. 17 of untangling borders is described in more detail with reference to the method 2000 shown in FIG. 20. Each incoming border has an associated position on the line skeleton, and this step deals with those skeleton positions. Processing commences at step 2010. In step 2010, similar values between skeleton positions of borders on the left side and on the right side are merged to the same value. This is not strictly necessary, but avoids creating unnecessary short borders in step 1740 of FIG. 17. In the example of FIG. 22, borders B10 and B7 would be adjusted to meet the skeleton at exactly the same position, given by the average of the two skeleton positions.

In step 2020, incoming borders in the wrong order are resolved. That is, pairs of incoming borders from the same side whose skeleton positions are in a different order to the order of those incoming borders around the boundary of the line region are detected. This can occur as a result of extending the borders in the direction the borders were facing, causing the borders to cross over. This can also occur when extending the borders to the closest point on the skeleton in cases where the skeleton has a complex shape. The skeleton positions of the borders are swapped in this case.

In step 2030, the same point is resolved. That is, pairs of consecutive incoming borders (where "consecutive" is in the order following the boundary of the line) from the same side with identical skeleton positions are identified. These are then dealt with in a similar way to cases 1950 and 1960 from the processing described above. Being consecutive incoming borders, these borders must share a common region in between, and the two borders are linked for that region. If the other two adjacent regions are different, a new (zero length) border is created between those other two regions, and the two consecutive incoming borders are replaced in the list of incoming borders by this one new border. If the other two adjacent regions are the same, the borders are relinked in a similar fashion to step 1950, and the two incoming borders are removed from the list of incoming borders. As in step 1950, two borders are identified and stored for later use in step 1750, one being one of the two previously incoming borders, and the other is a border previously on the same boundary as one of the two previously incoming borders, found by following the region until a border not on the current line region is reached. Processing then ends.

Figure 25:
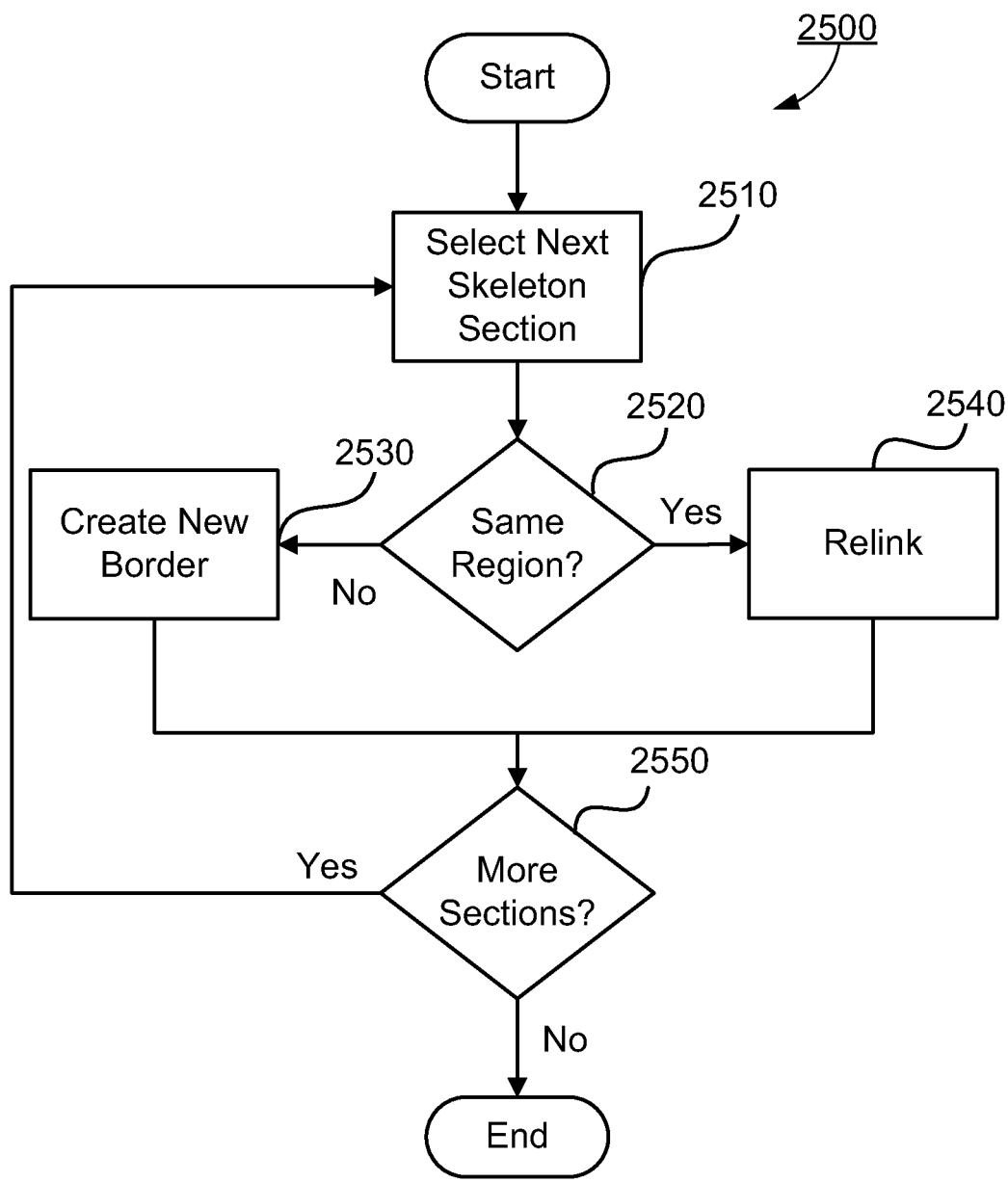
FIG. 25 is a schematic flow diagram showing a method of connecting regions along the skeleton of a line.

Step 1740 in FIG. 17 of connecting along the line skeleton is described in more detail with reference to method 2500 of FIG. 25. The method 2500 commences processing at step 2510. In step 2510, the next skeleton section is selected. The skeleton line is broken into sections according to the locations where the incoming boundaries have been extended to meet the skeleton line. In FIG. 22, there are four sections of the skeleton axis marked a1 to a4. Processing is described as beginning from the start point of the skeleton and continuing through each consecutive section to the end point of the skeleton, although the order of processing the sections is not important.

At each skeleton section, there is in general a left previous incoming border, a left next incoming border, a right previous incoming border, and a right next incoming border, although some of these may be missing for some sections (the first section for example has no previous incoming borders).

There is a region which has been extended to the skeleton line from the left, which is common to the previous and next borders on the left. For example, at section a2 in FIG. 22, the region R2 has been extended from the left and is common to borders B6 and B7. Similarly, there is a region from the right, common to the previous and next borders on the right. For example at section a2 again region R1 has been extended. In that example, there is no previous right border, but region R1 is still a region on the next right border B13.

In step 2520, a check is made to determine whether these two left and right regions are the same. If the regions are the same (Yes), processing moves to step 2540; otherwise (No), processing moves to step 2530.

In step 2530, a new border is created between the two regions, with points which follow that section of skeleton line. This new border is marked as having originated from a line object, information which is used in later processing. This new border is then linked in as appropriate. For example, referring to FIG. 22, in the second section of the skeleton (a2, where the left previous border is B6, the left next border B7, the right next border B13 and no right previous border), a new border B14 is created. This new border can be seen in FIG. 23. Processing then continues at step 2550.

In step 2540, the borders are relinked as appropriate to connect the left and right parts of the region together. For example, in the third section of the line skeleton in FIG. 22 (where the next left border is B7, the previous left border B6, the next right border B10 and the previous right border B13), the two regions on the left and right are both region R2. In this case, B13 is linked to the new border B14 for region R2, and B7 is linked to B10 for region R2. Next, two borders need to be stored to assist step 1750. In particular, one border from the top section and one border from the bottom section need to be stored. In the example of FIG. 22, storing borders B10 and B13 would be sufficient. Processing continues at step 2550.

Figure 23:
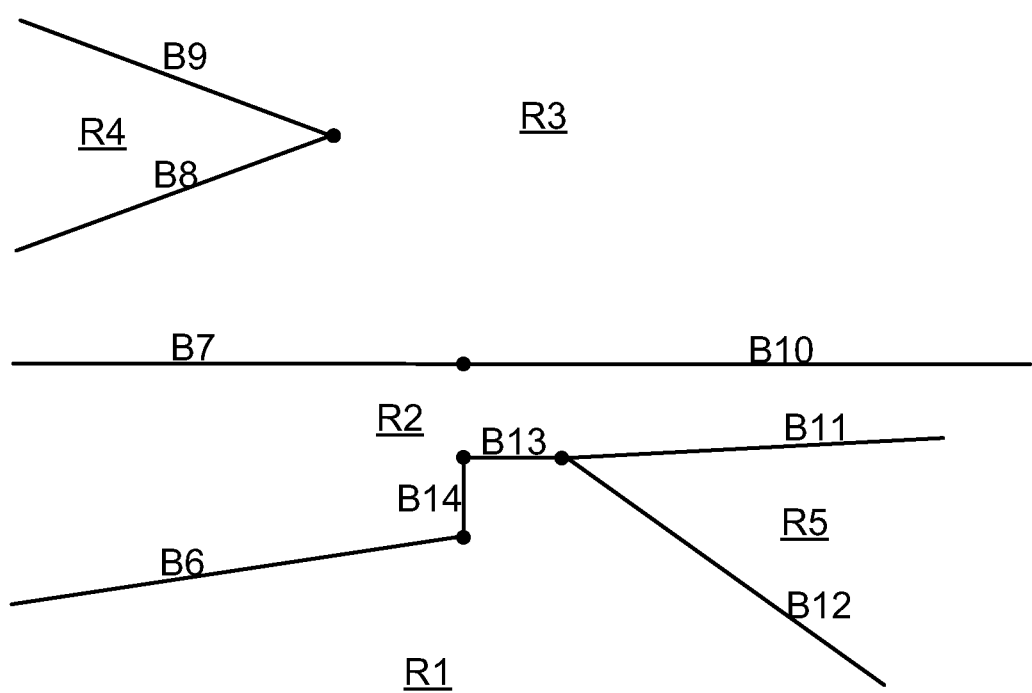
FIG. 23 is a diagram showing the end result of removing the line region from FIG. 21 and the resulting borders.

In decision step 2550, a check is made to determine whether there are more sections of skeleton to process. If so (Yes), processing returns to step 2510; otherwise (No), processing of the method 2500 terminates. That is, step 1740 of connecting along the skeleton is complete. FIG. 23 shows the end result of this processing on the example of FIGS. 21 and 22. In FIG. 23, a number of borders are now merged together, in particular B8 and B9, B7 and B10, and B6, B14 and B13.

Figure 26:
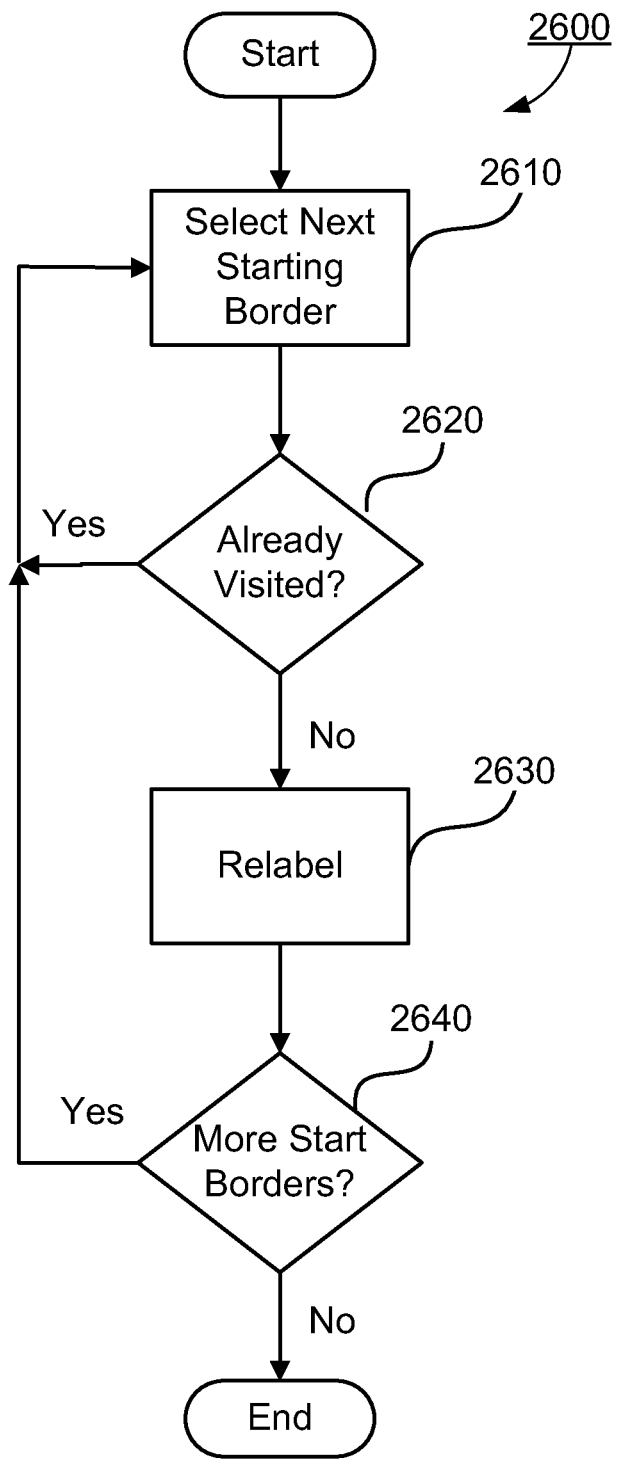
FIG. 26 is a schematic flow diagram showing a method of resolving the new topology of regions after reconnecting them over a line region.

Step 1750 in FIG. 17 of determining the geometry of the modified fill regions is described in more detail with reference to method 2600 of FIG. 26. The geometry of the modified fill regions is defined by the borders and boundaries. Merging boundaries of regions together changes the boundaries, creating some new boundaries and merging others together. This step 1750 identifies the new set of boundaries for each region. During earlier processing, in particular during steps 1950, 2030 and 2540, a list of borders is stored. This list should contain at least one border from every new boundary that has been generated. A less efficient but simpler alternative is to list every border that has been looked at during steps 1900, 2000 and 1700.

The method 2600 commences processing in step 2610. In step 2610, the next stored border is selected. In decision step 2620, the boundary associated with that border is examined to determine if the boundary has already been visited. If the boundary is one of the boundaries newly created during this processing of step 1750, this boundary has been visited already (Yes), so processing returns to step 2610. Otherwise (No), a new boundary is created, and processing moves to step 2630.

In step 2630, the boundary is relabelled. That is, the boundary is traversed by following the links between borders, and each border visited is labelled as being part of the newly created boundary. The existing boundary of each border visited is put into a list of boundaries that have been eliminated. These boundaries are deleted at the end of step 1750.

In decision step 2640, a check is made to determine if there are more stored borders in the list. If so (Yes), processing moves to step 2610; otherwise (No), processing ends. That is, step 1750 of determining the geometry of the modified fill regions is complete.

Figure 27:
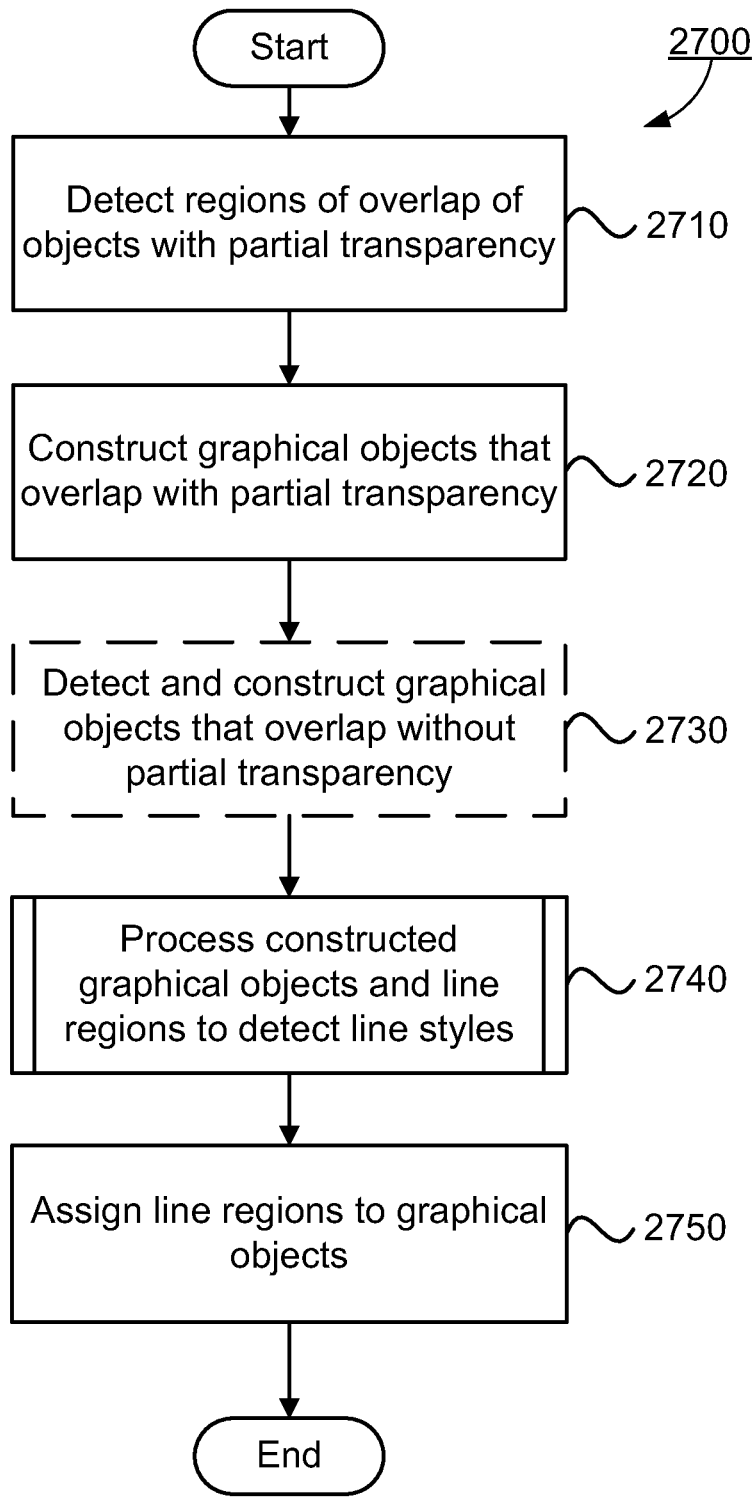
FIG. 27 is a schematic flow diagram illustrating a method of detecting and constructing overlapping graphical objects with partial transparency and line styles.

FIG. 27 illustrates a method 2700 for detecting overlapping graphical line objects with partial transparency and constructing geometric models that describe those objects that could be used at step 1580 of method 1550 depicted in FIG. 15. The method 2700 commences processing in step 2710. In step 2710, regions of overlap of objects with partial transparency are detected. The detection is based on the modified filled regions constructed in step 1575 of FIG. 15 and the associated adjacency information. In step 2720, graphical objects that overlap with partial transparency are constructed. The graphical objects are constructed by combining regions together, and some regions corresponding to the overlap of graphical objects with partial transparency are included in more than one constructed graphical object. In one embodiment, some extra tests of the validity of a region of overlap may be used at this stage. A two-object overlap transparency model detected at step 740 or 750 in FIG. 7 may be rejected if the colour difference between the region of overlap and either of the adjacent regions is too small, which can result in a higher false positive rate. Fill colours, partial transparencies and layering information are provided with the graphical objects.

In step 2730 of FIG. 27, the regions constructed during step 1575 and the associated adjacency information may optionally (indicated by dashed line) be processed to detect graphical objects that overlap without partial transparency. Techniques for performing this processing are known.

Following the detection and construction of overlapping objects in steps 2710, 2720 and 2730, step 2740 detects line styles for overlapping graphical objects by processing (based on) the constructed geometry and the original line regions detected at step 1570 and processed in step 1575 of FIG. 15. Step 2740 is described in further detail with respect to FIG. 12 hereinafter. In step 2750, line regions are assigned to the graphical objects to ensure that the final output does not duplicate the lines. Processing then ends.

Figure 12:
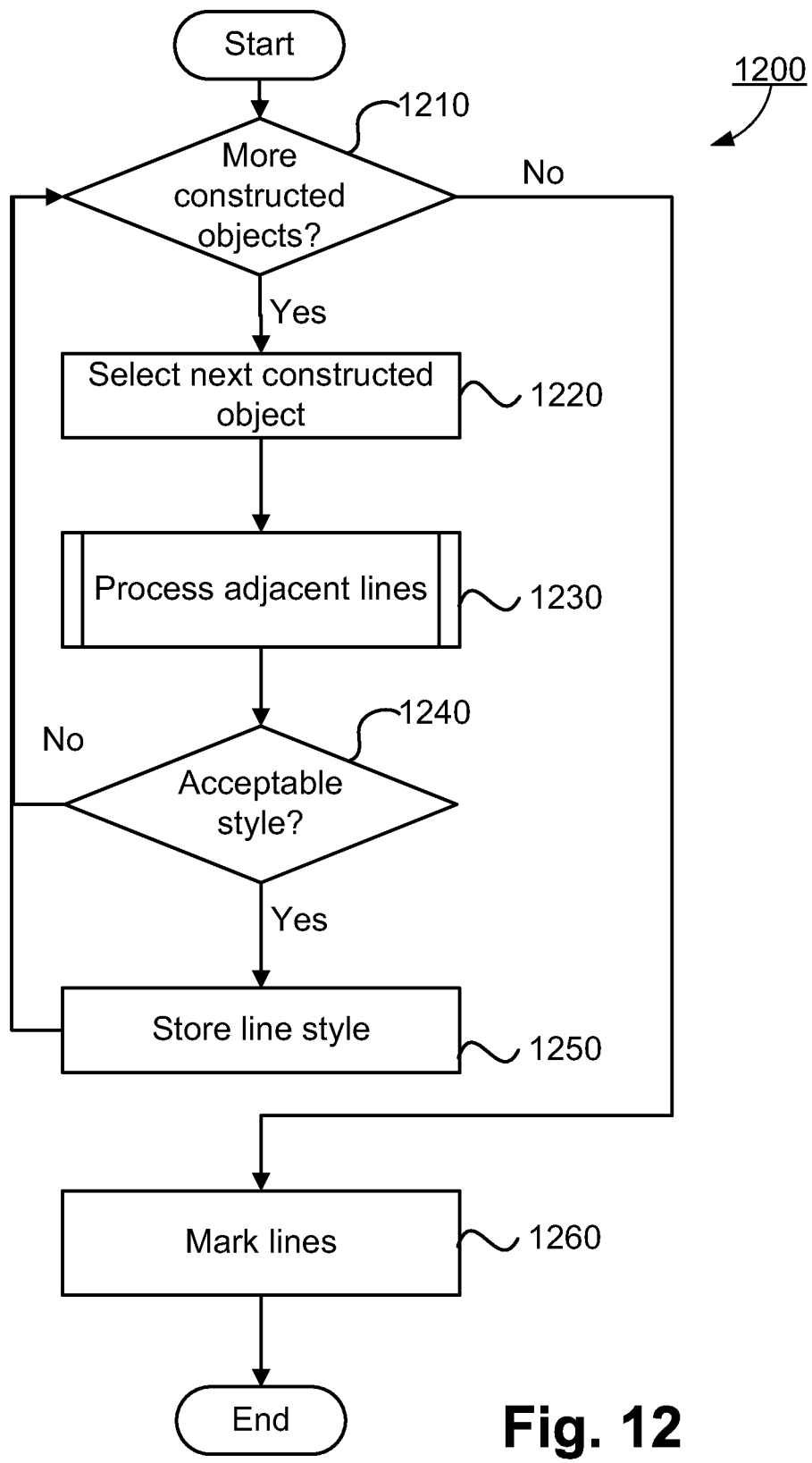
FIG. 12 is a schematic flow diagram illustrating a method for detecting line styles for overlapping graphical objects.

FIG. 12 illustrates a method 1200 for detecting line styles for overlapping objects based on the constructed graphical objects and the original line regions detected at step 1570. The method 1200 loops through each constructed graphical object generated in step 2720 or 2730 in turn. Processing commences at decision step 1210 which checks if there are any more (unprocessed) constructed objects. If so (Yes), processing continues to step 1220; otherwise (No), processing continues at step 1260 if there are none, thereby exiting the loop (1210, 1220, 1230, 1240, and/or 1250). Step 1220 selects the next constructed graphical object that has not yet been processed. The adjacent lines next to this object are processed at step 1230 to determine whether there is a consistent line style around the object and if so to calculate the line style. Step 1230 is described in further detail with respect to FIG. 16 hereinafter. In decision step 1240, a check is made to determine whether an acceptable line style has been found at step 1230. If there is an acceptable style (Yes), processing continues at step 1250. In step 1250, the line style is stored, and then processing returns to step 1210. Otherwise, if 1240 returns false (No), processing returns to step 1210.

Once all of the graphical objects have been analysed, step 1210 returns false (No) and processing continues at step 1260, which marks lines as associated with specific graphical objects so that the line will not be duplicated in the output. This can be performed by processing the graphical objects for which a line style was found at step 1230 in turn. The constructed geometry of each graphical object can include parts from regions where lines have been removed. This information can be determined based on the borders that are generated at step 1575 and which are marked according to the line region that the borders extended underneath. Each border of a constructed object marked in this way is assigned to the corresponding line. Once all graphical objects have been processed, a suitable test for associating a line with a graphical object is that the total length of borders assigned to the line from the object is greater than 0.8 times the length of the skeleton of the line and greater than the length of borders assigned to any other graphical object. If this condition is met, the line is unlikely to correspond to a separate object, and the line can be considered as part of the graphical object. In the case of a dashed line, a different test may be performed to account for the fact that only a fraction of the skeleton is inside dashes based on the dash style. For example the line may be associated with a graphical object if the total length of borders assigned to the line from the object is greater than 0.8 times the length of the skeleton in dashes. After step 1260, the method 1200 ends.

Figure 16:
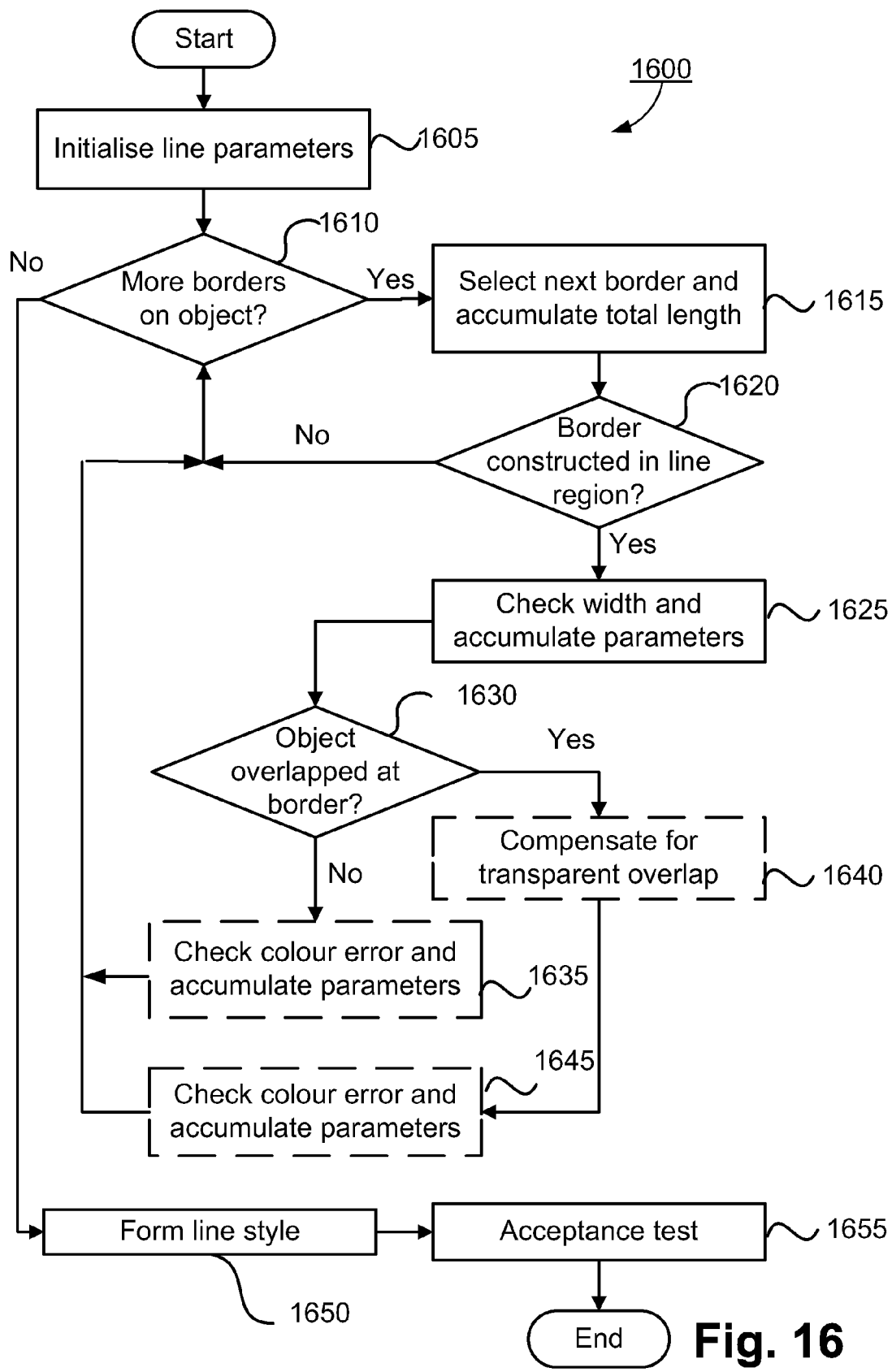
FIG. 16 is a schematic flow diagram illustrating a method for determining whether there is a consistent line style around the object and if so calculating the line style.

FIG. 16 illustrates a method 1600 for processing lines adjacent to a constructed graphical object to determine whether the object has a consistent line style as might be used at step 1230 of FIG. 12. The method 1600 commences processing at step 1605. In step 1605, a set of line parameters for the graphical object are initialised. These may include:

- total length parameter ($l_{tot}$) that accumulates the total length around the geometry of the object;
- length in lines parameter ($l_{line}$) that accumulates the total length around the geometry of the object associated with lines;
- an average width parameter ($w_{line}$) for lines around the graphical object;
- length in non-overlapped lines parameter ($l_{over}$) that accumulates the total length in lines that are not overlapped by any transparent region;
- an average colour for non-overlapped lines ($C_{over}^{i}$ for colour channel i);
- length in overlapped lines parameter ($l_{under}$) that accumulates the total length in lines that are underneath a transparent region; and
- an average colour for lines that are underneath a transparent region ($C_{under}^{i}$ for colour channel i).

All length parameters are initialised to zero, while the colour and width parameters are marked as not set. Optionally, if dashed lines are being processed, a dash style for the object may also be stored which is initially unset. After initialisation of parameters, processing continues to step 1610 and loops through all of the borders that define the geometry of the graphical object in turn updating the various parameters as appropriate.

Decision step 1610 checks if there are more borders on the constructed graphical object, and if there are (Yes), processing continues at step 1615; otherwise (No), processing passes to step 1650. Step 1615 selects the next border, determines its length ($l_{bord}$), and accumulates (adds) this to the total length parameter ($l_{tot}$). In decision step 1620, a check is made to determine whether the current border is constructed in line region. That is, a check is made to determine if the current border is marked to indicate the current border was generated at step 1575 to extend under a line region. If step 1620 returns false (No), processing returns to step 1610. Otherwise, if step 1620 returns true (Yes), processing continues at step 1625. The marked line region, referred to as the current line, is used in step 1625.

Step 1625 checks the width of the current line and accumulates parameters. That is, the width, $w_{curr}$ of the current line is selected and then step 1625 may optionally perform an acceptance test if the length in lines parameter ($l_{line}$) is non-zero and the width parameter $w_{line}$ has previously been set. If the width parameters are measured in pixels at 300 dpi, modified width parameters may be calculated as follows:

$$w_{line}^{(mod)} = \sqrt{16 + w_{line}^2}, w_{curr}^{(mod)} = \sqrt{16 + w_{curr}^2}, \quad (10)$$

and the current line width is accepted if the ratio of the smaller to the larger modified width parameters and modified current line width parameter is greater than or equal to a threshold of 0.6:

$$\frac{\min(w_{line}^{(mod)}, w_{curr}^{(mod)})}{\max(w_{line}^{(mod)}, w_{curr}^{(mod)})} \geq 0.6. \quad (11)$$

Next, if the length in lines parameter ($l_{line}$) is zero, the width parameter $w_{line}$ is set to this width; otherwise the width parameter is set to a weighted average of the current parameter $w_{line}$ and the current line width:

$$w_{line} = \begin{cases} w_{curr} & \text{if } l_{line} = 0, \\ \left( \dfrac{w_{curr} l_{bord} + w_{line} l_{line}}{l_{bord} + l_{line}} \right) & \text{otherwise.} \end{cases} \quad (12)$$

Optionally, if dashed lines are being processed in the system, a dash style must also be handled. If the length in lines parameter ($l_{line}$) is zero, the dash style for the object is simply set to the current line dash style. Otherwise, if the length in lines parameter ($l_{line}$) is non-zero, and therefore a dash style has been set for the object, the current line dash style is compared with the current dash style around the object. If styles are consistent, the dash style around the object is set based on the two dash styles, and if the styles are inconsistent, the current line dash style is rejected. Finally, the border length parameter $l_{bord}$ is added to the line length parameter $l_{line}$ (i.e. $l_{line}=l_{line}+l_{bord}$) to complete step 1625.

Processing continues to decision step 1630, which checks whether the graphical object is overlapped at the current border. This can be determined based on the region included in the graphical object adjacent to the border. If the region is included in more than one graphical object, and at least one of the graphical objects is layered above the current graphical object with partial transparency, the graphical object is overlapped at the current border (Yes) and processing continues at step 1640. Otherwise, if step 1630 returns false (No), processing continues at step 1635.

In step 1635, colour error is checked and parameters are accumulated in this optional step. An optional acceptance test for the line colour may be performed if the non-overlapped line colour has been set. The acceptance test compares the average colour for non-overlapped lines $C_{over}^{i}$ to the current line colour $C_{curr}^{i}$. A suitable test compares the colour distance in RGB space (assuming colour parameters take values in the range 0 to 255) to a threshold, and may be performed by testing the inequality:

$$\Sigma_{i=R,G,B}(C_{over}^{i} - C_{curr}^{i})^2 < 1000, \quad (13)$$

the line colour being accepted if the equality is true.

The average colour for non-overlapped lines $C_{over}^{i}$ is be updated as follows. If the length in non-overlapped lines parameter ($l_{over}$) is zero, the average colour for each channel for non-overlapped lines $C_{over}^{i}$ is set to the current line colour $C_{curr}^{i}$; otherwise, the average colour for each channel for non-overlapped lines $C_{over}^{i}$ is set to a weighted average of the non-overlapped line colour and the current line colour:

$$C_{over}^{i} = \begin{cases} C_{curr}^{i} & \text{if } l_{over} = 0, \\ \left( \dfrac{C_{curr}^{i} l_{bord} + C_{over}^{i} l_{over}}{l_{bord} + l_{over}} \right) & \text{otherwise.} \end{cases} \quad (14)$$

After setting the colour, the border length parameter $l_{bord}$ is added to the length in non-overlapped lines $l_{over}$ (i.e. $l_{over}=l_{over}+l_{bord}$) to complete step 1635. Processing returns to step 1610.

Step 1640 compensates for the transparent overlap. The step 1640 estimates the true line colour $C_{true}^{i}$, of the current line in the absence of transparent overlapping objects. For a single overlapping layer, based on Equation 1, the current line colour, $C_{curr}{}^i$, is related to the colour $C_{upper}{}^{(i)}$ and transparency $\alpha_{upper}$ of the overlapping graphical object and the true line colour as follows:

$$C_{curr}{}^{(i)} = (1-\alpha_{upper})C_{upper}{}^{(i)}\alpha_{upper}C_{true}{}^{(i)}. \quad (15)$$

Rearranging this relation gives an expression for the true line colour:

$$C_{true}^{(i)} = \frac{1}{\alpha_{curr}}(C_{curr}^{(i)} - (1-\alpha_{upper})C_{upper}^{(i)}). \quad (16)$$

To handle multiple layers, the above relation is used multiple times starting at the uppermost layered overlapping object and ending at the lowest layered object. After each layer is handled, the value of the current line colour is replaced with the estimated true line colour to iterate to the next layer. However, steps 1640 and 1645 may be skipped preferably if there are multiple overlapping objects as the estimated line colour may be less accurate for each additional overlapping layer handled.

At step 1645, optionally the colour error is checked and parameters are accumulated. That is, an optional acceptance test for the line colour may be performed if the overlapped line colour has been set. The acceptance test compares the average colour for overlapped lines $C_{under}{}^i$ to the current true line colour $C_{true}{}^i$ estimated at step 1640. A suitable test compares the colour distance in RGB space (assuming colour parameters take values in the range 0 to 255) to a threshold and may be performed by testing the inequality:

$$\Sigma_{i=R,G,B}(C_{under}{}^i - C_{true}{}^i)^2 < 1000, \quad (17)$$

the line colour being accepted if the equality is true.

Next, the average colour for overlapped lines $C_{under}{}^i$ is updated as follows. If the length in non-overlapped lines parameter ($l_{under}$) is zero, the average colour for each channel for non-overlapped lines $C_{under}{}^i$ is set to the current true line colour $C_{true}{}^i$; otherwise it is set to a weighted average of the overlapped line colour and the current true line colour:

$$C_{under}^i = \begin{cases} C_{true}^i & \text{if } l_{over} = 0, \\ \left(\dfrac{C_{true}^i l_{bord} + C_{under}^i l_{over}}{l_{bord} + l_{over}}\right) & \text{otherwise.} \end{cases} \quad (18)$$

After setting the colour, the border length parameter $l_{bord}$ is added to the length in overlapped lines $l_{under}$ (i.e. $l_{under} = l_{under} + l_{bord}$) to complete step 1645. Processing returns to step 1610.

Step 1650 forms a line style for the graphical object based on the accumulated data. The line width ($w_{obj}$) is selected based on the an average width parameter and the line colour ($C_{obj}{}^i$) is selected based on $C_{over}{}^i$, or $C_{under}{}^i$, or a combination of these. For example, $w_{obj} = w_{line}$ and $C_{obj}{}^i = C_{over}{}^i$. If dashed lines are being processed, the dash style is also stored as part of the line style. If the colour or width parameters being used are not set, the line style should not be set.

The final step 1655 of method 1600 is an acceptance test that determines whether or not an acceptable line style has been determined for the graphical object. The line style may be rejected if any of the following criteria has occurred:
1. the line style has not been set at step 1650;
2. the line width acceptance test at step 1625 failed for any border;
3. the colour acceptance test at step 1635 failed for any border;
4. the colour acceptance test at step 1645 failed for any border;
5. the length in lines parameter ($l_{line}$) does not make up a sufficient proportion of the total length parameter ($l_{tot}$) for the object (e.g. $l_{line} < 0.8 l_{tot}$);
6. the dash style consistency test at step 1625 failed for any border. Processing then terminates.

INDUSTRIAL APPLICABILITY

The arrangements described are applicable to the computer and data processing industries and particularly for the processing graphical objects.

Methods, apparatuses, and computer readable storage mediums for generating an object representation from a bitmap image have been described. The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A computer-implemented method of generating an object representation from a bitmap image, the computer comprising a memory storing a computer program and a processor unit coupled to the memory, said method comprising the steps of:
   selecting, using the processor and the memory, a set of regions from said bitmap image, said set of regions including a first region assumed to be a region of overlap of a first graphical object and a second graphical object, a second region assumed to be part of a first graphical object which overlaps a second graphical object, a third region assumed to be part of the second graphical object, and a background region, the first region being adjacent to the second and third regions;
   determining, using the processor and the memory, a colour difference between a colour of the first region of said bitmap image and a colour defined by a transparency compositing model given an assumed transparency of the first graphical object and colours of the second and third regions and the background region;
   determining, using the processor and the memory, if the colour difference is smaller than a predetermined threshold;
   if the colour difference is smaller than the predetermined threshold, applying the assumed transparency and the colour of the second region, using the processor and the memory,
to the first graphical object as parameters of a first graphical object;
   constructing, using the processor and the memory, a geometric model of said first object from said set of regions and the applied parameters of the first graphical object; and
   generating, using the processor and the memory, said object representation dependent upon said geometric model.

2. The method as claimed in claim 1, wherein said object representation is an electronic document and said bitmap image is a scanned version of a document.

3. The method as claimed in claim 1, wherein the assumed transparency minimizes the colour difference.

4. The method as claimed in claim 1, wherein said second graphical region is partially transparent.

5. The method as claimed in claim 4, wherein:
said first graphical object overlaps said second graphical object and a third graphical object with partial transparency and the second object overlaps the third object with partial transparency;
said first, second, and third graphical objects overlap with partial transparency;
said set of regions comprises a first region, at least three regions that are adjacent to an outer boundary of said first region, and a background region;
each of the three adjacent regions has an associated transparency model that includes colour and transparency parameters corresponding to the overlap of two of said graphical objects with partial transparency; and
the transparency models of the three adjacent regions are consistent with the transparency model corresponding to the overlap of said three graphical objects with partial transparency.

6. The method as claimed in claim 5, wherein said three graphical objects are circles that overlap with partial transparency.

7. The method as claimed in claim 1, wherein geometric models of graphical objects are constructed by following region borders while keeping track of transparency models of regions adjacent to the borders that have been followed.

8. The method of as claimed in claim 7, in which the colour, transparency, and layering parameters of the graphical objects are set according to transparency models of regions adjacent to borders traversed in construction of geometric models of graphical objects.

9. An apparatus for generating an object representation from a bitmap image, said apparatus comprising:
a memory for storing data and a computer program; and
a processor unit coupled to the memory for executing a computer program, said memory and said processor configured to generate said object representation from said bitmap image, the computer program comprising:
computer program code means for selecting a set of regions from said bitmap image, said set of regions including a first region assumed to be a region of overlap of a first graphical object and a second graphical object, a second region assumed to be part of a first graphical object which overlaps a second graphical object, a third region assumed to be part of the second graphical object, and a background region, the first region being adjacent to the second and third regions;
computer program code means for determining a colour difference between a colour of the first region of said bitmap image and a colour defined by a transparency compositing model given an assumed transparency of the first graphical object and colours of the second and third regions and the background region;
computer program code means for determining if the colour difference is smaller than a predetermined threshold;
computer program code means if the colour difference is smaller than the predetermined threshold, applying the assumed transparency and the colour of the second region to the first graphical object as parameters of a first graphical object;
computer program code means for constructing a geometric model of said first object from said set of regions and the applied parameters of the first graphical object; and
computer program code means for generating said object representation dependent upon said geometric model.

10. The apparatus as claimed in claim 9, wherein said object representation is an electronic document and said bitmap image is a scanned version of a document.

11. The apparatus as claimed in claim 9, wherein the assumed transparency minimises the colour difference.

12. The apparatus as claimed in claim 9, wherein said second graphical region is partially transparent.

13. The method as claimed in claim 9, wherein geometric models of graphical objects are constructed by following region borders while keeping track of transparency models of regions adjacent to the borders that have been followed.

14. A non-transitory computer readable storage medium having recorded therein a computer program for generating an object representation from a bitmap image for execution by a processing unit, the computer program comprising:
computer program code means for selecting a set of regions from said bitmap image, said set of regions including a first region assumed to be a region of overlap of a first graphical object and a second graphical object, a second region assumed to be part of a first graphical object which overlaps a second graphical object, a third region assumed to be part of the second graphical object, and a background region, the first region being adjacent to the second and third regions;
computer program code means determining a colour difference between a colour of the first region of said bitmap image and a colour defined by a transparency compositing model given an assumed transparency of the first graphical object and colours of the second and third regions and the background region;
computer program code means determining if the colour difference is smaller than a predetermined threshold;
computer program code means for transparency if the colour difference is smaller than the predetermined threshold, applying the assumed transparency and the colour of the second region to the first graphical object as parameters of a first graphical object;
computer program code means for constructing a geometric model of said first object from said set of regions and the applied parameters of the first graphical object; and
computer program code means for generating said object representation dependent upon said geometric model.

15. The computer readable storage medium as claimed in claim 14, wherein said object representation is an electronic document and said bitmap image is a scanned version of a document.

16. The computer readable storage medium as claimed in claim 14, wherein the assumed transparency minimises the colour difference.

17. The computer readable storage medium as claimed in claim 14, wherein said second graphical region is partially transparent.

* * * * *